United States Patent [19]
Ishibashi et al.

[11] Patent Number: 5,196,880
[45] Date of Patent: Mar. 23, 1993

[54] PHOTOGRAPHIC CAMERA SYSTEM

[75] Inventors: Kenji Ishibashi; Minoru Kuwana; Yasuaki Serita, all of Sakai; Tetsuya Arimoto, Osaka; Hiroshi Ootsuka, Sakai; Yoshihiro Hara, Kishiwada; Hiroshi Ueda, Habikino; Masayuki Ueyama, Toyonaka, all of Japan

[73] Assignee: Minolta Camera Kabushiki Kaisha, Osaka, Japan

[21] Appl. No.: 593,980

[22] Filed: Oct. 9, 1990

[30] Foreign Application Priority Data

| Oct. 7, 1989 | [JP] | Japan | 1-262593 |
| Oct. 7, 1989 | [JP] | Japan | 1-262594 |
| Oct. 7, 1989 | [JP] | Japan | 1-262592 |
| Dec. 18, 1989 | [JP] | Japan | 1-327514 |
| Dec. 18, 1989 | [JP] | Japan | 1-327515 |

[51] Int. Cl.$^5$ ............................... G03B 13/36
[52] U.S. Cl. ........................ 354/400; 354/402; 354/195.12
[58] Field of Search ........... 354/402, 406, 407, 408, 354/195.1, 195.12, 400

[56] References Cited

U.S. PATENT DOCUMENTS

| 4,572,642 | 1/1986 | Yamamoto et al. | 354/402 |
| 4,633,072 | 12/1986 | Sugiura et al. | 354/402 |
| 4,861,146 | 8/1989 | Hatase et al. | 354/402 |
| 4,881,799 | 11/1989 | Ohno et al. | 354/408 |

Primary Examiner—Russell E. Adams

[57] ABSTRACT

A camera system which comprises a photo-taking lens assembly of varifocal type including a zooming lens and a focusing lens; a manipulatable member; a zooming drive device for driving the zooming lens during a manipulation of the manipulatable member; a focusing device for driving the focusing lens; a focal length detector for sequentially detecting a current focal length of the photo-taking lens assembly; a zooming amount calculator operable to repeatedly add or subtract a predetermined amount to or from the current focal length during the manipulation of the manipulatable member thereby to sequentially update a target focal length used as a reference for the drive of the zooming lens; a first control adapted to receive the target focal length updated by the zooming amount calculator for calculating the amount of deviation in focus which would occur before the target focal length is attained and also for controlling the focusing device so as to eliminate the amount of deviation in focus which has been calculated; and a second control for controlling the zooming drive device, when the manipulation of the manipulatable member is released, so as to drive the zooming lens to a position where the target focal length calculated by the zooming amount calculator is attained.

15 Claims, 49 Drawing Sheets

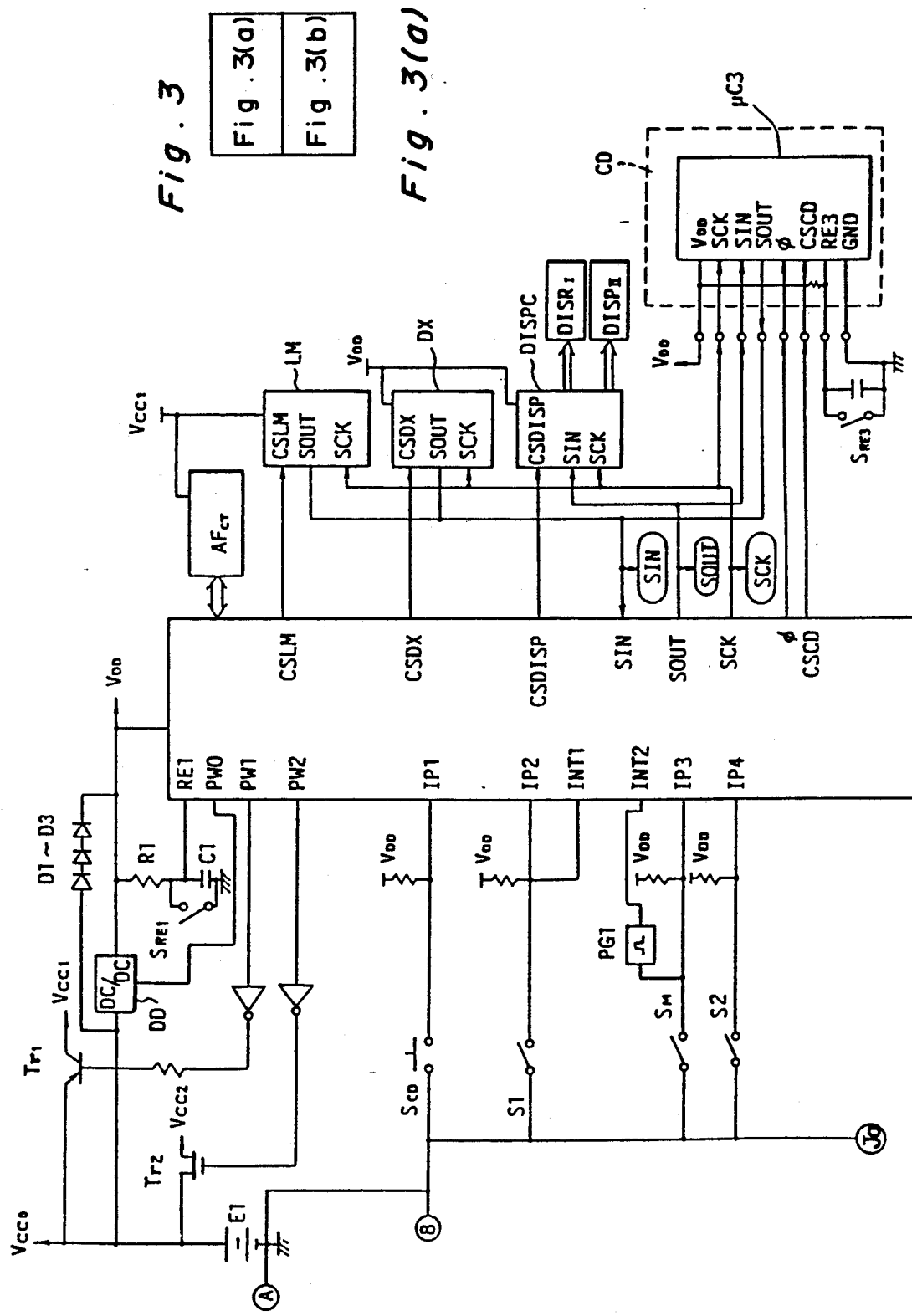

Fig. 5(a)
Fig. 5
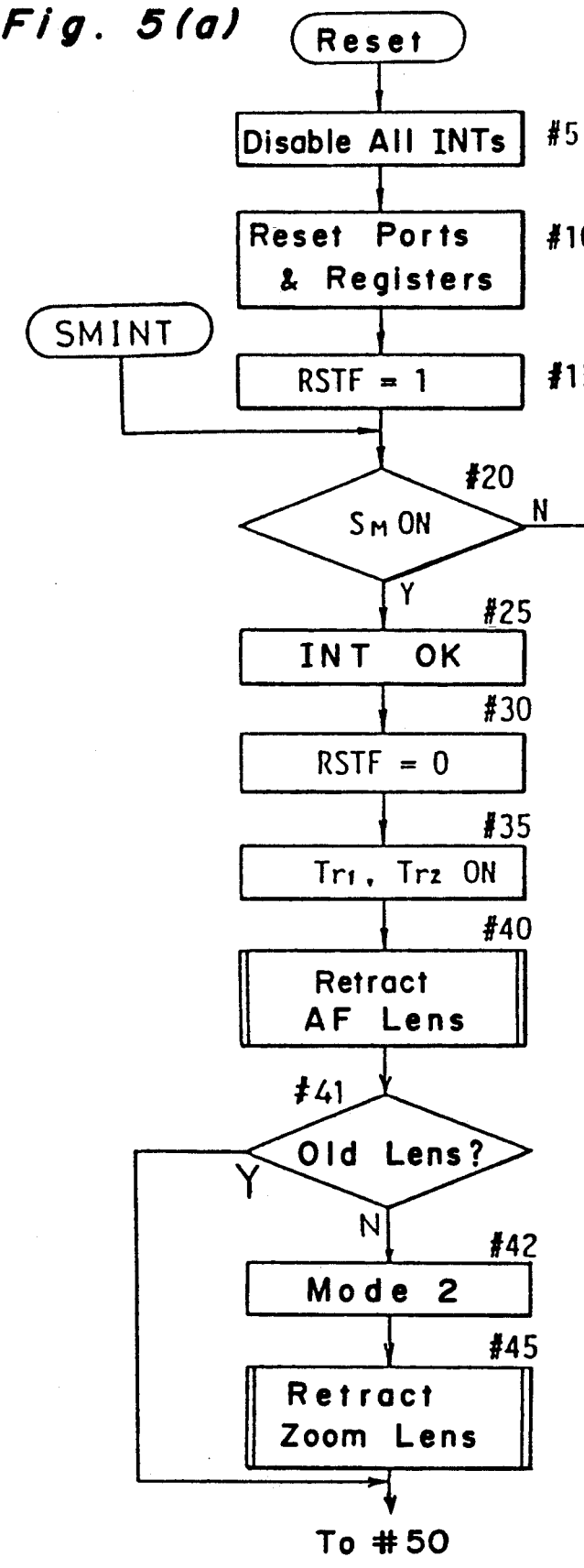
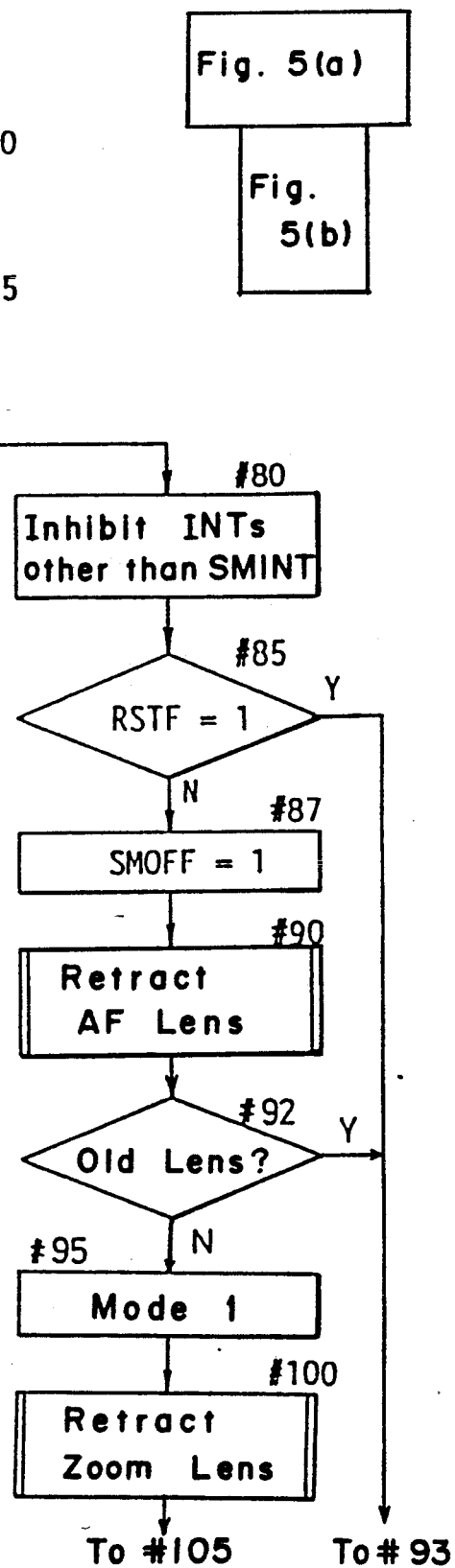

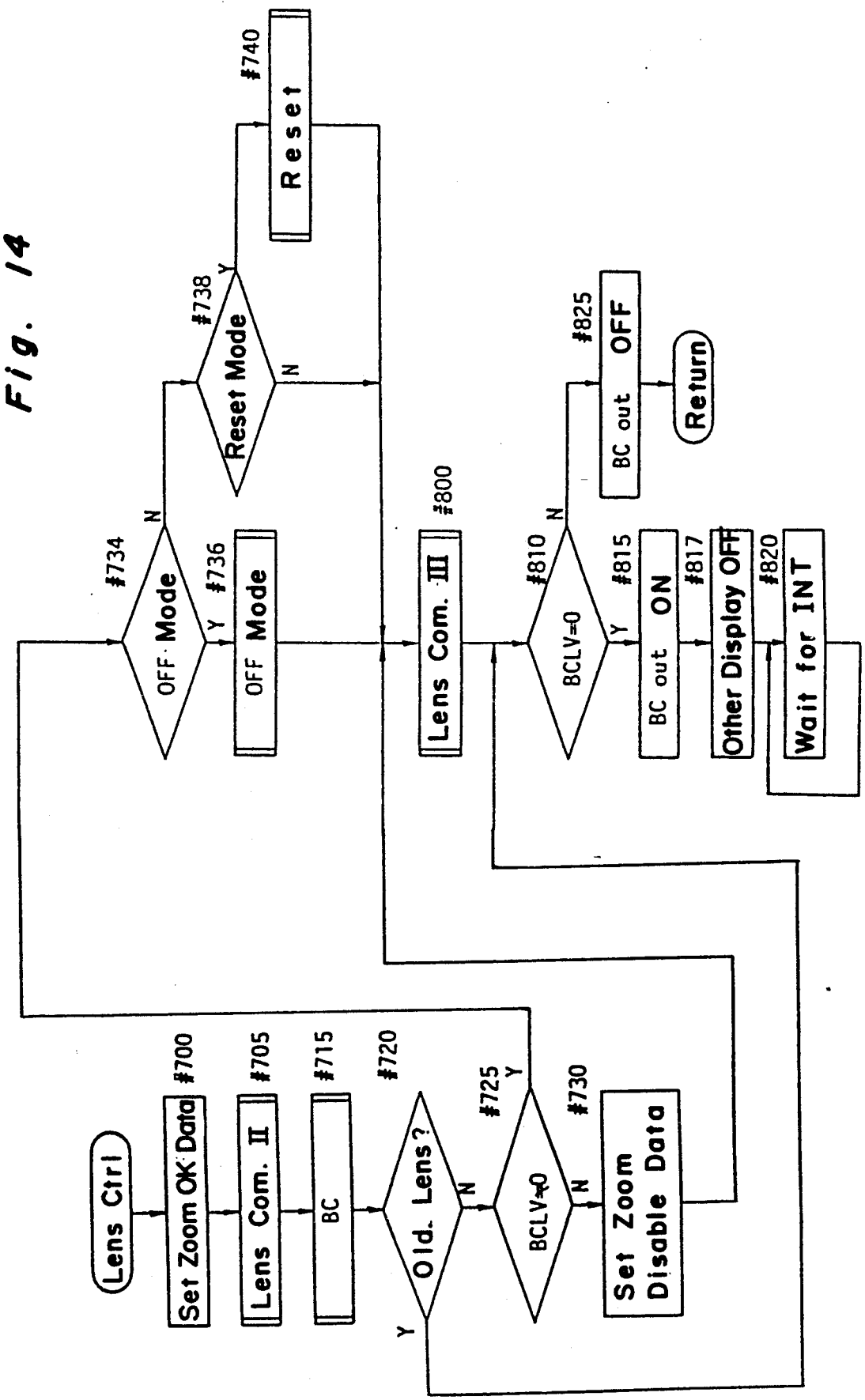

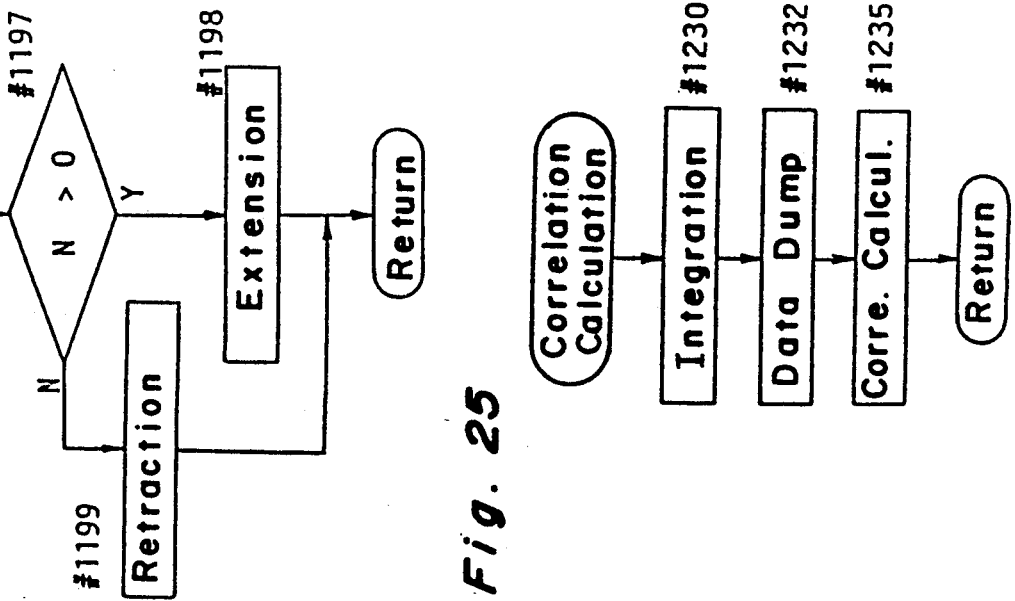
Fig. 24
Fig. 25
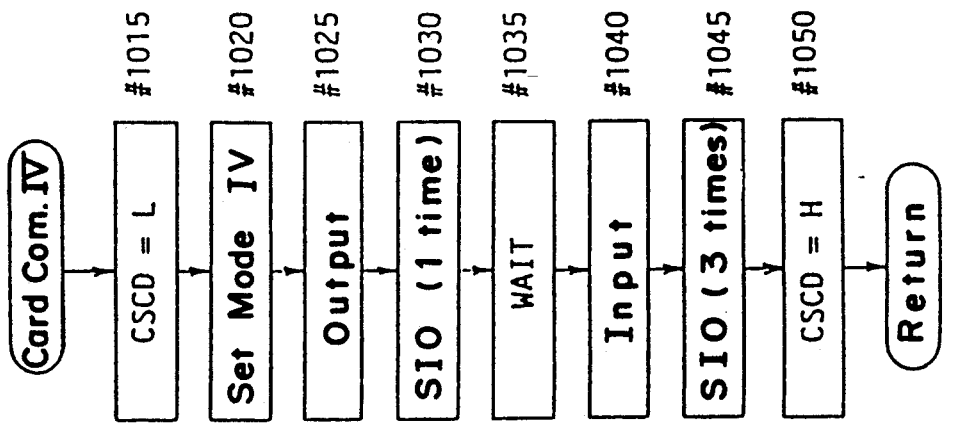
Fig. 22
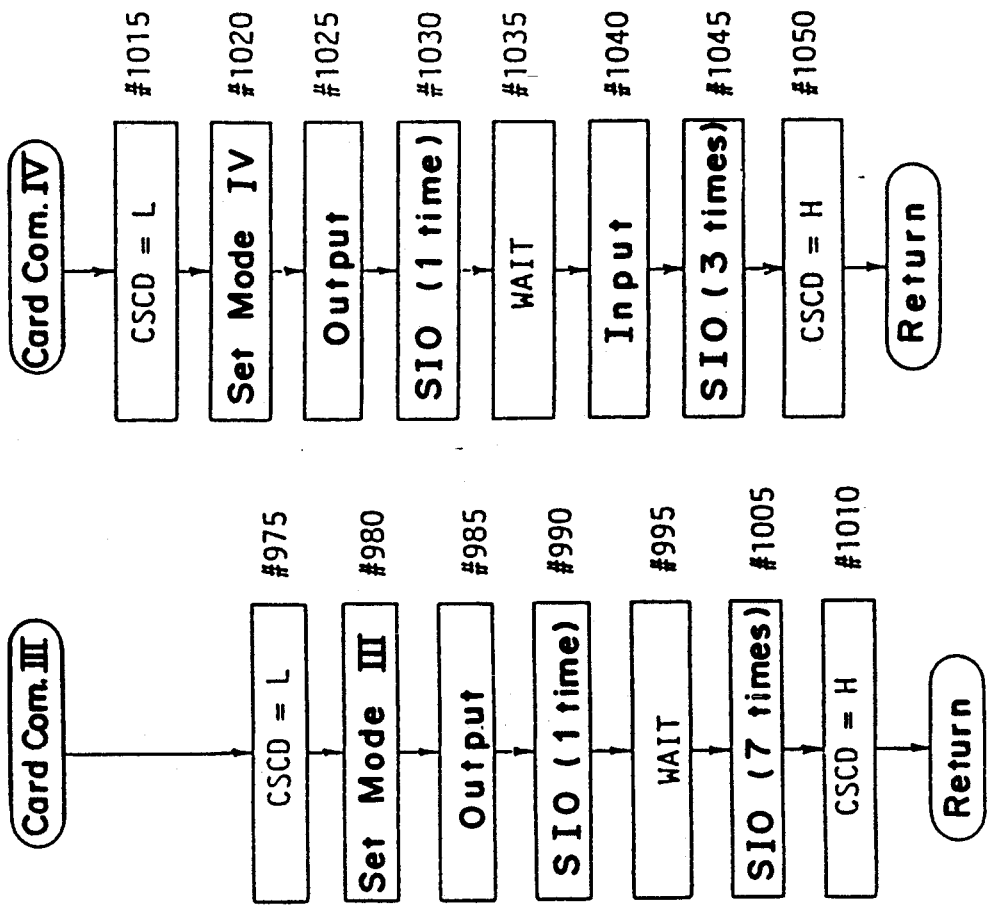
Fig. 21

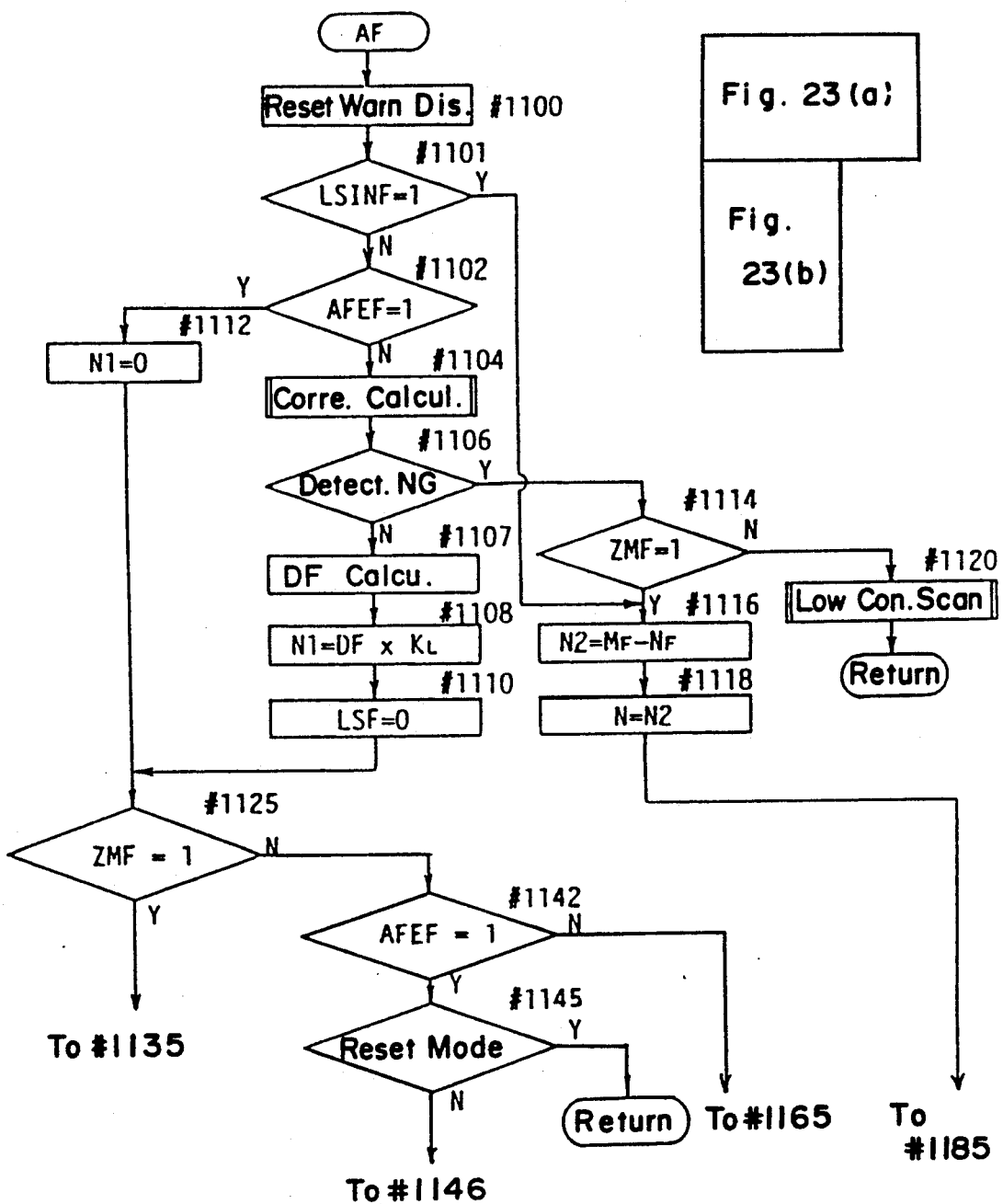

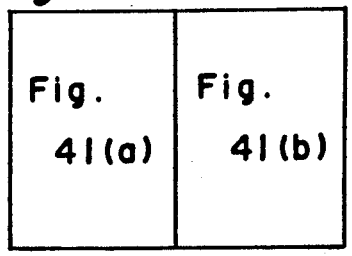
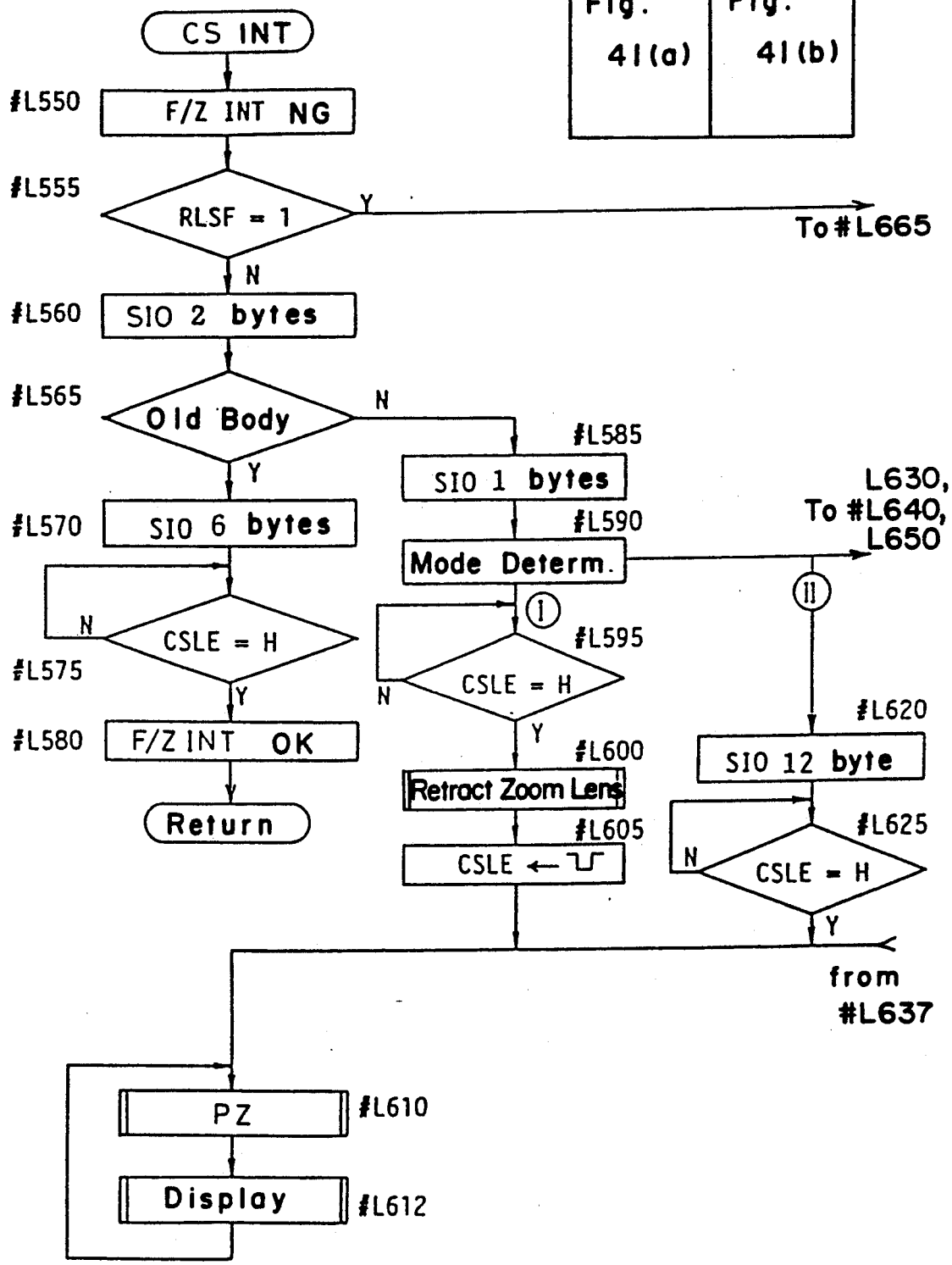

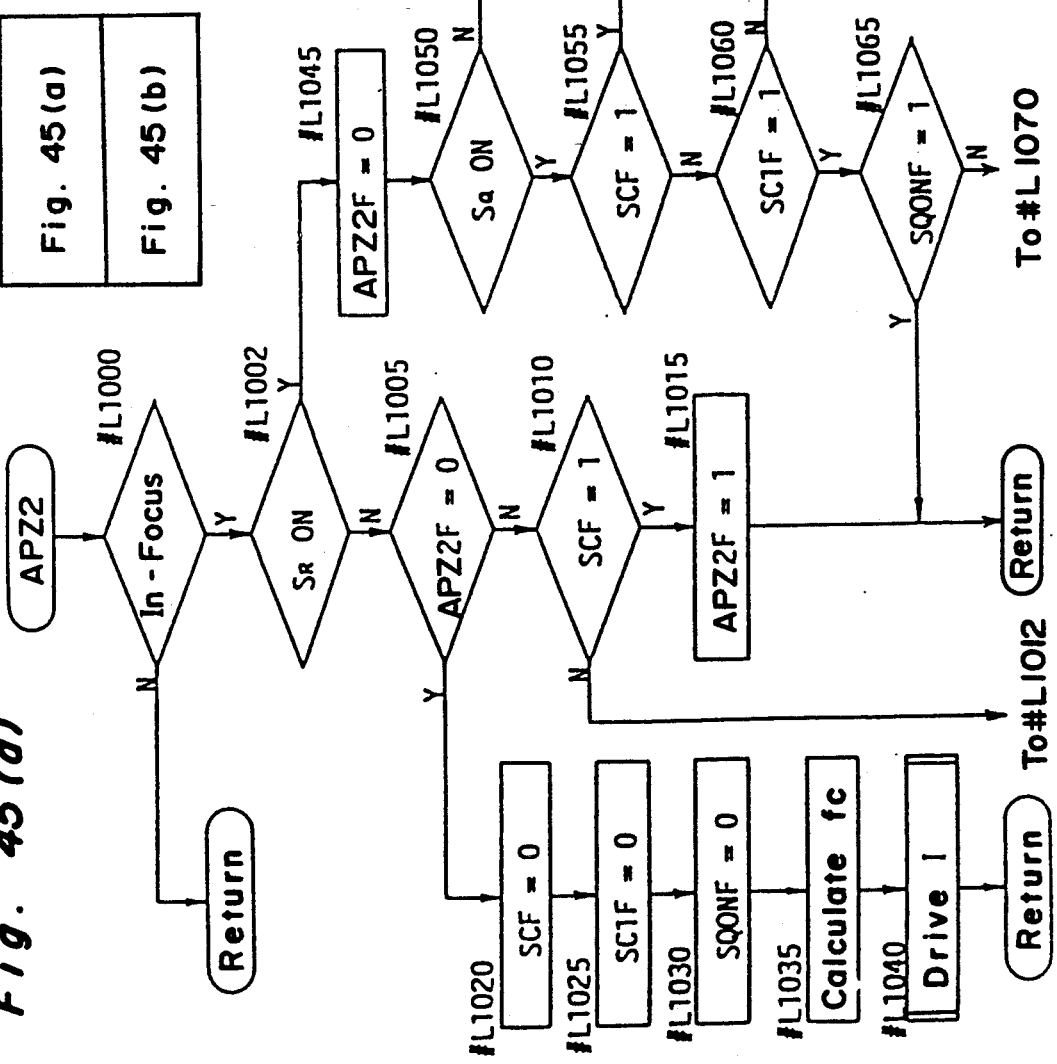
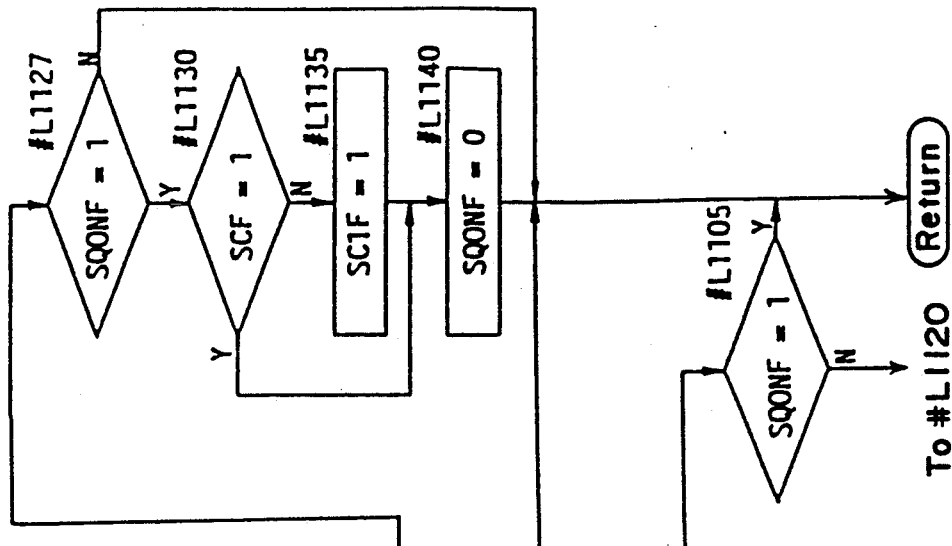
Fig. 45
Fig. 45(a)
Fig. 45(b)
Fig. 45(a)

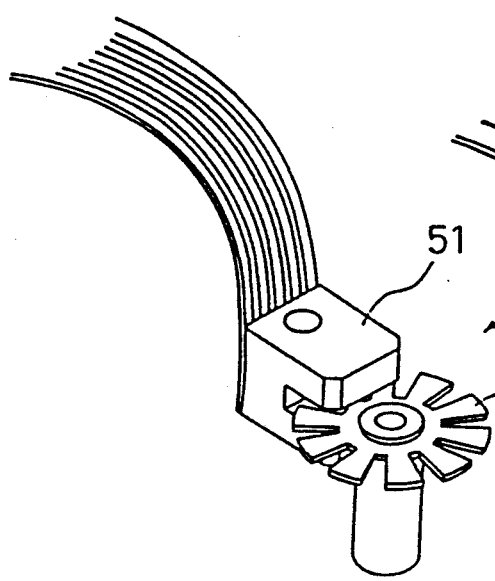
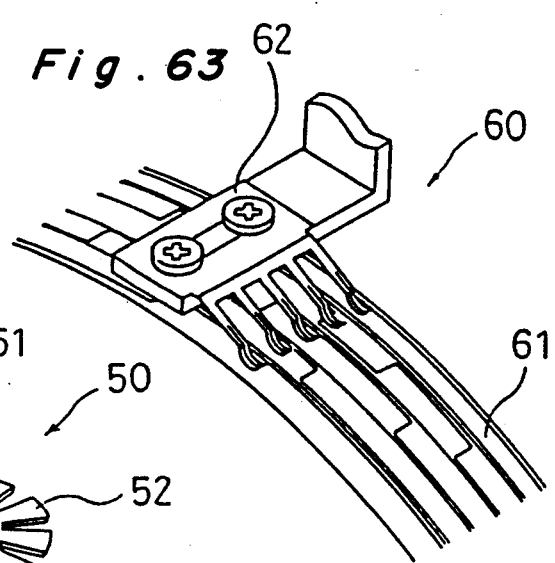
Fig. 62  Fig. 63
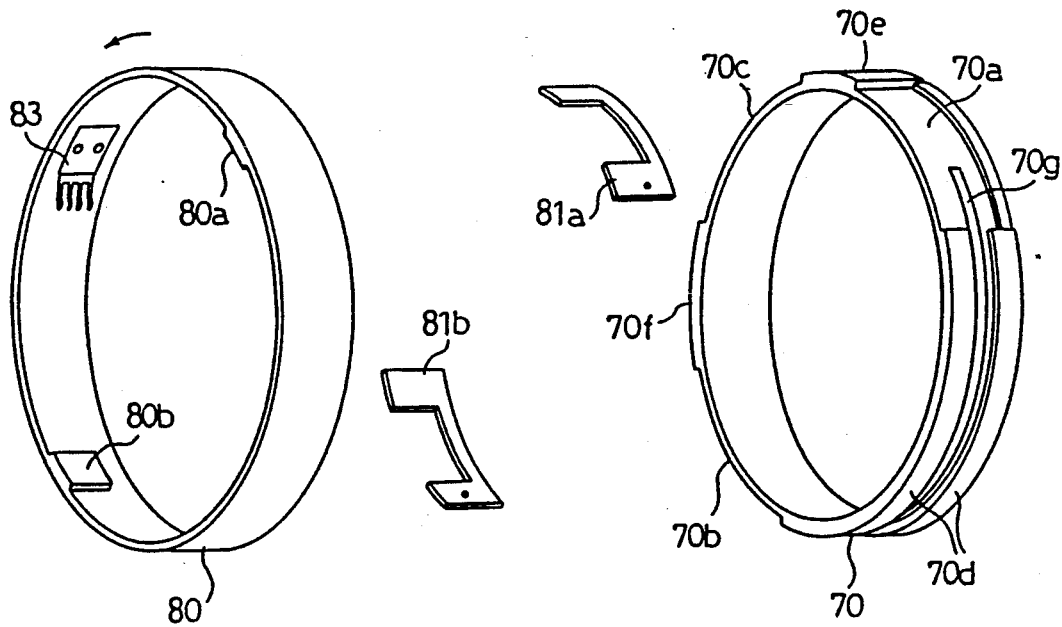
Fig. 64

PHOTOGRAPHIC CAMERA SYSTEM

BACKGROUND OF THE INVENTION

1. Field of the Invention

The present invention generally relates to a photographic camera system and, more particularly, to the camera system comprising a camera body and an interchangeable lens assembly employed in the form of a varifocal lens assembly. The varifocal lens assembly is known of a type comprising a first lens group adapted to be driven during a zooming and a second lens group adapted to be driven during a focusing and of a nature wherein the position of focus once adjusted tend to deviate with the zooming, i.e., a change in focal length.

2. Description of the Prior Art

A varifocal lens assembly has been well known in the art as one of the interchangeable photographic lens assemblies available for, for example, a single-lens reflex camera. Given the same zooming ratio, the varifocal lens assembly has some advantages as compared with the ordinary zooming lens assembly in that it can be assembled compact in size, lightweight and small in closest photo-taking distance. On the other hand, the varifocal lens assembly is known having a disadvantage in that the position of focus once adjusted tends to deviate with the zooming, that is, a change in focal length and, therefore, the zooming requires a re-adjustment in position of focus.

In view of the foregoing, attempts have been made to provide the varifocal lens assembly with means for alternately performing a predetermined amount of drive of the zooming lens group during the zooming and a compensation for a deviation in position of focus resulting from the zooming. According to the prior art such as disclosed in, for example, the Japanese Laid-open Patent Publication No. 63-289516, published in 1988, arrangement is made that the zooming lens group can be immediately brought to a halt, when the zooming operation is interrupted, so that the focusing lens group can be driven subsequently to a correct in-focus position.

In the camera system including the varifocal lens assembly, where for the purpose of automatically compensating for the deviation in position of focus resulting from the zooming a means is provided for detecting the focal length attained subsequent to the predetermined amount of movement of the zooming lens group and for calculating the amount of defocus relative to the focal length then detected so that the compensation can be made based on the calculated amount of defocus, it has been found that the focusing tends to be delayed rather than the drive of the zooming lens group if the drive of the zooming lens groups is continued even where the deviation in focus is compensated for and that, therefore, during the drive of the zooming lens group, the defocus condition tends to continue (i.e., a follow-up compensation continues). Considering that it is not possible to predicate when the zooming operation performed at a will of a photographer is interrupted, the drive of the zooming lens group and the focusing operation are not necessarily associated with each other. Because of this, when the drive of the zooming lens group is interrupted immediately after the zooming operation has been suspended, the focusing operation will not associate with the halt of the zooming, resulting in a condition in which the position of focus is deviated.

When it comes to a photographic camera having a capability of utilizing one of a plurality of interchangeable lens assemblies, the interchangeable lens assemblies do not always include an usual lens assembly of fixed focal length and a usual zooming lens assembly of an ordinary type wherein the position of focus once adjusted will not deviate even though the zooming is performed, but include a varifocal lens assembly of the type hereinabove discussed. Some photographer may use the ordinary lens assembly on a certain occasion and the varifocal lens assembly on a different occasion, and therefore, the camera body equipped with functions necessitated only for use with the varifocal lens assembly is not practical. In other words, where the amount of defocus resulting from the zooming performed in the varifocal lens assembly is determined in reference to a ROM (read-only memory) table, the camera body will require an increased storage capacity. On the other hand, where the defocus amount is to be determined according to an arithmetic operation, an arithmetic process performed in the camera body in association with any one of AF (auto-focusing) and AE (automatic exposure) functions will be sacrificed, i.e., delayed.

In the case of the AF (auto-focusing) camera system designed to drive the focusing lens group to a correct infocus position through the detection of a focusing condition of the focusing lens group, arrangement has been made to effect a so-called low contrast scanning, i.e., an operation in which, in the event that the focus detection is impossible, the focusing lens group is driven in search for a position at which the focus detection is possible, such as disclosed in the Japanese Laid-open Patent Publication No. 59-182411.

When it comes to the camera system having the varifocal lens assembly mounted thereon, the zooming operation may often be carried out during the low contrast scanning. In such case, if the low contrast scanning is performed simultaneously with the drive of the zooming lens group in dependence on the zooming operation, not only can no proper compensation for a deviation in focus resulting from the zooming be accomplished, but also the scanning of the in-focus position as a result of the low contrast scanning cannot be performed properly. Accordingly, it is not proper to perform both of those operations simultaneously and, therefore, priority should be given to any one of them. While the drive of the zooming lens group is based on a manual operation performed by the photographer at his or her will, the low contrast scanning operation is not based on the manual operation, but is performed automatically by the camera system. Accordingly, if priority is given to the latter, no photographer's intent will be taken into in the control performed by the camera system.

Conversely, it may often occur that, in the camera system having the varifocal lens assembly mounted thereon, the focus detection becomes impossible during the drive of the zooming lens group. In such case, if the low contrast scanning is performed in a manner similar to that performed in the conventional camera system, a change in position of focus resulting from the zooming and a change in position of focus resulting from the low contrast scanning will occur simultaneously, rendering it to be difficult to effectively control the focusing lens group.

SUMMARY OF THE INVENTION

Accordingly, the present invention has been devised with a view to substantially eliminating the above discussed problems and has for its primary object to provide an improved camera system utilizing the varifocal lens assembly, which is effective to avoid any possible delay in focusing operation relative to the zooming operation when a deviation in position of focus resulting from the zooming operation is to be compensated for, thereby to avoid any possible occurrence of deviation in position of focus.

Another important object of the present invention is to provide an improved camera system of the type referred to above utilizing the varifocal lens assembly, wherein the automatic compensation for a deviation in position of focus resulting from the zooming operation can be accomplished with no need to increase the load on the camera.

A further important object of the present invention is to provide an improved camera system of the type referred to above utilizing the varifocal lens assembly, wherein a proper control reflecting the wall of a photographer can be accomplished when the zooming operation is effected during the low contrast scanning operation.

A still further important object of the present invention is to provide an improved camera system of the type referred to above utilizing the varifocal lens assembly, wherein not only can any possible deviation in position of focus be automatically compensated for, but also an actual focusing condition can be faithfully displayed.

A yet further important object of the present invention is to provide an improved camera system of the type referred to above utilizing the varifocal lens assembly, wherein the focusing lens group can be effectively controlled even when the focus detection becomes impossible during the zooming operation.

BRIEF DESCRIPTION OF THE DRAWINGS

These and other objects and features of the present invention will become clear from the following description taken in conjunction with a preferred embodiments of the present invention with reference to the accompanying drawings, in which:

FIGS. 5 to 29 and FIGS. 30(a) and 30(b) are flowcharts showing the sequence of operation of an electric system used in the camera body of FIG. 1;

FIG. 62 is a perspective view of an encoder used in the interchangeable lens assembly;

FIG. 63 is a perspective view of a zooming encoder used in the interchangeable lens assembly;

FIG. 64 is an exploded view of an operating ring used in the interchangeable lens assembly;

DETAILED DESCRIPTION OF THE EMBODIMENT

Figure 1:
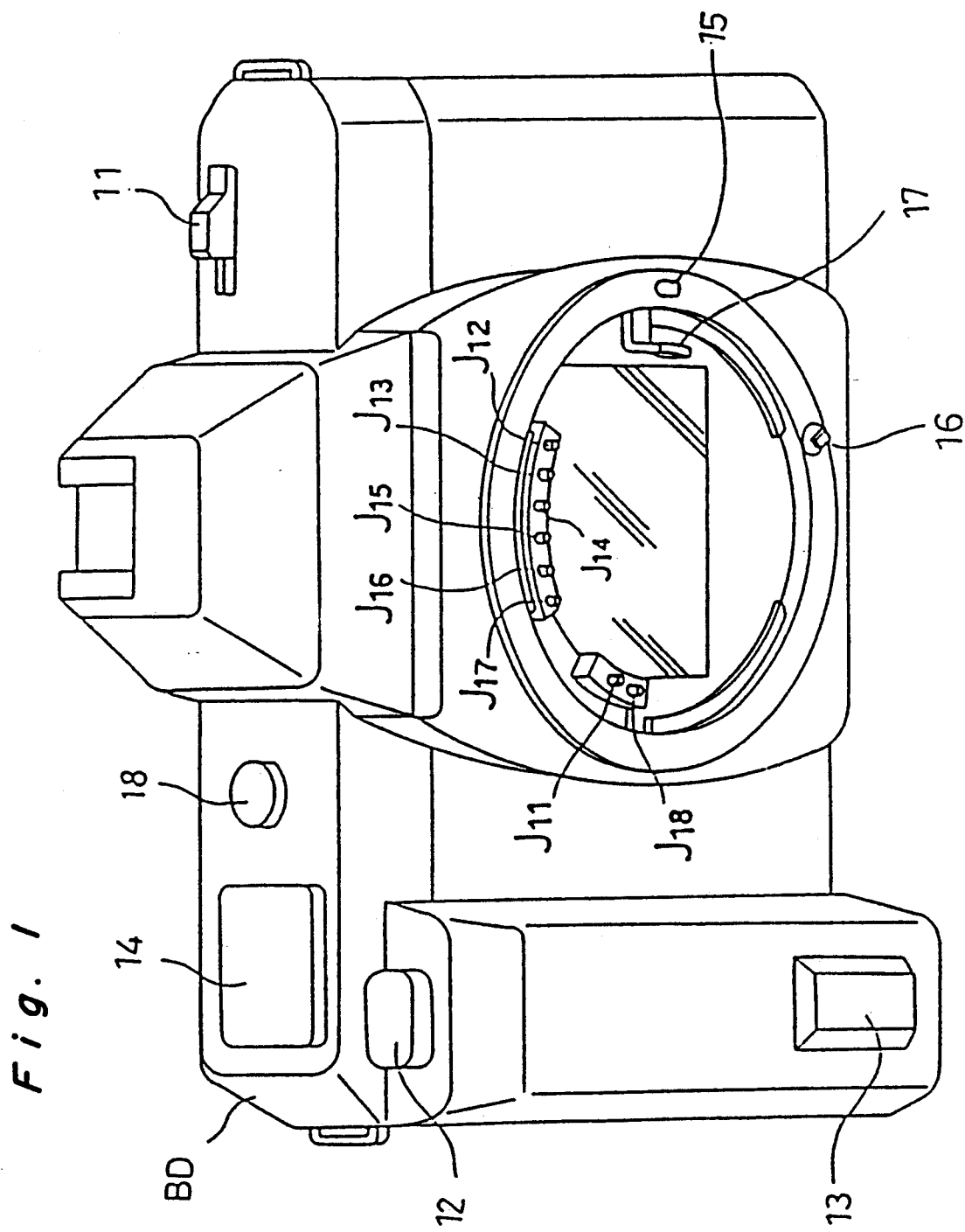
FIG. 1 is a schematic perspective view showing a canera body used in the practice of the present invention.

Before the description of the preferred embodiments of the present invention proceeds, it is to be noted that like parts are designated by like reference numerals throughout the accompanying drawings. It is also to be noted that, in describing the preferred embodiments of the present invention, the present invention is assumed as applied to a single lens reflex camera system including a varifocal lens assembly coupled to a camera body.

Figure 2:
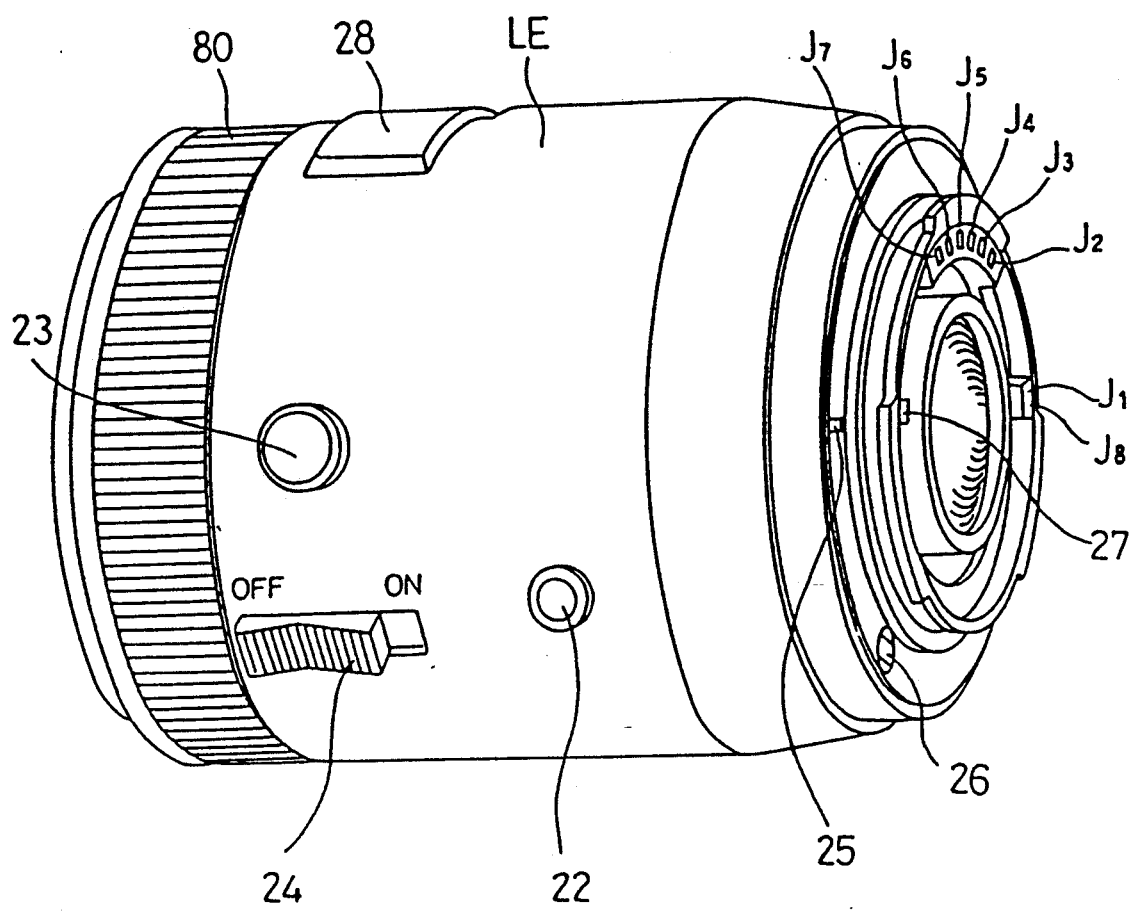
FIG. 2 is a perspective view, on an enlarged scale, of an interchangeable lens assembly adapted to be in combination with the camera body of FIG. 1 in the practice of the present invention.

FIG. 1 illustrates a camera body BD to which the present invention is applied, whereas FIG. 2 illustrates a varifocal interchangeable lens assembly LE adapted to be detachably coupled with the camera body BD.

Referring to FIG. 1, reference numeral 11 represents a slider used to turn a main switch on and movable between ON and OFF positions. When this slider 11 is in the ON position, the camera body BD is in a condition ready to operate, whereas when this slider 11 is in the OFF position, the camera body BD is held inoperative.

Reference numeral 12 represents a shutter release button capable of undergoing first and second stages of depression during the full stroke of movement thereof. The first stage of depression of the shutter release button 12 results in a photo-taking ready switch S1 (as will be described later) being turned on to initiate a light measurement, an exposure calculation and various AF operations. The subsequent second stage of depression of the shutter release button 12 can result in a release switch S2 being turned on to initiate an exposure control operation.

Reference numeral 13 represents a pocket for the insertion thereinto of a selected one of a plurality of IC cards each incorporating therein a microcomputer, for adding functions to the camera body BD. Reference numeral 14 is a display panel on the camera body BD for providing visual indication of a shutter speed, an aperture value, IC card information, a low battery warning and other information. Although not shown, the camera body BD has a viewfinder display window installed within a viewfinder for providing visual indication of the shutter speed, the aperture value, a zooming mode and other information.

Reference numeral 15 represents a mount lock pin. When and after the interchangeable lens assembly LE has been mounted and then locked, a lens mount switch SLE as will be described later is turned off, but the lens mount switch SLE is kept off unless the interchangeable lens assembly LE is locked. Reference numeral 16 represents an AF coupler adapted to be driven by an AF motor built in the camera body BD. Reference numeral 17 represents an aperture stop-down lever operable to stop down an aperture of the interchangeable lens assembly LE by a number of stop-down steps determined in the camera body BD.

Reference numeral 18 represents a card key utilizable to selectively switch on and off the functions of the IC card.

Referring to FIG. 2, reference numeral 22 represents a mode key utilizable for selecting one of various zooming modes as will be described. When this mode key 22 is depressed, a mode switch SMD as will be described later is switched on. Reference numeral 23 represents a lens key utilizable to accomplish a storage operation or an automatic return operation (the details of which are described later) during a certain zooming mode. When this lens key 23 is depressed, a lens switch SQ as will be described later is turned on.

Reference numeral 24 represents a memory key utilizable to enable the storage operation. When this memory key 24 is slid, a memory switch SR as will be described later is turned on. Reference numeral 25 represents a mount lock groove, reference numeral 26 represents an AF coupler, and reference numeral 27 represents a stop-down lever. When the interchangeable lens assembly LE is mounted on the camera body BD, the mount lock pin 15 on the camera body BD is engaged in the mount lock groove 25, the AF coupler 16 on the camera body BD is engaged in the AF coupler 26 on the lens assembly LE so that the drive of the AF motor built in the camera body BD can be transmitted to the lens assembly LE through the AF couplers 16 and 26 to move a focusing lens group to adjust the photo-taking distance. At the same time, electric terminals J1 to J8 on the camera body are electrically connected with respective terminals J11 to J18 on the lens assembly LE. Also, the stop-down lever 17 on the camera body BD is engaged with the stop-down lever 27 on the lens assembly LE to allow the stop-down lever 27 to move an amount equal to the amount of movement of the stop-down lever 17 on the camera body BD to control a lens aperture to an aperture value dependent on the amount of movement of the stop-down levers 17 and 27.

Reference numeral 28 represents a lens display panel formed on the interchangeable lens assembly LE for providing visual indication of the focal length f, the photo-taking distance D and other information. Reference numeral 80 represents an operating ring for specifying a direction in which powered zooming is to be effected and a speed at which the powered zooming is accomplished.

An electric system used in the camera system embodying the present invention will not be described.

Figure 3B:
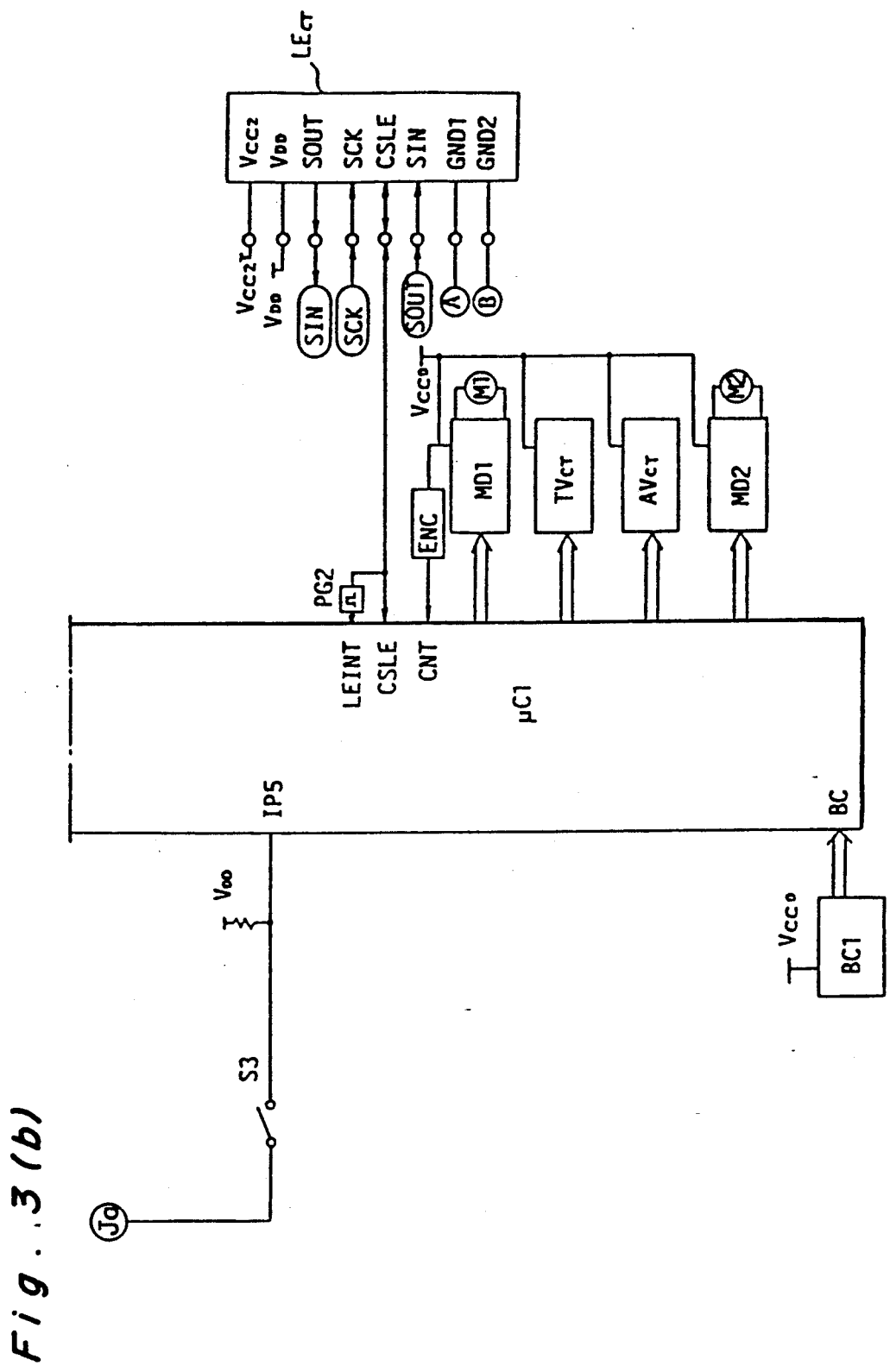
FIG. 3 is a block circuit diagram of an electric system used in the camera body according to the present invention.

FIG. 3 illustrates an electric circuit incorporated in the camera body BD.

Reference character $\mu C1$ represents a microcomputer built in the camera body (hereinafter referred to as a body mounted microcomputer). Reference character $AF_{ct}$ represents a light receiving circuit for focus detection. This light receiving circuit $AF_{CT}$ includes a charge coupled device (CCD) for the focus detection, a drive circuit for CCD and a circuit for processing, effecting an analog-to-digital conversion of, and transmitting an output from CCD to the body mounted microcomputer $\mu C1$ and is connected with the body mounted microcomputer $\mu C1$ through a data bus. This light receiving circuit $AF_{CT}$ for the focus detection is effective to provide information concerning the amount of deviation in focus of a target object lying within a distance measuring area to the body mounted microcomputer $\mu C1$.

Reference character LM represents a light measuring circuit disposed on an optical path leading to the camera viewfinder. This light measuring circuit LM is operable to effect analog-to-digital conversion of a measured light value and to transmit the digital measured light value to the body mounted microcomputer $\mu C1$ as brightness information.

Reference character DX represents a film sensitivity reading circuit for reading a data of the film sensitivity available from a film container and then to serially output it to the body mounted microcomputer $\mu C1$. Reference character DISPC represents a display control circuit adapted to receive both display data and display control signal from the body mounted microcomputer $\mu C1$ and to effect required displays on a display panel $DISP_1$ (shown by 14 in FIG. 2) and a display panel $DISP_{11}$ within the viewfinder.

Reference character CD represents an IC card adapted to be inserted into the card pocket 13. This IC card includes a card mounted microcomputer $\mu C3$. The IC card used in the illustrated embodiment has a function of inter-exposure zooming by which a zooming lens can be driven during exposure. The details of this IC card CD will be discussed later.

Reference character $LE_{CT}$ represents a lens mounted circuit built in the interchangeable lens assembly LE. This lens mounted circuit $LE_{CT}$ provides information peculiar to the interchangeable lens assembly to the body mounted microcomputer $\mu C1$, the details of which will be described later. Reference character M1 represents an AF motor for driving the focusing lens group within the interchangeable lens assembly through the AF couplers 16 and 26 then coupled with each other. Reference character MD1 represents a motor drive circuit for driving the AF motor M1 on the basis of focus detection information and operable in response to a command from the body mounted microcomputer $\mu C1$ to control the AF motor MD1 as to the direction of rotation and the timing of drive thereof.

Reference character ENC represents an encoder for monitoring the rotation of the AF motor M1 and operable to output a pulse to a counter input terminal CNT of the body mounted microcomputer $\mu$C1 for each predetermined angle of rotation of the AF motor M1. The body mounted microcomputer $\mu$C1 counts the number of pulses supplied from the encoder ENC to detect the amount of lens extension from an infinity photo-taking position to a current lens position thereby to detect the photo-taking distance to the target object in reference to the amount of lens extension (the number of repetitive pulses CT).

Reference character $TV_{CT}$ represents a shutter control circuit for controlling a shutter on the basis of a control signal supplied from the body mounted microcomputer $\mu$C1. Reference character $AV_{CT}$ represents an aperture control circuit for controlling the aperture on the basis of a control signal supplied from the body mounted microcomputer $\mu$C1. Reference character M2 represents an electric motor for film wind-up and rewinding and also for effecting a charging of an exposure control mechanism. Reference character MD2 represents a motor drive circuit for driving the motor M2 on the basis of a command supplied from the body mounted microcomputer $\mu$C1.

Hereinafter, a structure associated with an electric power supply will be described. Reference character E1 represents a battery for providing an electric power for the camera body BD. Reference character Tr1 represents a first power supply transistor for supplying an electric power to a portion of the above described circuit. Reference character Tr2 represents a second power supply transistor of MOS structure for supplying an electric power necessary to drive a zoom motor built in the lens assembly.

Reference character DD represents a DC/DC converter for stabilizing a voltage $V_{DD}$ to be supplied to the body mounted microcomputer $\mu$C1 and adapted to operate when a power source control signal PWO is in a high level. Reference character VDD represents an operating power source voltage necessitated by the body mounted microcomputer $\mu$C1, the lens mounted circuit $LE_{CT}$, the card mounted microcomputer $\mu$C3, the film sensitivity reading circuit Dx and the display control circuit DISPC. Reference character $Vcc_1$ represents an operating power source voltage necessitated by the focus detecting circuit $AF_{CT}$ and the light measuring circuit LM, which voltage is supplied from the power source battery E1 through the first power supply transistor Tr1. Reference character $Vcc_2$ represents an operating power source voltage necessitated by the zooming motor built in the lens assembly, which voltage is supplied from the power source battery E1 through the second power supply transistor Tr2 under a control of a power source control signal PW2. Reference character $Vcc_0$ represents an operating power source voltage necessitated by the motor drive circuit MD1, the shutter control circuit $TV_{CT}$, the aperture control circuit $AV_{CT}$ and the motor drive circuit MD2, which voltage is supplied directly from the power source battery E1.

Reference characters D1, D2, D3 represent respective diodes for applying a voltage, lower than the voltage $V_{DD}$, to the body mounted microcomputer $\mu$C1 to minimize a power consumption during a period in which the DC/DC converter DD is held in an inoperative position. This lower voltage than the voltage $V_{DD}$ is of a minimum value required for the body mounted microcomputer $\mu$C1 to operate and only the body mounted microcomputer $\mu$C1 is possible to operate when the DC/DC converter DD is held in the inoperative position.

Reference character BC1 represents a battery check circuit for detecting the voltage $Vcc_0$ and for acknowledging a result of detection to the body mounted microcomputer $\mu$C1. Reference character GND1 represents a ground line of a low power consuming unit, a portion of said ground line between the camera body BD and the lens assembly LE being connected through respective terminals J17 and J7. Although separate ground lines are required for an analog circuit and a digital circuit, respectively, within the camera body BD, only one ground line is shown in the drawing. Reference character GND2 represents a ground line of a large power consuming unit, a portion of said ground line GND2 between the camera body BD and the lens assembly LE being connected through respective terminals J18 and J8.

Various switches employed will now be described.

Reference character $S_{CD}$ represents a normally open push switch for switching over between the availability and the unavailability of the function afforded by the IC card CD when and so long as the IC card CD is mounted. This switch $S_{CD}$ is switched on when the card key 18 is depressed. Reference character S1 represents a photo-taking ready switch adapted to be turned on when the release button 12 is depressed the first stage of depression. When this switch S1 is switched on, an interruption signal is inputted to an interruption terminal INT1 of the body mounted microcomputer $\mu$C1 to initiate preparatory operations required for the actual photo-taking such as the light measurement, the AF operation and so on.

Reference character $S_M$ represents a main switch adapted to be switched on when the slider 11 is in the ON position and off when the slider 11 is in the OFF position. Reference character PG1 represents a pulse generator for outputting a low level pulse each time the switch $S_M$ is switched from an ON position to an OFF position or from the OFF position to the ON position. The output from this pulse generator PG1 is inputted to an interruption terminal INT2 of the body mounted microcomputer $\mu$C1 as an interruption signal.

Reference character S2 represents a release switch adapted to be turned on when the release button 12 is depressed the second stage of depression. When this switch S2 is turned on, the operation associated with the actual photo-taking takes place. Reference character S3 represents a mirror-up switch adapted to be switched on when an upward pivot of a mirror is completed, but off when a shutter mechanism is charged and the mirror is pivoted downwards.

Reference character $S_{RE1}$ represents a battery detecting switch adapted to be turned off when the battery E1 is mounted on the camera body BD. When this switch $S_{RE1}$ is switched off as a result of the mounting of the battery E1, a capacitor C1 is charged through a resistor R1 and a reset terminal RE1 of the body mounted microcomputer $\mu$C1 shifts from a low level state to a high level state, thereby to permit the body mounted microcomputer $\mu$C1 to execute a reset routine as will be described later.

Reference character $S_{RE3}$ represents a card detecting switch adapted to be switched off when the IC card CD is mounted. When this switch $S_{RE3}$ is switched off as a result of the mounting of the IC card CD, a reset terminal RE3 of the body mounted microcomputer $\mu$C1 shifts from a low level state to a high level state as is the case with the above, thereby to permit the body mounted microcomputer μC1 to be reset.

A structure necessary to accomplish a serial data communication will now be described.

The light measuring circuit LM, the film sensitivity reading circuit DX, the display control circuit DISPC and the card mounted microcomputer μC3 communicate serially with the body mounted microcomputer μC1 through various signal lines for a serial input SIN, a serial output SOUT and a serial clock SCK. The circuit with which the body mounted microcomputer μC1 should communicate is selected by chip select terminals CSLM, CSDX, CSDISP and CSCD. In other words, when the terminal CSLM is in a low level state, the light measuring circuit LM is selected; when the terminal CSDX is in a low level state, the film sensitivity reading circuit DX is selected; when the terminal CSDISP is in a low level state, the display control circuit DISPC is selected; and when the terminal CSCD is in a low level state, the card mounted microcomputer μC3 is selected. The three signal lines SIN, SOUT and SCK for the serial communication are connected with the lens mounted circuit LE$_{CT}$ through terminals J15, J5; J14, J4; and J16 and J6 and, when the lens mounted circuit LE$_{CT}$ is to be selected as a circuit with which the body mounted microcomputer μC1 communicate, the terminal CSLE is rendered in a low level state which is transmitted to the lens mounted circuit LE$_{CT}$ through the terminals J3 and J13.

Figure 4:
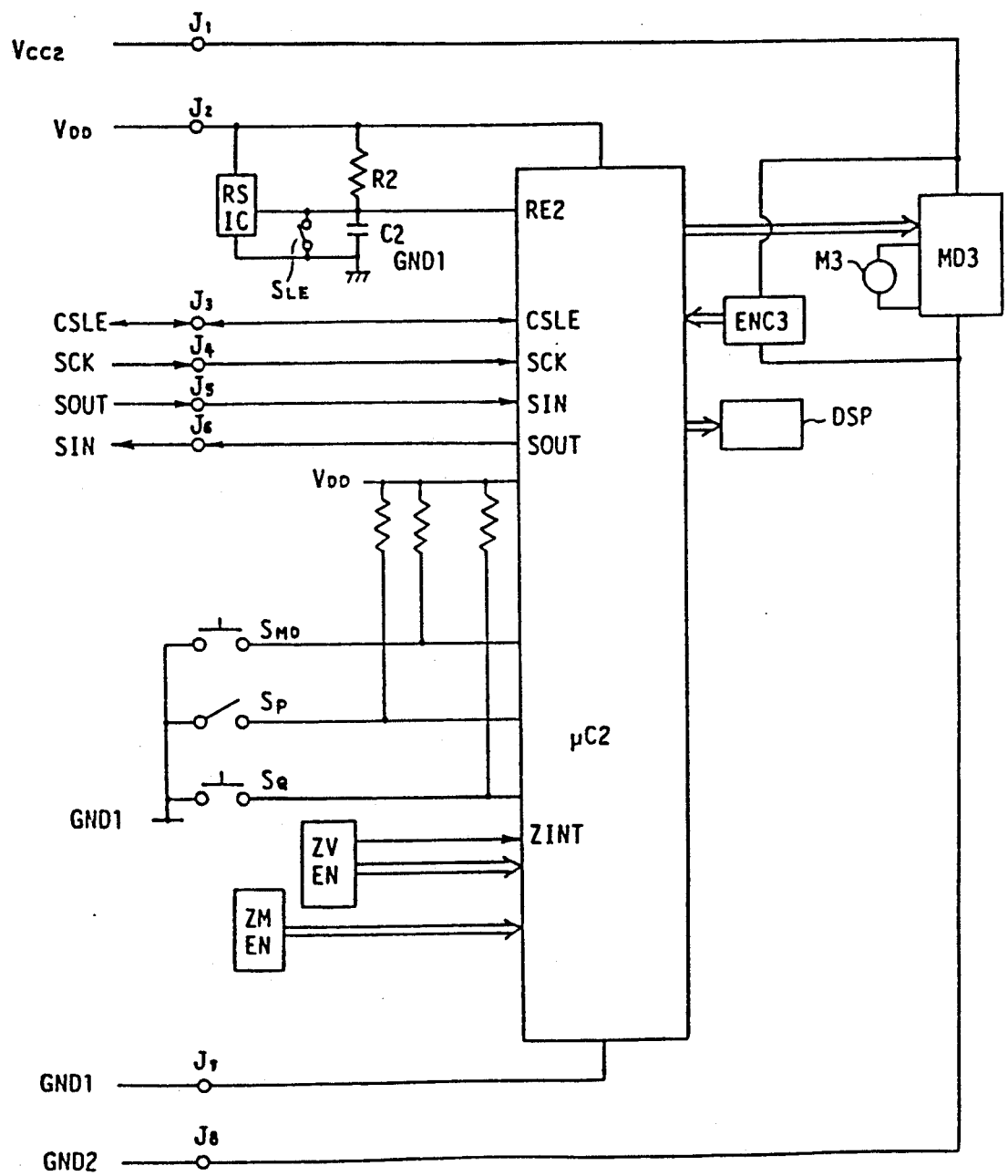
FIG. 4 is a block circuit diagram of an electric system used in the interchangeable lens assembly according to the present invention.

The details of the lens mounted circuit LE$_{CT}$ built in the interchangeable lens assembly LE will be described with reference to FIG. 4. In FIG. 4, reference character μC2 represents a lens mounted microcomputer for controlling the zooming motor built in the interchangeable lens assembly L and for effecting various controls such as the data communication with the camera body BD and mode settings.

To describe the terminals J1 to J8 on the interchangeable lens assembly LE to which the corresponding terminals J11 to J18 on the camera body BD are connected when the former is mounted on the latter, the terminal J1 is a power source terminal for the supply of a power source voltage Vcc2 for the drive of the zooming motor from the camera body to the lens assembly; the terminal J2 is a power source terminal for the supply of the power source voltage V$_{DD}$ for others than the zooming motor from the camera body to the lens assembly; the terminal J3 is an input/output terminal for the inputting and outputting of a signal indicative of a request for the data communication; the terminal J4 is a clock terminal for receiving from the camera body clock signals for the data communication; the terminal J5 represents a serial input terminal for receiving data from the camera body; the terminal J7 represents a ground terminal for circuits other than the motor drive circuit; and the terminal J8 represents a ground terminal for the motor drive circuit.

The signal line associated with the terminal CSLE for the transmission through the terminals J3 and J13 of the lens assembly and the camera body is a bidirectional signal line. When a signal is transmitted from the body mounted microcomputer μC1 to the lens mounted microcomputer μC2 through this signal line, interruption occurs in the lens mounted microcomputer μC2 to start the lens mounted microcomputer μC2 and, at the same time, to specify the interchangeable lens assembly as the circuit with which the camera body communicates. On the other hand, when a signal is transmitted from the lens mounted microcomputer μC2 to the body mounted microcomputer μC1 through this signal line, an interruption signal in putted from the pulse generator PG2 to a lens interruption terminal LEINT of the body mounted microcomputer μC1 to start the body mounted microcomputer μC1. It is to be noted that, when the data is transmitted from the body mounted microcomputer μC1 to the lens mounted microcomputer μC2, the body mounted microcomputer μC1 will not accept the interruption LEINT.

Reference character RSIC represents a resetting IC operable to reset the lens mounted microcomputer μC2 when the voltage V$_{DD}$ supplied from the camera body is lowered to a value lower than the minimum operating voltage required for the lens mounted microcomputer μC2. Reference characters R2 and C2 are a reset resistor and a reset capacitor for resetting the lens mounted microcomputer μC2.

Reference character RE2 represents a reset terminal of the lens mounted microcomputer μC2, to which the voltage V$_{DD}$ is supplied from the camera body for driving the lens mounted circuit. When this terminal RE2 shifts from a low level state to a high level state by the charging action of the resistor R2 and the capacitor C2, the lens mounted microcomputer μC2 performs a resetting operation.

Reference character ZVEN represents a zooming speed encoder operatively associated with the operating ring 80 to set a speed and a direction for a powered zooming when a powered zooming is effected. Reference character ZMEN represents a coarse zooming encoder for indicating the absolute position of a zooming ring as will be described later. The lens assembly used in the illustrated embodiment of the present invention is of a type having a focal length of 28 to 200 mm, in which case the zooming encoder ZMEN is comprised of a code plate expressing 12 focal length ranges in terms of 4-bit data, and brushes held in sliding contact with the code plate. The focal length range of 28 to 34 mm is detected as a single unit focal length range and, each time 15 mm is incremented to the focal length over 34 mm, a respective focal length range is detected as a corresponding unit focal length range.

Reference character MD3 represents a motor drive circuit for driving the zooming motor M3 and operable to control the rotation of the zooming motor M3 in dependence on a control signal indicative of the motor drive direction and the motor drive speed provided from the lens mounted microcomputer μC2. Also, in dependence on a motor stop signal and a motor standstill signal provided from the lens mounted microcomputer μC2, a shortcircuitting between opposite ends of the zooming motor M3 and a stop of the application of an electric voltage are performed individually.

Reference character ENC3 represents an encoder for detecting the amount of rotation of the zooming motor M3 and operable to finely detect the coarse focal length range detected by the zooming encoder ZMEN. The reason for the combined use of the zooming encoder ZMEN and this encoder ENC3 will be described later.

Figure 58:
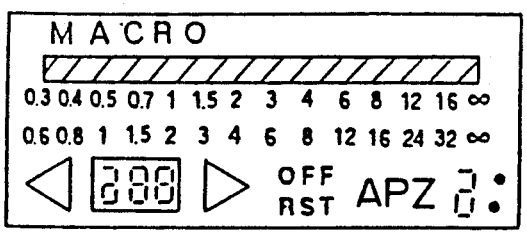
FIG. 58(a) is a schematic diagram showing a pattern of displays viewable on a display window of the interchangeable lens assembly.
FIGS. 58(b) to 58(e) are schematic diagrams showing respective examples of displays viewable on a display window of the interchangeable lens assembly.

Reference character DSP represents a lens mounted display control circuit for causing the lens mounted display panel 28 to display data supplied from the lens mounted microcomputer μC2. Contents to be displayed will be described later with reference to FIG. 58.

Hereinafter, various switches will be described.

Reference character S$_{LE}$ represents a lens mount detecting switch adapted to be switched off when the interchangeable lens assembly LE has been mounted on the camera body BD and then locked. In other words, when the lens assembly LE is removed from the camera body BD, this switch $S_{LE}$ is turned on to shortcircuit the capacitor C2. Thereby, a charge stored on the capacitor C2 is discharged and the terminal RE2 of the microcomputer $\mu$C2 is brought into a low level state. When the lens assembly LE is subsequently mounted on the camera body BD, the switch $S_{LE}$ is turned off allowing the capacitor C2 to be charged through the power source line $V_{DD}$ and, after a predetermined time determined by the resistance of the resistor R2 and the capacitance of the capacitor C2, the terminal RE2 is brought into a high level state to allow the microcomputer $\mu$C2 to perform the resetting operation as hereinbefore described.

Reference character $S_{MD}$ represents a mode switch adapted to be turned on when the mode key 23 is depressed. Each time this switch is turned on, one of a first automatic program zooming mode (APZ1 mode), a two-point automatic program zooming mode (APZ2 mode), a reset mode (RST mode) and a manual zooming mode (M.Z mode) is sequentially selected in the order given above. The APZ1 mode is a mode for automatically determining a photo-taking magnification according to the camera-to-object distance. The APZ2 mode is a mode for performing a zooming by linearly changing the photo-taking magnification according to such distance with respect to the distance between two points selected by a photographer. The reset mode is a mode for automatically returning to the photo-taking distance and the focal length both stored at a certain timing. The manual zooming mode is a mode in which nothing other than a powered zooming is performed. It is to be noted that, during the reset mode, only the above described photo-taking distance and the focal length are set. The automatic return to such photo-taking distance and such focal length once set is carried out when a lens switch $S_Q$ is manipulated during the manual zooming mode.

Reference character $S_Q$ represents a lens switch which is a normally open push switch adapted to be manipulated for the storage of the two-point distance during the APZ2 mode, the storage of the one-point distance during the reset mode and the automatic return subsequent to the storage.

Reference character $S_R$ represents a memory switch adapted to be turned on when the memory key 24 is slid and to be manipulated when the storage is to be performed under any one of the APZ1 mode and APZ2 mode or when the storage is released.

Figure 59:
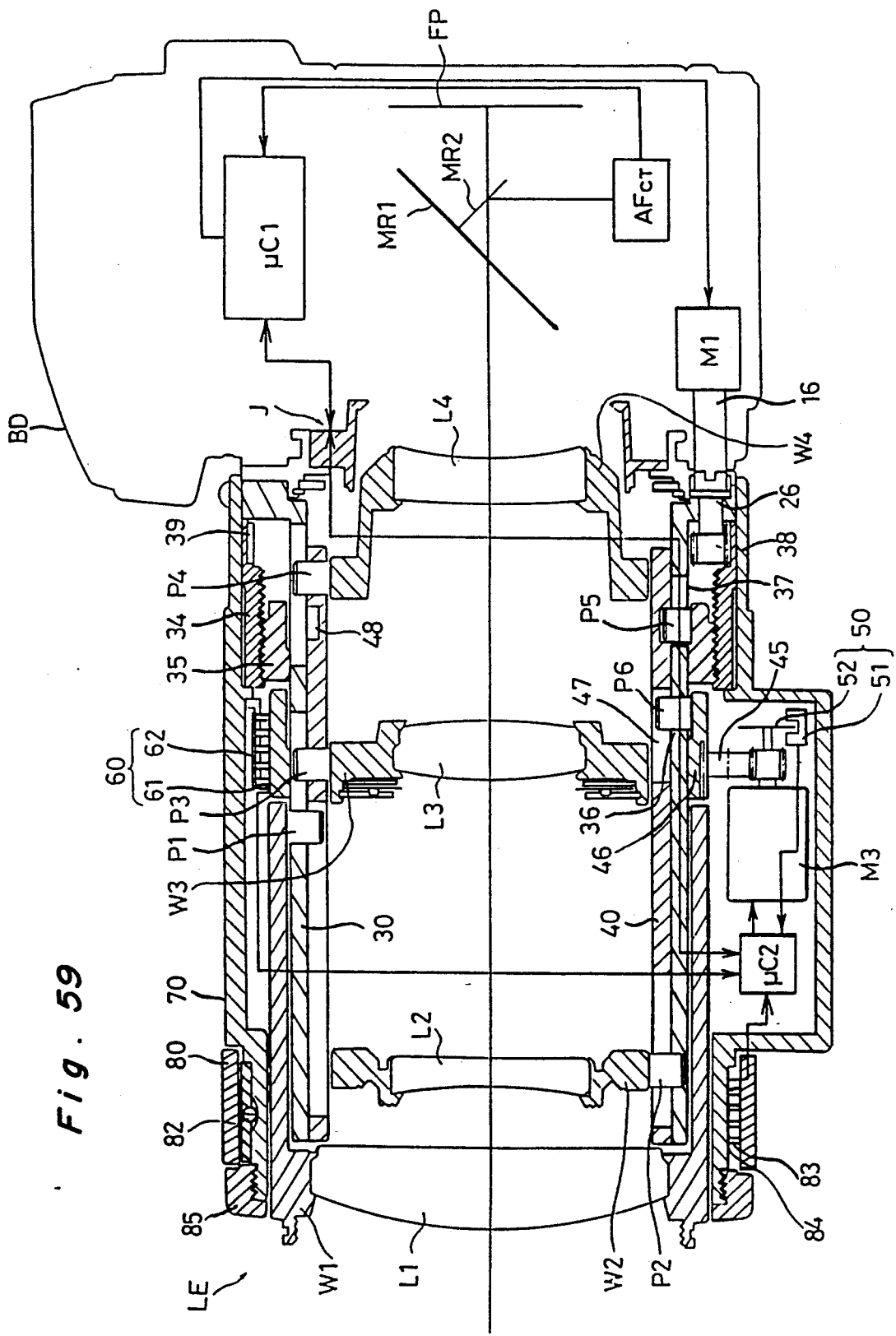
FIG. 59 is a longitudinal sectional view of the camera system including the camera body and the interchangeable lens assembly.
Figure 60:
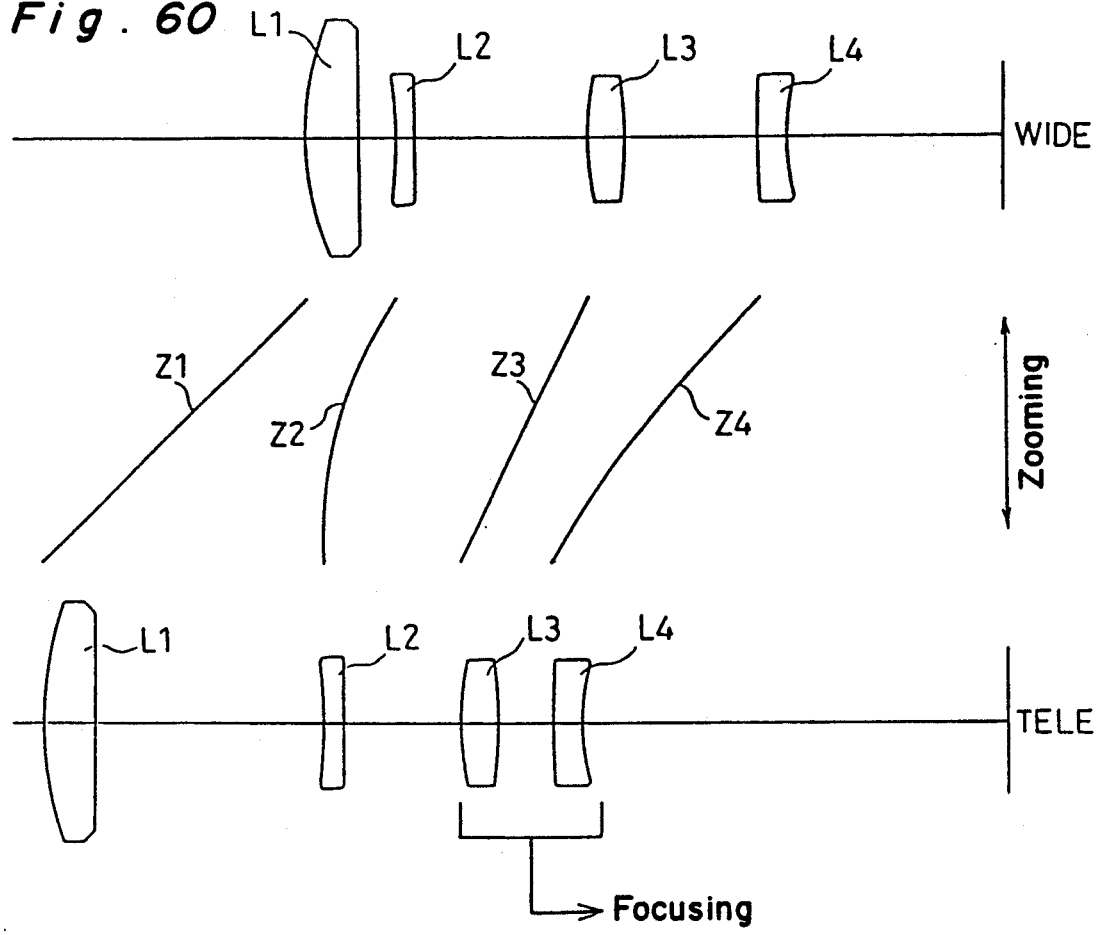
FIG. 60 is a schematic diagram used to illustrate the operation of an optical system used in the interchangeable lens assembly.

Referring now to FIG. 59, there is shown a longitudinal section of the interchangeable lens assembly LE and a schematic structure of the camera body BD on which the interchangeable lens assembly LE is mounted. The interchangeable lens assembly LE shown therein is a varifocal lens assembly including first to fourth lens groups L1 to L4. FIG. 60 is an explanatory diagram used to describe the amount of drive of any one of the first to fourth lens groups L1 to L4. In this figure, curves Z1 to Z4 represent respective traces of movement of the first to fourth lens groups L1 to L4 during the zooming. The horizontal direction represents the direction of an optical axis of the lens assembly while the vertical direction represents a change in focal length incident to the zooming. An upper portion of the figure illustrates an arrangement of the first to fourth lens groups L1 to L4 when the focal length is on a wide side (the smallest focal length) whereas a lower portion of the figure illustrates an arrangement of the first to fourth lens groups L1 to L4 when the focal length is on a tele side (the longest focal length). At any zooming position intermediate between the wide and tele sides, the first to fourth lens groups L1 to L4 can be driven in operatively associated relationship so that the first to fourth lens groups L1 to L4 can be brought to respective positions represented by the curves Z1 to Z4 and an arbitrarily chosen horizontal line. Thus, the first to fourth lens groups L1 to L4 can be movable independent of each other between the smallest focal length position and the longest focal length position to accomplish the zooming. A focusing occur when the third and fourth lens groups L3 and L4 are moved along the optical axis in unison with each other.

The optical system is of a varifocal type wherein the position of focus tends to displace or deviate once the zooming is carried out and, therefore, arrangement has been made to compensate for the focus deviation by moving the focusing lens groups L3 and L4 each time the zooming is effected. In general, as compared with a ordinary zoom lens assembly wherein no focus deviation occur even when the zooming is effected, the varifocal system has compact and light-weight features for a given zooming ratio and also has an advantage in that the minimum photo-taking distance can be reduced. In view of the foregoing, if the varifocal system is so designed that, each time the zooming is effected, the focus deviation can be automatically compensated for, the varifocal system would be handled easily in a manner similar to the ordinary lens assembly and, yet, would be superior to the ordinary lens assembly as to the design specification.

Hereinafter the structure and operation of the interchangeable lens assembly LE will be described.

Figure 61:
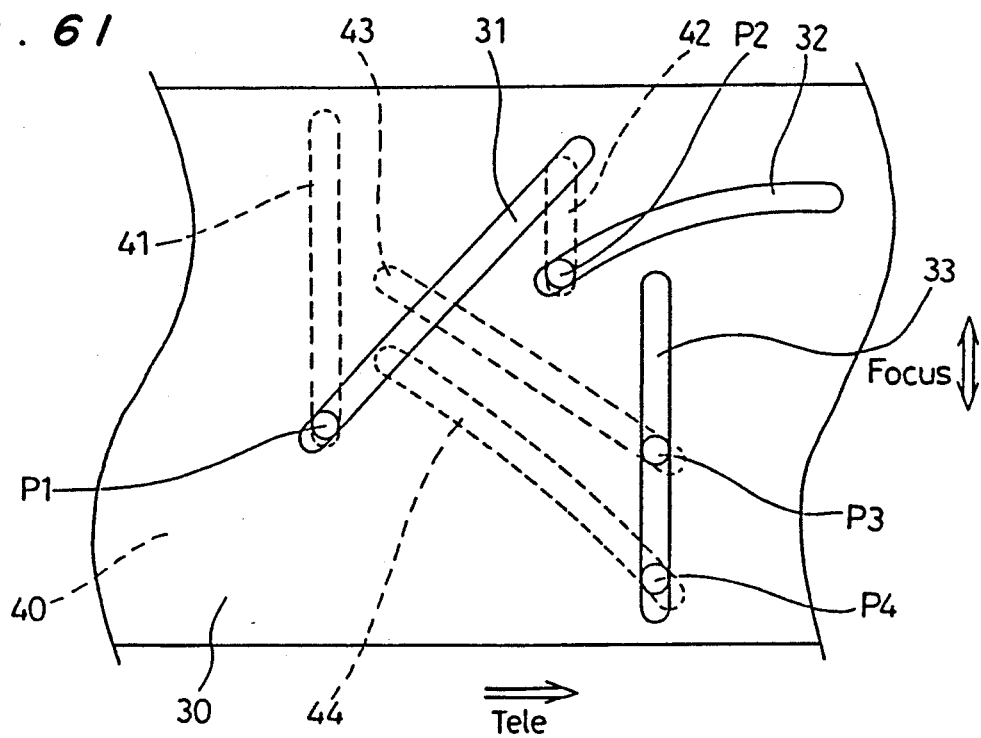
FIG. 61 is a schematic diagram showing a cam ring used in the interchangeable lens assembly, which cam ring is shown as developed in a plane.

Referring to FIG. 59, reference characters W1 to W4 represent respective movable lens barrels for the support of the respective first to fourth lens groups L1 to L4. Pins P1 to P4 rigidly mounted on the respective lens barrels W1 to W4 are positioned at respective intersecting points between cam grooves defined in a fixed cam ring 30 and corresponding cam grooves defined in a movable cam ring 40 and are therefore restricted from undergoing any arbitrary motion. These cam rings 30 and 40 are shown in FIG. 61 in the form as developed in a plane. In this figure, solid lines 31 to 33 represent the respective cam grooves defined in the fixed cam ring 30 and associated respectively with the first lens group, the second lens group and both of the third and fourth lens groups, noting that the third and fourth lens groups share a common straight cam groove shown by 33. Reference numerals 41 to 44 represent the respective cam grooves defined in the movable cam ring 40 and associated respectively with the first to fourth lens groups. So far shown therein, the lens assembly LE is in the position of smallest focal length and, when the movable cam ring 40 is turned about the optical axis, the cam grooves 41 to 44 move in a direction shown by the arrow Tele, to move or extend the first to fourth lens groups L1 to L4 towards the Tele side. It is to be noted that, during this movement, the first and second lens groups L1 and L2 are rotated about the optical axis while the third and fourth lens groups L3 and L4 are linearly moved without being rotated. On the other hand, during the focusing, the movable cam ring 40 is moved in a direction parallel to the optical axis (as shown by the arrow Focus); the first and second lens groups L1 and L2 do not move because the associated cam grooves 41 and 42 are straight, and the third and fourth lens groups L3 and L4 move together with the cam grooves 43 and 44 in a direction parallel to the optical axis.

Referring to FIG. 59, reference numeral 80 represents a rotary operating ring for the powered zooming. When a photographer rotates the operating ring 80 about the optical axis, the powered zooming is initiated and, depending on the amount of rotation thereof, the focusing speed or the zooming speed is varied, but when the photographer releases his or her hand from the operating ring 80, the operating ring 80 can be automatically returned to the initial position by the action of a spring 82 thereby terminating the powered zooming. The direction of powered zooming can be determined in dependence on the direction of rotation of the operating ring 80.

A focusing mechanism will now be described. Reference numeral 35 represents an axially movable ring for the focusing and a helicoid screw is formed on the outer peripheral surface thereof. This helicoid screw is engaged with a helicoid screw formed on an inner surface of the focusing ring 34. The axially movable ring 35 has its inner surface formed with a transmission pin P5 which is axially movably engaged in a axially straight guide groove 37 defined in the fixed cam ring 30. Accordingly, while the axially movable ring 35 is movable in a direction parallel to the optical axis, it will not rotate relative to the fixed cam ring 30. On the other hand, the focusing ring 34 is rotatable relative to the fixed cam ring 30, but the focusing ring 34 will not move in a direction parallel to the optical axis because of its engagement in a groove defined in an inner surface of a fixed barrel 70. For this reason, when the focusing ring 34 is rotated, the axially movable ring 35 is moved straight in a direction parallel to the optical axis. In other words, when the focusing ring 34 is rotated in one direction, the axially movable ring 35 undergoes a forward movement, but when the focusing ring 34 is rotated in the opposite direction, the axially movable ring 35 undergoes a rearward movement. This focusing ring 34 can be driven by the rotary force transmitted from the camera body BD through the AF couplers 26 and 16. The AF coupler 26 on the lens assembly LE is provided with a pinion 38 at a front end thereof which is engageable with an inner gear 39 formed on a rearmost portion of an inner peripheral surface of the focusing ring 34. The AF coupler 26 has its rear end face formed with a groove in which a projection formed on a front end of the AF coupler 16 on the camera body BD is engageable for the transmission of the rotatory force from the camera body BD to the lens assembly LE. The rotation of the AF coupler 16 on the camera body BD is controlled by the AF motor M1 which is placed under the control of the body mounted microcomputer $\mu$C1.

Imagewise rays of light carrying an image of the target object which have passed through the lens assembly are guided partly by a main mirror R1 towards a viewfinder optical system (not shown) on the top of the camera body BD and partly passed through the main mirror MR1 towards a sub-mirror MR2 which directs that portion of the imagewise rays of light towards the light receiving circuit AF$_{CT}$ positioned beneath a mirror box. Reference character FP represents an image plane where a film is disposed and a focal plane shutter (not shown) is arranged in front of such image plane. The light receiving circuit AF$_{CT}$ is disposed in the vicinity of an expected image forming plane equivalent to the film positioned image plane for detecting, in reference to the imagewise rays of light, a focused condition of a photo-taking lens and then to provide signals indicative of the amount of defocus and the defocusing direction to the body mounted microcomputer $\mu$C1. The body mounted microcomputer $\mu$C1 controls the rotation of the AF motor M1 in dependence on these signals.

A mechanism for the powered zooming will then be described. The rotation of the movable cam ring 40, that is, the zooming, can be accomplished by rotating the operating ring 80 and a signal indicative of the rotation of the operating ring 80 is transmitted to the lens mounted microcomputer $\mu$C2 to drive the zooming motor M3. The rotation of the zooming motor M3 can be transmitted to a zooming ring 46 through a gear 45. The zooming ring 46 has a rear inner peripheral surface provided with a rotation transmitting pin P6 which is movably engaged in a circumferentially extending guide groove 36 defined in the fixed cam ring 30. Accordingly, while the zooming ring 46 is rotatable, it does not move in a direction parallel to the optical axis. On the other hand, the rotation transmitting pin P6 has its tip inserted into a straight guide groove 47 defined in the movable cam ring 40. When the zooming ring 46 is rotated, the rotation force thereof can be transmitted to the movable cam ring 40 through the transmission pin P6 and the straight guide groove 47 to rotate the movable cam ring 40, however, the transmission pin P6 is movable in a longitudinal direction of the straight guide groove 47 and is not in position to restrict the straight movement of the movable cam ring 40. The movable cam ring 40 has a rear end portion of the outer peripheral surface thereof formed with a circumferentially extending guide groove 48 into which a straight transmission pin P5 on the focusing ring 35 is engaged. Accordingly, the movable cam ring 40 can be moved straight through the transmission pin P5 and the circumferentially extending guide groove 48 in response to a straight movement of the straight ring 35 incident to the rotation of the focusing ring 34 and rotated about the optical axis through the transmission pin P6 and the straight guide groove 47 incident to the rotation of the zooming ring 46.

In the meantime, in the case of the varifocal system, the photo-taking distance tends to vary with a change in focal length resulting from the zooming. Accordingly, when an attempt is made to focus the target object at the initial distance apart from the camera system even after the zooming, a focus correction is required and, for this purpose, one has to know the current focal length. Since the angle of rotation of the movable cam ring 40 from a reference position (for example, the Wide position) corresponds to the focal length, the current focal length can be determined if one knows the angle of rotation of the movable cam ring 40. For this reason, as hereinbefore described, the two encoders 50 (ENC3 shown in FIG. 4) and 60 (ZMEN shown in FIG. 4) are employed to determine the angle of rotation of the movable cam ring 40. Information from the encoders 50 and 60 is supplied to the lens mounted microcomputer $\mu$C2 and a correction value corresponding to the focal length is transmitted through the contact terminal group J to the body mounted microcomputer $\mu$C1. The body mounted microcomputer causes the AF motor M1 to rotate to move the focusing lens groups L3 and L4 for the purpose of compensating for the focus deviation thereby to avoid any possible deviation in focus which would occur as a result of the zooming.

FIG. 62 illustrates a perspective view, on an enlarged scale, of the encoder 50 for the detection of the number of revolution of the zooming motor M3. This encoder 50 is comprised of a photo-interrupter 51 and an encoder plate 52. The photo-interrupter 51 is in the form of a combination of light emitting element and light receiving element disposed in face-to-face relationship with each other so that, in the absence of any obstruction on the path of travel of light from the light emitting element towards the light receiving element, the light receiving element can receive a light signal e from the light emitting element to provide a light output, but in the presence of any obstruction on the path of travel of light, the light receiving element will receive no light signal from the light emitting element to cease the generation of the light output. The encoder plate 52 is in the form of a disc mounted on a drive shaft of the zooming motor M3 and having its outer peripheral portion formed with radially inwardly extending slots leaving corresponding blades two on each side of the respective slot. This encoder plate 52 is so designed and so positioned that, the blades of the disc can be alternately brought into the optical path between the light emitting element and the light receiving element of the photo-interrupter 51. Accordingly, each time the zooming motor M3 is rotated a predetermined angle, the light receiving element of the photo-interrupter 51 provides the light output in the form of a pulse signal and, therefore, when the number of the pulse signals is counted, the angle of rotation of the zooming motor M3 can be determined.

FIG. 63 illustrates a perspective view, on an enlarged scale, of the coarse encoder 60 for the detection of the angle of rotation of the zooming ring 46. This encoder 60 comprises a code plate 61 and a brush 62. The code plate 61 is in the form of a flexible printed circuit plate fixed to the outer peripheral surface of the zooming ring 46 and having five printed code stripes extending circumferentially of the zooming ring 46. The brush 62 is made of elastic electroconductive plate fixed to the inner surface of the fixed barrel 70 and includes five contact feelers so far illustrated in the embodiment. The feelers are slidingly engaged to the respective code stripes printed on the code plate 62. Each of the printed code stripes has an electrically conductive area and an electrically non-conductive area both in a direction circumferentially of the zooming ring 46. When each of the feelers is engaged with the electrically conductive area or the electrically non-conductive area of the associated code stripe, a logic value of "1" or "0" can be obtained and, therefore, 5-bit digital data can be obtained from the code plate 61 according to the angle of rotation of the zooming ring 46.

The reason for the combined use of the two encoders 50 and 60 will now be discussed. Since the lens system used in the illustrated embodiment is a varifocal optical system, any change in focal length resulting from the zooming operation results in a change in the focusing condition as hereinbefore described. While in the illustrated lens system the change in photo-taking distance is designed to be compensated for by the calculation which takes place within the lens assembly, it is necessary for the current focal length to be transmitted to the lens mounted microcomputer μC2 for this purpose. Also, in order to accomplish an accurate correction calculation, the focal length has to be detected at high resolution. According to the conventional zooming lens system, no high precision is required so much as in the varifocal system and therefore, the focal length has been detected roughly by the use of the coarse encoder 60. However, the precision required by the illustrated lens system will not be accomplished only by the use of the finely divided code stripes on the code plate 61 of the encoder 60. Therefore, a photo-interrupter generally used for the detection of the amount of drive of the AF motor M1 in the conventional camera body is mounted on the lens assembly so that the number of revolution of the zooming motor M3 can be determined according to the number of output pulses from the photo-interrupter thereby to accurately detect the angle of rotation of the zooming ring 46. Assuming that the angle of rotation of the zooming ring 46 faithfully corresponds to the focal length, the focal length be accurately detectable.

In the meantime, if an encoder for the detection of the focal length is formed with the use of only the encoder 50 shown in FIG. 62, the resolving power will be increased as compared with the encoder 60 shown in FIG. 63, however, the following problem will occur. In other words, while the encoder 60 directly reads the amount of rotation of the zooming ring 46, the encoder 50 reads the amount of rotation of the zooming ring 46 after the angle of rotation of the zooming ring 46 has been increased by means of a reduction gear mechanism to a value approximating to the angle of rotation of the drive shaft of the zooming motor M3 and, therefore, an error tends to occur as a result of a backlash or a similar phenomenon. Also, since the encoder 50 is designed to read the focal length in terms of the number of pulses from either the Tele side or the Wide side, errors resulting from, for example, the backlash phenomenon will accumulate and it will become very difficult to know the absolute value of the focal length if 1,000 pulses exists between the Wide side (the position of the smallest focal length) and the Tele side (the position of the largest focal length). Therefore, the encoders 50 and 60 are concurrently employed to increase the resolving power in such a way that the absolute position of the zooming ring 46 can be detected by the encoder 60 while the encoder 50 is used to finely divide a region corresponding to a code output from the encoder 60 to provide an accurate and precise focal length. In other words, each time the reading from the code plate 61 varies, a counter for counting the output pulses from the photo-interrupter 51 is reset to zero so that it can count the number of output pulses generated from the photo-interrupter 51 with respect to the region corresponding to the reading from the code plate 61. If the storage is made of what amount of change in focal length corresponds to one pulse outputted from the photo-interrupter within the region corresponding to each reading from the code plate 61. The encoder design having a high resolving power as a whole can be attained.

Figure 65:
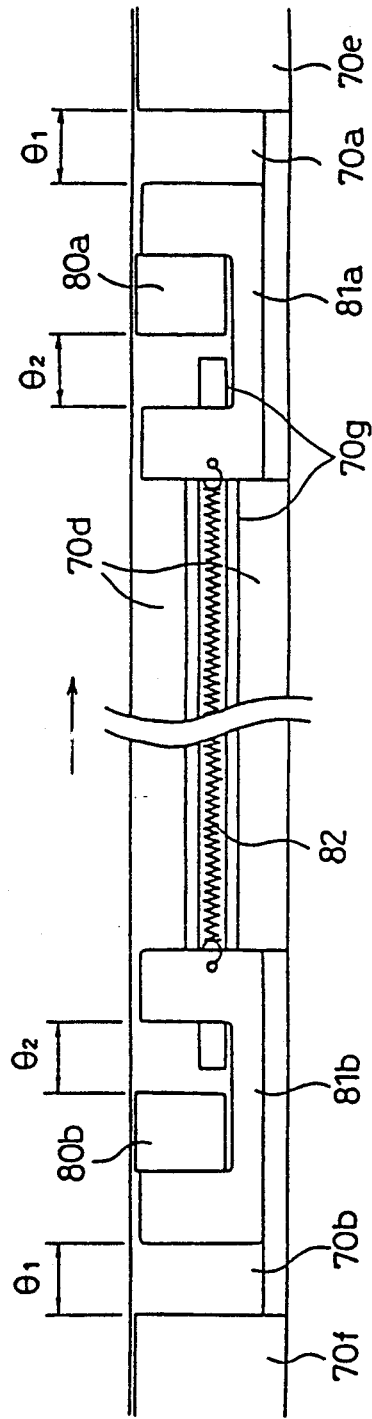
FIG. 65 is a schematic diagram showing an essential portion thereof as developed in a plane.
Figure 66:
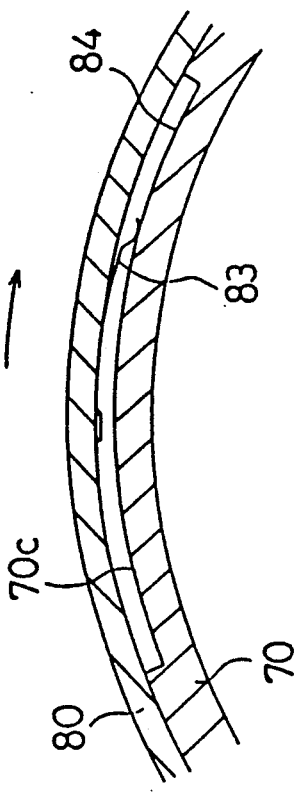
FIGS. 66(a) and 66(b) are schematic plan and sectional views, respectively, of an electric switch unit used in association with the operating ring shown in FIG. 64.
Figure 66:
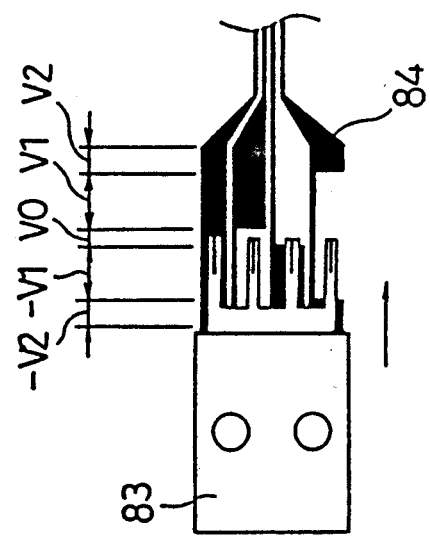

FIG. 64 illustrates an exploded view used to explain a structure of the automatically returnable operating ring 80, and FIG. 65 illustrates a plan development of the operating ring 80 in a circumferential direction. FIGS. 66(a) and 66(b) are plan and sectional views, respectively, used to explain an electric switch arrangement used in the operating ring 80. In these figures, reference numeral 70 represents the fixed barrel; reference numeral 80 represents the operating ring; reference numerals 80a and 80b represent radially inwardly extending projections, respectively; reference numerals 81a and 81b represent generally channel-shaped members, respectively, reference numeral 82 represents a coil spring for the automatic return of the operating ring 80; reference numeral 83 represents a brush; and reference numeral 84 represents a code plate.

The generally channel-shaped members 81a and 81b are positioned in reduced-diameter portions 70a and 70b of the fixed barrel 70 and are pulled close towards each other by the coil spring 82 disposed along a guide groove 70g, until they are brought into contact with an end face of a large-diameter portion 70d of the fixed barrel 70. The operating ring 80 has its inner periphery engaged in large-diameter portions 70d, 70e and 70f in the fixed barrel 70 with the radially inwardly extending projections 80a and 80b loosely extending into respective space delimited in the generally channel-shaped members 81a and 81b. As shown in FIG. 65, the radially inwardly extending projections 80a and 80b are adapted to be brought into contact with an end face exteriorly of the space in the channel-shaped members 81a and 81b, respectively. The operating ring 80 is retained in position by a ring member 85 screwed onto the fixed barrel 70.

When the operating ring 80 is held on a hand and is subsequently rotated in a direction shown by the arrow from a condition shown in FIG. 65, the generally channel-shaped member 81a engaged by the radially inwardly extending projection 80a is rotated against the tension force of the coil spring 82 over the reduced-diameter portion 70a in a direction shown by the arrow until it is brought into engagement with the end face of the large-diameter portion 70e, thereby achieving the rotation through an angle $\theta 1$. At this time, the radially inwardly extending projection 80b moves simultaneously within the generally channel-shaped space in the generally channel-shaped member 81b. However, since the angle $\theta 1$ is so designed as to be smaller than an angle $\theta 2$, no restriction acts between the radially inwardly extending projection 80b and the channel-shaped member 81b. When the photographer subsequently leaves his hand from the operating ring 80, the operating ring 80 can be rotated in a reverse direction by the action of the coil spring 82 to assume the initial position. A similar description applies even in the direction counter to the direction shown by the arrow, and the operating ring 80 is rotatable from a neutral position in any one of the opposite directions through a respective angle $\theta 1$ and the release of the photographer's hand therefrom can result in an automatic return of the operating ring 80 back to the neutral position.

In order to render this operating ring 80 to act as an electric switch, as shown in FIGS. 66(a) and 66(b), a brush 83 is fixed to the inner peripheral surface of the operating ring 80 by the use of a clamping technique, and a code plate 84 in the form of a flexible printed circuit board is disposed on the reduced-diameter portion 70c of the fixed barrel 70. In a condition shown in FIG. 65, the brush contact lies within a range of "V0" shown in FIG. 66(a), in which condition the electric switch is in an OFF state. When starting from the condition of FIG. 66(a) the operating ring 80 is rotated in a direction shown by the arrow, the brush 83 slides over the code plate 84, entering a range of "V1" and then a range of "V2". In this way, as an output signal from the code plate 84, two types of information can be inputted to the lens mounted microcomputer $\mu C2$. Based on this information, the lens mounted microcomputer $\mu C2$ controls the zooming motor M3 to drive at a first speed when the brush 83 is in the range of "V1" and at a second speed when the brush 83 is in the range of "V2". Similarly, even when the operating ring 80 is rotated in the opposite direction, the lens mounted microcomputer $\mu C2$ controls the zooming motor M3 to drive at a first speed in the opposite direction when the brush 83 is in the range of "$-V1$" and at a second speed in the opposite direction when the brush 83 is in the range of "$-V2$". Also, the same information can be transmitted from the lens mounted microcomputer $\mu C1$ to the body mounted microcomputer $\mu C1$ to control the AF motor M1.

It is to be noted that, although in the illustrated embodiment the electric switch has been described as designed to provide two variable speeds of the zooming motor M3 in one direction of rotation of the operating ring 80, three or more variable speeds may be available by suitably selecting the number of legs of the brush 83 in combination with a pattern on the code plate 84.

While the foregoing description is directed to the hardware aspect of the camera system embodying the present invention, a software aspect of the camera system will be hereinafter described. To begin with, the software for the body mounted microcomputer $\mu C1$ will be described.

Figure 5B:
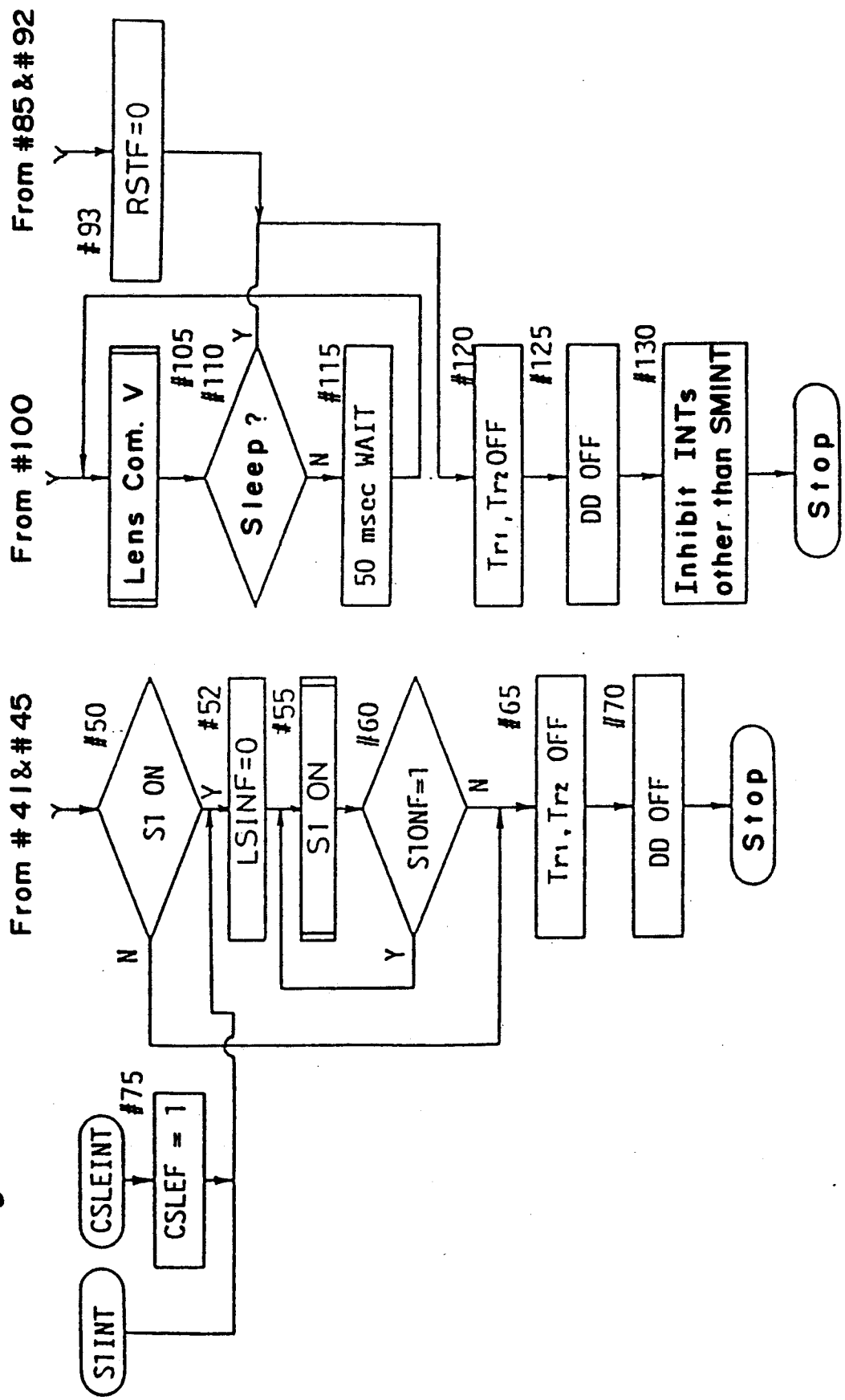

When the battery E1 is mounted on the camera body BD with the battery detecting switch $S_{RE1}$ (FIG. 3) consequently switched off, the capacitor C1 for the resetting is charged through the resistor R1 and a reset signal varying in level from a low level state to a high level state is applied to the reset terminal RE1 of the body mounted microcomputer $\mu C1$ used to control the overall sequence of the camera system as a whole. In response to this reset signal, the body mounted microcomputer $\mu C1$ initiates a generation of clocks by means of an internal hardware and, at the same time, drives the DC/DC converter DD, is supplied with the voltage $V_{DD}$ of a value sufficient for it to be driven, and executes a reset routine shown in FIG. 5. It is to be noted that, during a hold condition as will be described later, although the generation of the clocks for the body mounted computer $\mu C1$ is interrupted with the DC/DC converter DD held in an inoperative position, a control starting from the inoperative position according to an interruption is such that, as is the case with the mounting of the battery on the camera body, the generation of the clocks and the initiation of operation of the DC/DC converter DD are initiated by the internal hardware of the body mounted microcomputer $\mu C1$.

According to the reset routine shown in FIG. 5, all of the interruptions are disabled at step #5 and subsequently, various ports and registers are reset at step #15, followed by a setting at step #15 of a flag RSTF indicative of the passage through the reset routine. Then, at step #20, a decision is made to determine if the main switch $S_M$ has been turned on. Even when the main switch $S_M$ changes over from an ON state to an OFF state or from the OFF state to the ON state, an interruption SMINT resulting from the manipulation of the main switch is executed from step #20. If the main switch $S_M$ has been switched at step #20, all of the interruption are enabled at step #25 and the flag RSTF indicative of the passage through the reset routine is reset at step #30 and, thereafter, the power source control terminal PW1 and PW2 (output ports) are rendered in a high level state at step #30 so that the transistors Tr1 and Tr1 can be switched on for the supply of an electric power to the various circuit components and the lens assembly.

Figure 6:
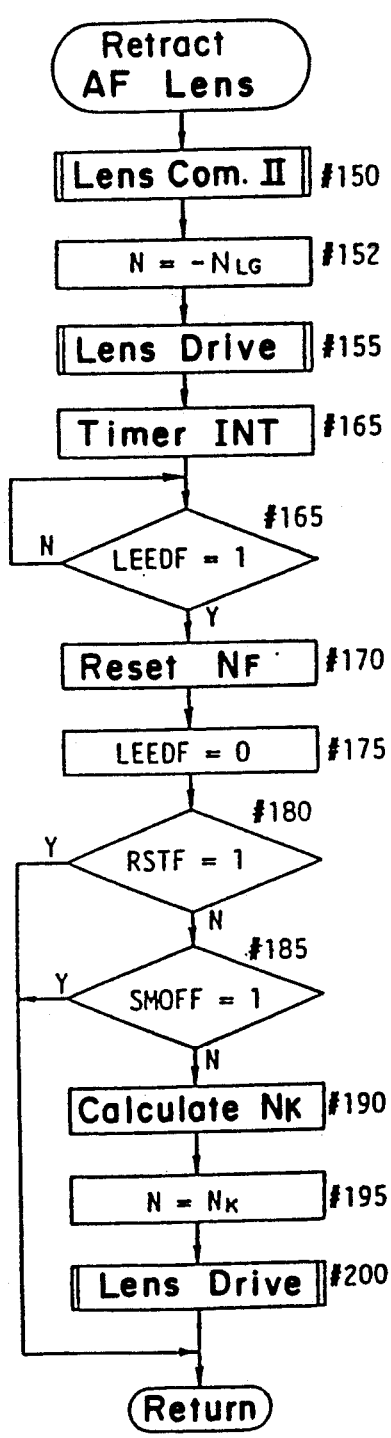

Then, at step #40, a subroutine for the retraction of the AF lens assembly is executed. This subroutine is shown in FIG. 6. When this subroutine is called for, a subroutine for a Lens Communication II is executed at step #150.

Figure 11:
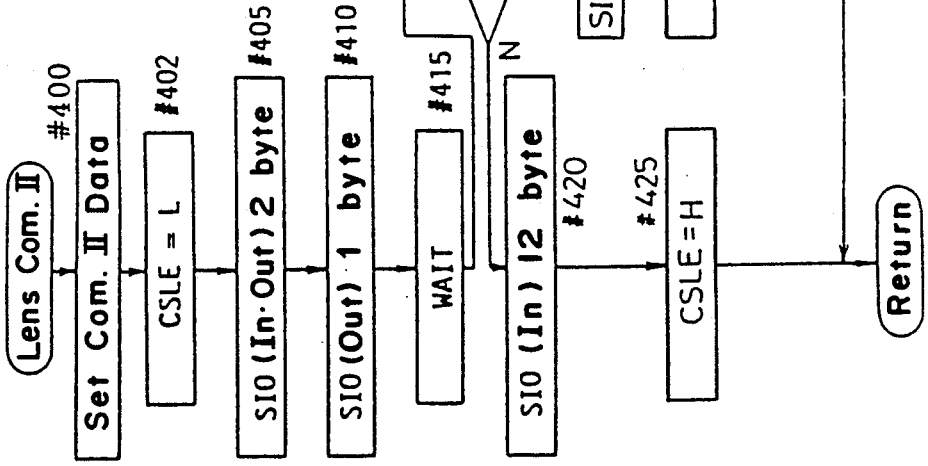

The Lens Communication II is a communication mode during which data from a brand-new lens assembly (hereinafter referred to as a new lens assembly) described in connection with the illustrated embodiment are inputted during a communication mode with the lens assembly. This subroutine is shown in FIG. 11. When this subroutine is called for, and at step #400, data indicating that the communication mode is a mode II are set, and the terminal CSLE is rendered in a low level to acknowledge the lens assembly that the data communication takes place at step #402. Then, 2-byte serial communication takes place at step #405. At this time, the camera body and the lens assembly communicates serial data with each other and one of them receive data which have been inputted serially from the other of them. The first byte represents the type of the camera body which is outputted from the camera body. At this time, insignificant data $FF_H$ (the suffix "H" represents a hexadecimal number) are outputted from the lens assembly and one of the lens assembly and the camera body receives data which have been supplied from the other of them. The second byte represents the type of the lens assembly (i.e., old/new lens assembly, and others) which is outputted from the lens assembly. At this time, insignificant data $FF_H$ is outputted from the camera body and one of the lens assembly and the camera body receives data which have been supplied from the other of them. Then, in order to indicate that the mode of communication with the lens assembly is the mode II, one-byte data of the communication mode set as hereinbefore described is outputted to the lens assembly and, after a wait, a decision is made to determine if the lens assembly is a old model. If the lens assembly is found to be an old model, 6-byte data is inputted from the lens assembly, rendering the terminal CSLE to be in a high level state, followed by a return as shown from step #416 to #418. If the result of decision at step #416 indicates that the lens assembly is a new model, 12-byte data is inputted from the lens assembly, rendering the terminal CSLE to be in a high level state, followed by a return as shown from step #410 to #425.

Contents of the data communicated between the lens assembly and the camera body in the illustrated embodiment will now be described.

During the lens communication with the old lens assembly, data peculiar to the lens assembly are transmitted from the lens assembly to the camera body and they contains (i) a full aperture value AVo, (ii) a maximum aperture value AVmax, (iii) a coefficient $K_L$ of conversion between the defocus amount and the drive amount, (iv) the focal length f, (v) the lens mount signal and (vi) a coefficient $K_N$ of conversion of the amount of extension and the distance.

The lens communication with the new lens assembly includes modes I to V of lens communication, each of which will now be described.

During the lens communication mode I, a data indicative of a mode of retraction of a zoom lens is transmitted from the camera body to the lens assembly.

During the lens communication mode II, those data as indicated by (i) to (vi) above are transmitted from the lens assembly to the camera body as the data peculiar to the lens assembly and, at the same time, data indicative of conditions of the lens assembly such as (vii) the state of the lens switch $S_Q$, an automatic program zooming mode, ON/OFF of the zooming switch, (viii) the minimum focal length fmin, (ix) the maximum focal length fmax, (x) a target focal length fc during the APZ mode, (xi) data for the display in the viewfinder such as a data (1-bit) indicative of whether or not a setting has been completed while the zooming mode is a reset mode, a data (1-bit) indicative of the presence or absence of a warning data during the APZ1 mode, data (2-bits) indicative of the set state (non-set, 1-point set or 2-point set) during the APZ2 mode, and (xii) a correction amount Mf for the focusing lens when the zooming is carried out are transmitted.

During the lens communication mode III, such data as (xiii) whether or not the zooming is enabled or inhibited, the presence or absence of resetting, the presence or absence of an in-focus condition, (xiv) the amount N of extension from the infinity photo-taking position $N_F$, and (xv) the focal length f are transmitted from the camera body to the lens assembly.

During the lens communication mode IV, a signal indicating that, when a zooming control during the exposure is effected, the terminal CSLE varies in level to the low level state is supplied from the camera body to the lens assembly.

During the lens communication mode V, such data as (xvi) whether a sleep is enabled or inhibited is supplied from the lens assembly to the camera body.

Each of the foregoing data (i) to (xvi) is inputted or outputted in the form of a 1-byte data.

Referring to the flowchart of FIG. 6, the count of the counter N indicative of the amount of drive of the focusing lens group (hereinafter referred to as an AF lens) is rendered to be $-N_{LG}$ (a negative value whose absolute value is large. The sign, either negative or positive, is determined by the first bit which may take "0" or "1".), followed by an execution of a subroutine for the drive of the AF motor as shown by steps #152 and #155.

The subroutine for the AF motor drive referred to above is shown in FIG. 24. When this subroutine is called for, a decision is made to determine if the sign of the lens drive amount N is positive or negative (i.e., whether or not the first bit is "1") at step #1197 so that the arrival of the lens at one of the opposite extremities can be detected. If the sign is positive or negative as determined at step #1197, the direction in which the lens is driven is chosen to be a direction of extension or a direction of retraction, respectively, and this signal indicative of the direction of drive of the lens is outputted to the motor drive circuit MD1, followed by a return as shown by steps #1198 and #1199.

In the illustrated embodiment, the AF lens drive is controlled by a counter interruption and a timer interruption. The counter interruption is executed when pulses indicative of the drive of the AF lens are inputted from the encoder ENC, whereas the timer interruption is executed when no next succeeding counter interruption is present within a predetermined time subsequent to the counter interruption. Then, by the timer interruption, the arrival of the lens at one of the opposite extremities (the infinity position or the closest distance position). The reason for $N = -N_{LG}$ at step #152 is for the purpose of avoiding the stoppage of the lens as a result of N=0 due to the above described counter interruption. In other words, it means that there is no lens assembly which requires the lens drive amount of $N=-N_{LG}$. Then, the timer interruption is enabled and, as a result of the timer interruption, a wait is made until a flag LEEDF indicative of the arrival of the lens at one of the extremities is set as shown in steps #160 and #165). Once the flag LEEDF is set, a counter as will be described later for counting the amount of extension $N_F$ from the infinity position of the lens is reset, followed by a resetting of the flag LEEDF as shown by steps #170 and #175). Thereafter, a decision is made to determined if a flag RSTF indicative of the start of retraction of the AF lens as a result of the mounting of the battery is set and, if the flag RSTF has been set, the program flow returns with the AF lens remaining retracted to the infinity position at step #180. On the other hand, if the flag RSTF is not set, a decision is made to determine if a flag SMOFF indicative of the start of retraction of the AF lens as a result of the main switch $S_M$ having been turned off is set and, if the flag SMOFF is set, the program flow returns with the AF lens remaining retracted to the infinity position at step #185. On the other hand, if the flag SMOFF is not set, it means that the AF lens is to be retracted as a result of the main switch $S_M$ and, therefore, calculation of the amount $N_K$ of extension of the AF lens for allowing the latter to be extended to a specified position is carried out at step #190. This amount $N_K$ of extension of the AF lens can be calculated according to an equation, $N_K=D/K_N$, wherein D represents the photo-taking distance expressed by an equation, $D=f/\beta$, which may $D=60\times 80$ mm$=4.8$ m if the focal length and the photo-taking magnification are assumed to be 80 mm and 1/60, respectively. This lens extension amount $N_K$ is inserted in the counter N indicative of the AF lens drive amount to effect the lens drive, followed by a return as shown by steps #195 and #200.

Figure 7:
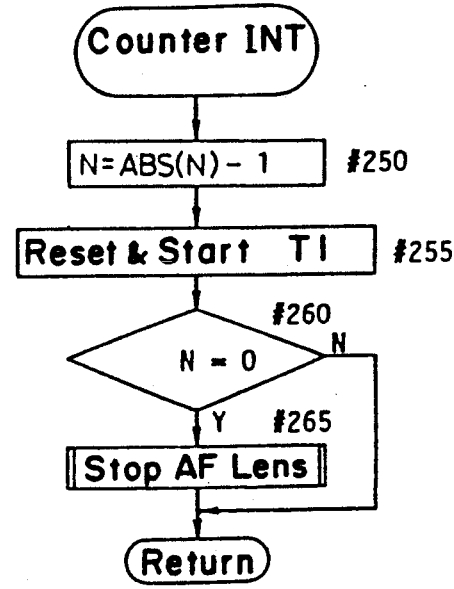

The counter interruption referred to above is shown in FIG. 7. As shown therein, when pulses are inputted from the encoder ENC, the counter interruption shown in FIG. 7 is executed. At the outset, the absolute value ABS(N) of the counter N indicative of the AF lens drive amount is decremented by one at step #250 to provide a new count for the counter N, followed by a resetting of a timer T1 for the timer interruption at step #255. Thereafter, a decision is made to determine if the value of the counter N becomes zero and, if N=0, it means that the drive of the lens in a predetermined amount has been completed and, therefore, a subroutine for the stoppage of the AF lens is executed at step #260, followed by a return. On the other hand, if the value of the counter N is not zero, the program flow returns without the subroutine for the stoppage of the AF lens being executed.

Figure 8:
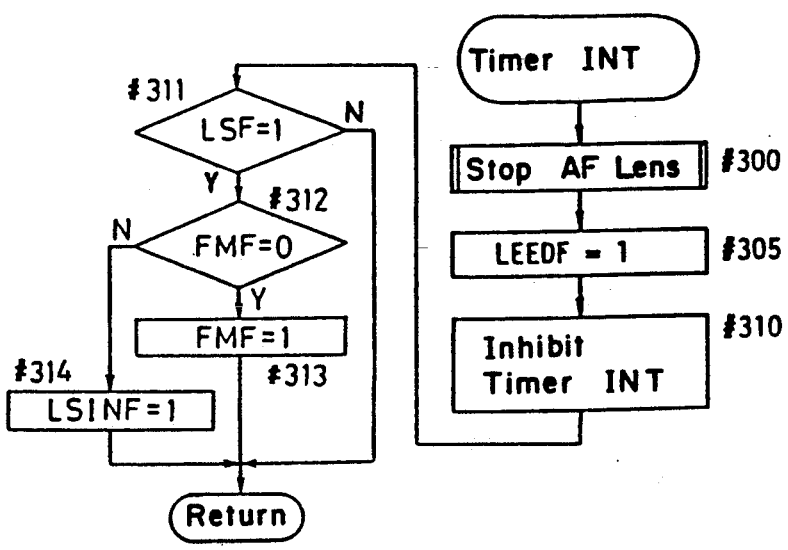

The timer interruption referred to above is shown in FIG. 8. When the timer T1 reset and started by the above described counter interruption attains a predetermined value, the timer interruption shown in FIG. 8 is executed. At the outset, a subroutine for stopping the AF lens is executed at step #300 because of the AF lens having arrived at one of the opposite extremities (the infinity position or the closest distance position), then the flag LEEDF indicative of the passage through this flow is set at step #305, and the timer interruption is subsequently inhibited at step #310. Then, a decision is made at step #311 to determine if a flag LSF indicative of a low contrast scan being performed is set and, if the flag LSF is not set, the program flow returns at step #311. On the other hand if the flag LSF is set, a decision is again made to determine at step #312 if the drive under the low contrast scan is to extend the lens and if it is the extension of the lens (FMF32 0), this flag FMF is set at step #313, followed by a return. On the other hand, if the flag FMF is not set, the low contrast scan is inhibited and a flag (LSINF) indicative thereof is set at step #314, followed by a return.

Figure 9:
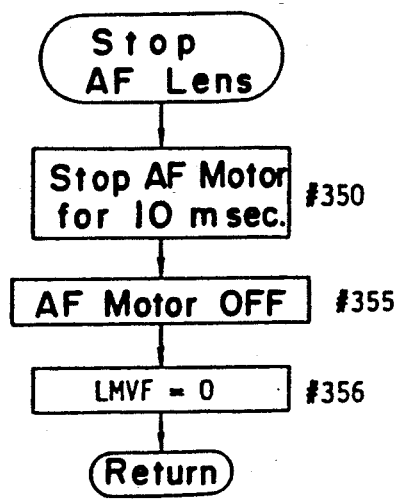

The subroutine for stopping the AF lens which is called for at step #265 and also at step #300 is shown in FIG. 9. When this subroutine is called for, a control signal for shortcircuiting opposite ends of the AF motor M1 is outputted to the motor drive circuit MD1 for 10 msec at step #350. Then, a control signal for interrupting the supply of an electric power to the AF motor M1 is outputted to the motor drive circuit MD1 at step #355 and a flag LMVF is reset during the drive of the lens at step #356, followed by a return.

Figure 10:
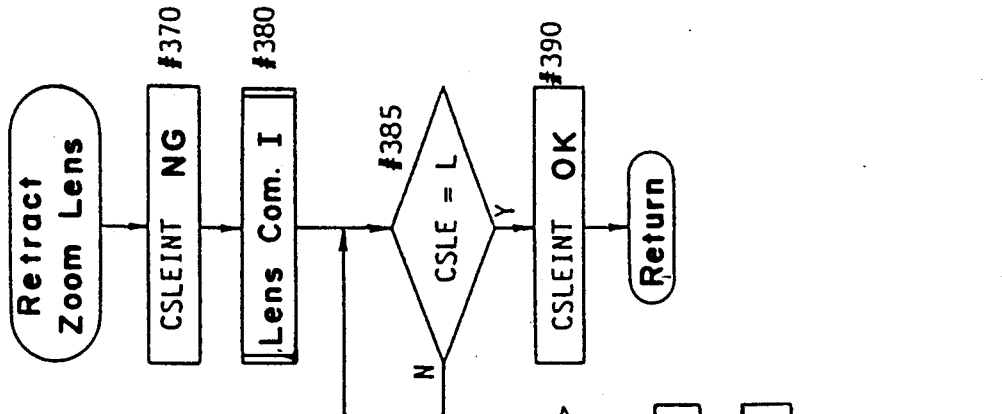

Referring to FIG. 5, after the retraction mode II has been specified as a mode during which the zooming lens is initialized to the specific position in the event that the result of decision to determine if the lens assembly used is an old lens or a new lens indicates that the lens assembly is not the old lens, a subroutine for retraction of the zooming lens is executed (steps #41, #42 and #45), followed by step #50. The subroutine for retracting the zooming lens is shown in FIG. 10. When this subroutine is called for, an interruption CSLEINT in response to a lens select signal CSLE from the lens assembly is inhibited at step #370 and a subroutine for the lens communication I is executed at step #380 to output a data for the retraction mode, followed by a wait until a signal applied to the terminal CSLE of the camera from the lens assembly attains a low level state at step #385. This low level signal is outputted from the lens assembly when the zooming lens is set at the specific position. When the signal from the lens assembly to the terminal CSLE of the camera body has brought into the low level state, the interruption CSLEINT from the lens assembly is enabled at step #390, followed by a return.

Figure 12:
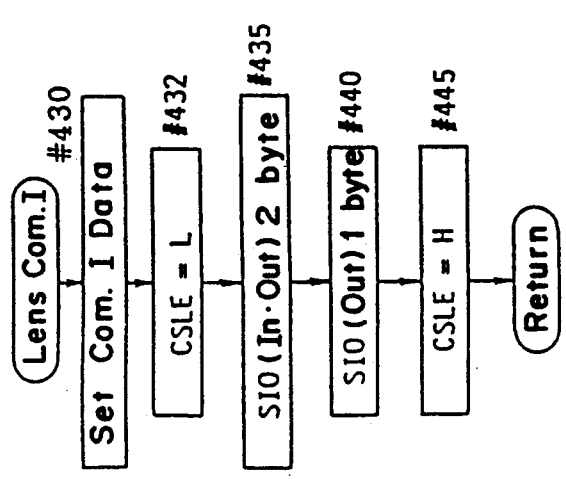

The subroutine for the lens communication I is shown in FIG. 12. When this subroutine is called for, data indicative of the communication mode I are set at step #430; the terminal CSLE is rendered in a low level state at step #432; a 2-byte data communication takes place to acknowledge the camera body and the lens assembly of the type of the lens assembly and the type of the camera body with each other at step #435; a 1-byte data communication subsequently takes place at step #440 to indicate a communication mode (for example, the mode I in the illustrated embodiment); and the program flow returns after the terminal CSLE has been rendered in a high level state at step #445.

Referring to the flowchart of FIG. 5, if the result of decision at step #41 indicates that the lens assembly used is the old lens, the program flow proceeds to step #50. At step #50, a decision is made to determine if the photo-taking ready switch S1 is turned on and, if the switch S1 is not turned on, step #65 takes place in which the power source control terminals PW1 and PW2 are rendered to be in low level states, respectively, for the purpose of switching the power supply transistors Tr1 and Tr2 to be switched off and, then, at step #70, the power source control terminal PW0 is rendered to be in a low level state for the purpose of deactivating the operation of the DC/DC converter DD. If at step #50 the photo-taking ready switch S1 has been found switched on, the program flow proceeds to step #52 at which the flag LSINF for inhibiting the low contrast scan is reset, and at step #55, an S10N subroutine is executed. Thereafter, a decision is made at step #60 to determine if a flag S10NF which is set for 5 seconds after the photo-taking ready switch S1 has been turned on or off is set. If the flag S10NF is set, the program flow goes to step #55, but if it is not set, it goes to step #65. During an interruption S1INT which is executed when the photo-taking switch S1 in the OFF state is turned on, a flow from step #55, et seqq. is executed. Also, during a lens interruption CSLEINT which is executed when the interruption signal is inputted from the lens assembly to the interruption terminal LEINT, the flag CSLEF indicative of the presence of an interruption from the lens assembly is set at step #75 and a flow from step #55, et seqq., is then executed.

Figures 13, 13A:
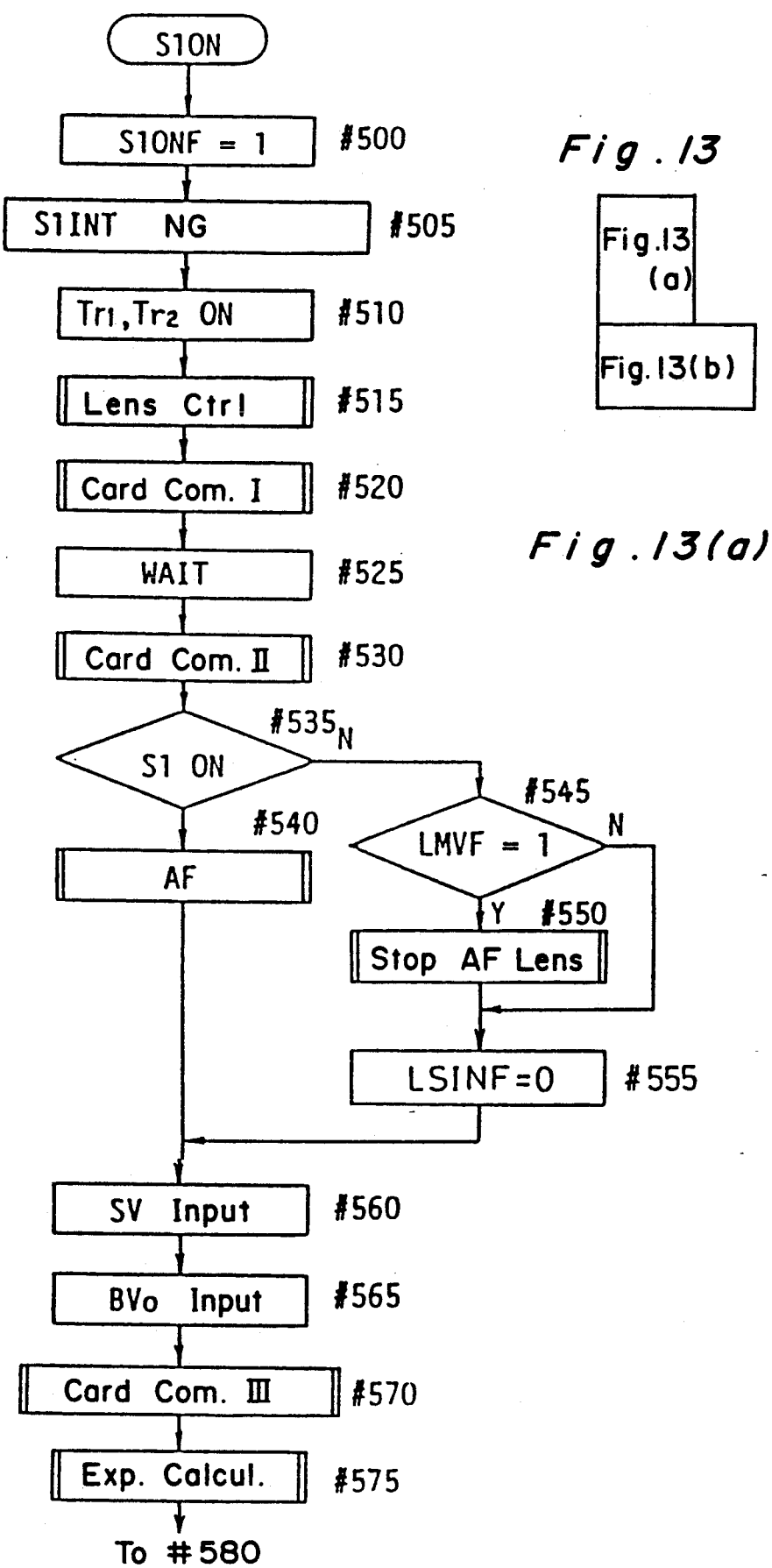
Figure 13B:
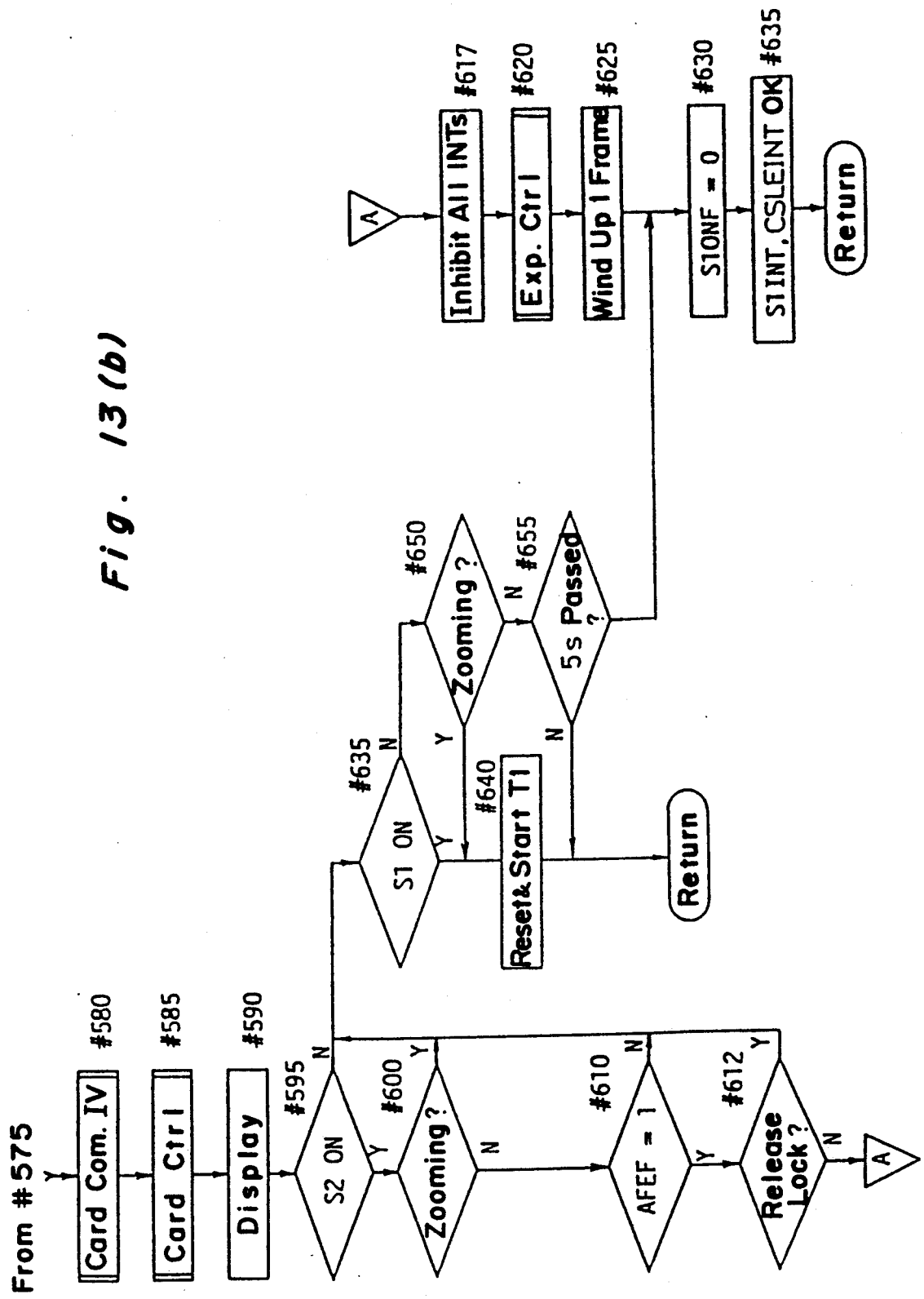

The S10N subroutine referred to above is shown in FIG. 13. When this subroutine is called for, a flag S10NF indicative of the passage through this flow is set at step #500 to inhibit the interruption S1INT at step #505, and the power source control terminals PW1 and PW2 are rendered to be in high level states, respectively at step #510 to switch the power supply transistors Tr1 and Tr2 on, followed by an execution at step #515 of a lens control subroutine.

Figure 17:
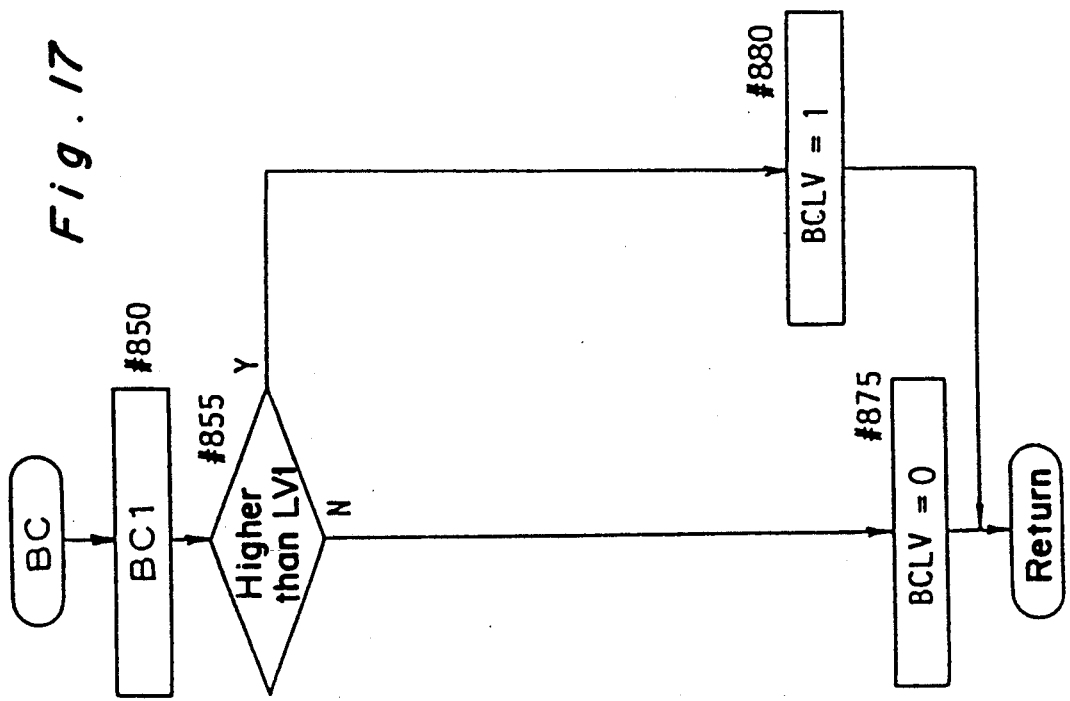

The details of the lens control subroutine are shown in FIG. 14. When this subroutine is called for, data for enabling the zooming are set at #700, followed by an execution of a lens communication II at step #705 to allow predetermined data to be inputted from the lens assembly. Subsequently, and at step #715, a battery check subroutine BC is executed as shown in FIG. 17. Referring to FIG. 17, when this battery check subroutine is called for, data are inputted from a battery check circuit BC1 at step #850. From this battery check circuit BC1, data indicative of whether or not the voltage of the power source battery is of a level sufficient to control the camera (e.g., whether or not it is higher than a level LV1) are inputted. Based on those data, a decision is made at step #855 to determine if the power source voltage is higher than the level LV1 and, if it is higher than the level LV1, the data indicative of the battery voltage is rendered to be BCLV=1, followed by a return (steps #855 and #885). If the result of decision at step #855 indicates that the battery voltage is not higher than the level LV1, the data indicative of the battery voltage are rendered to be BCLV=0, followed by a return (steps #860 and #880).

Figure 55:
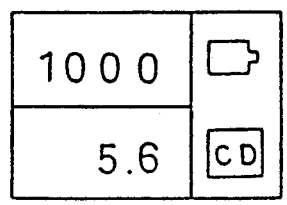
FIGS. 55(a) to 55(c) are schematic diagrams showing respective examples of display appearing in a display window disposed on an upper cover of the camera body.
Figure 55:
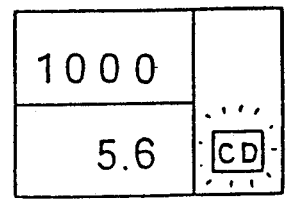
Figure 55:
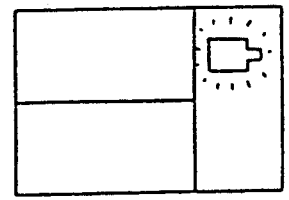

Referring to FIG. 14, after the battery check subroutine at step #715, a decision is made at step #720 to determine if the lens assembly is the old lens or the new lens and, if it is the old lens, the program flow proceeds to step #810 at which a decision is made to determine of the data indicative of the level of the battery voltage is BCLV=0, Should the result of decision at step #810 indicate BCLV=0, a warning display informing that the battery voltage is insufficient is effected at step #815 while other displays are deactivated at step #817, followed by a wait for the interruption at step #820. A status of this warning display so effected is shown in FIG. 55(c). In this status, a battery making is blinking. ON the other hand, if the result of decision at step #810 does not indicates BCLV=0, the program flow goes to step #825 at which the above described warning display is deactivated, followed by a return. It is to be noted that FIG. 55(a) illustrates status of all displays. In this figure, a display of "CD" is effected when a card function is available, but is not effected when the card function is not available. If the card function does not work well and a release lock is effected as will be described later, the display of "CD" blinks as shown in FIG. 55(b). In this figure, a numeral "1000" represents a shutter speed of 1/1000 second and a numeral "5.6" represents an aperture value of F5.6.

Where the result of decision at step #760 indicates that the lens assembly is not the old lens, a decision is made at step #725 to determine if the data indicative of the level of the battery voltage is not zero, that is, BCLV≠0. If the result of decision at step #725 indicates BCLV=0, the program flow goes to step #730 at which the data for inhibiting the zooming is set, followed by step #800 at which a subroutine for a lens communication III during which this data is outputted to the lens assembly is executed before the program flow goes to step #810.

Figures 18, 19, 20:
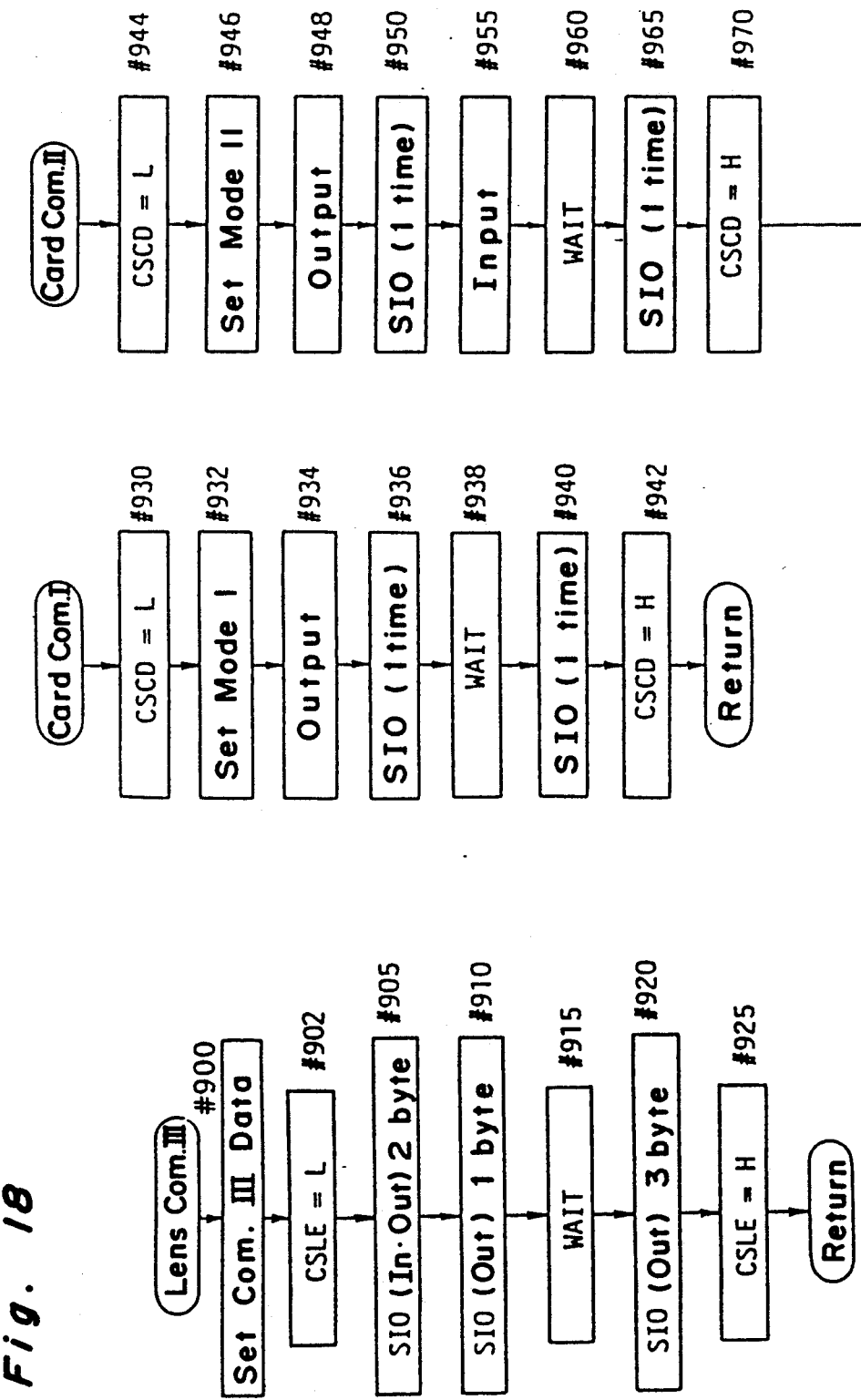

The details of the lens communication III subroutine are shown in FIG. 18. When this lens communication III subroutine is called for, data indicating that a communication mode is a mode III are set at step #900; the terminal CSLE is rendered in a low level state; a 2-byte data communication takes place at step #905 to interchange information on the respective types of the camera and the lens between the camera and the lens; a 1-byte data communication takes place at step #910 to indicate the next succeeding communication mode (mode III in the illustrated embodiment; and, after a wait at step #915, a 3-byte data is outputted to the lens assembly at step #920; and the terminal CSLE is rendered in a high level state before the program flow returns.

Referring still to FIG. 14, if the result of decision at step #725 indicates BCLV≠0, the program flow goes to step #734 at which a decision of a zooming mode is carried out. At the outset, at step #734, a decision is made to determine of it is an OFF mode (manual zooming mode). If it is determined as the OFF mode at step #734, an OFF mode subroutine is executed at step #736, followed by step #800. Should the result of decision at step #734 indicate that it is not the OFF mode, a decision is made at step #738 to determine if it is a reset mode. In the case of the reset mode as determined at step #738, a subroutine for the reset mode is executed at step #740 before the program flow goes to step #800. On the other hand, if the result of decision at step #740 indicates that it is not the reset mode, it means an automatic zooming program (APZ) mode and, therefore, the program flow goes straight to step #800 since no control is needed on the side of the camera.

Figure 15:
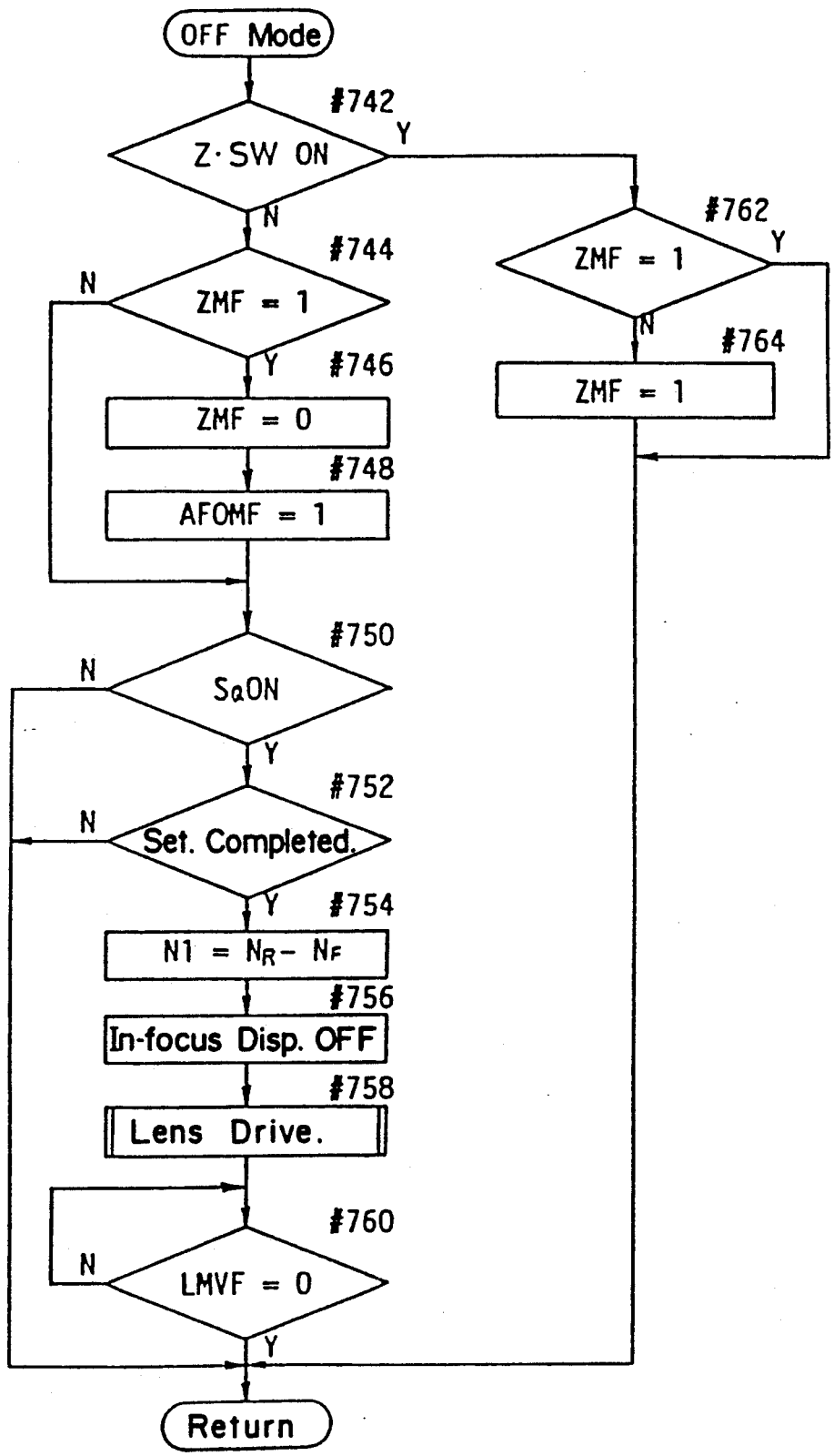

The OFF mode subroutine is shown in FIG. 15. At the outset, based on the data inputted from the lens assembly, a decision is made to determine at step #742 if a zooming switch Z.SW is switched on. If the zooming switch is not switched on, a decision is then made at step #744 to determine if a flag ZMF indicating that the zooming switch is once switched on is set and, if it is set, it means that the zooming switch has changed over from an ON state to an OFF state, the flag ZMF is reset at step #746 and a flag AFOMF indicative of an re-execution of a focus detection is set at step #748, followed by step #750. If the result of decision at step #744 indicates that the flag ZMF is not set, it means that the zooming switch is kept in the OFF state and, therefore, the program flow goes to step #750. At step #750, a decision is made to determine if the lens switch $S_Q$ adapted to be manipulated for returning to the focal length f and the photo-taking distance D both set during the reset mode is switched on and, if this lens switch $S_Q$ is not switched on, the program flow returns straightforward. On the other hand, if the result of decision at step #750 indicates that the lens switch $S_Q$ is switched on, the program flow goes to step #752 at which another decision is made to determine in reference to the data inputted from the lens assembly if the setting of the focal length f and the photo-taking distance D described above has been completed. If the result of decision at step #752 indicates that the setting has not yet been completed, the program flow returns, but if it indicates that the setting has been completed, the amount $N_F$ of extension of the lens from the infinity position to the current lens position is subtracted from the reset value $N_R$ corresponding to the amount of extension attained when both of the focal length f and the photo-taking distance D have been set, to calculate the lens drive amount N1 at step #754, and an in-focus display is deenergized subsequently at step #756, followed by a drive of the lens in an amount corresponding to the lens drive amount N1 (See FIG. 24) at step #758. After the completion of the lens drive (LMVF=0) at step #760, the program flow returns.

Figure 16:
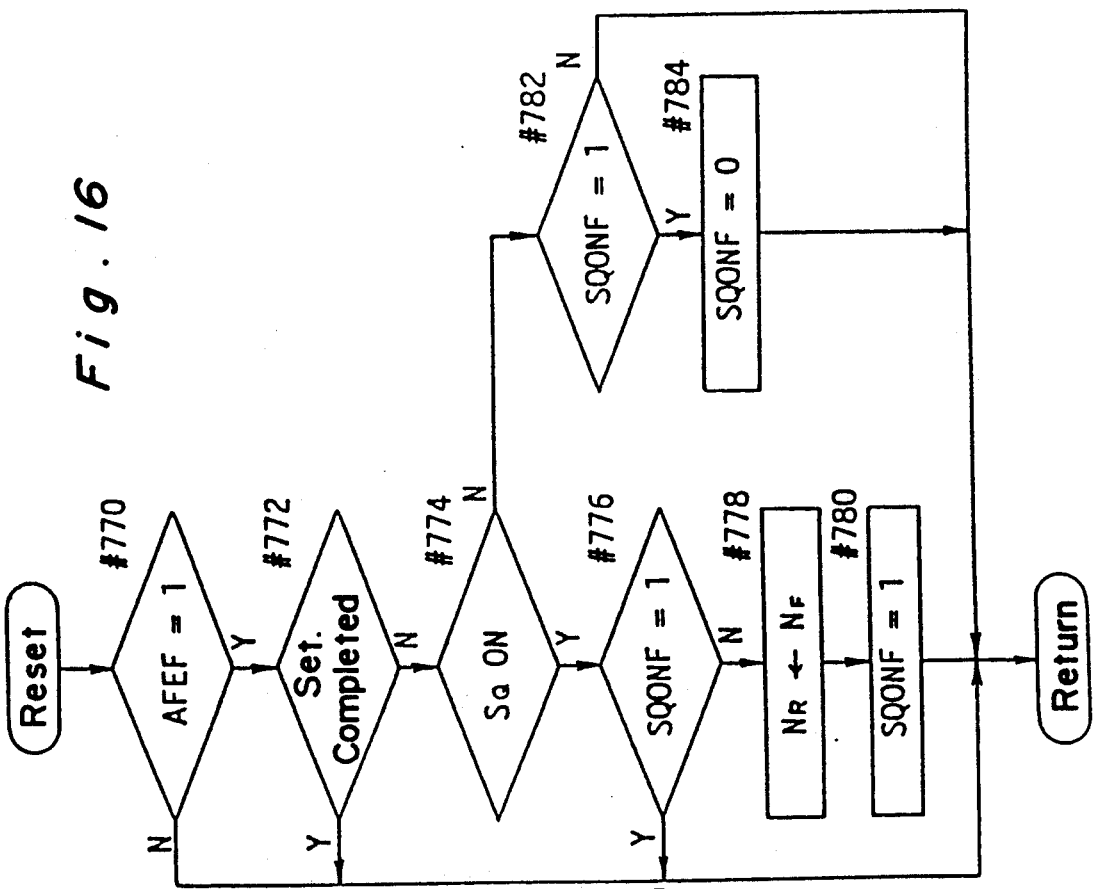

The subroutine for the reset mode will now be described with reference to FIG. 16. When this subroutine for the reset mode is called form a decision is made at step #770 to determine if a flag AFEF indicative of an in-focus condition is set. Should the result of decision at step #770 indicate the non-setting of the flag AFEF, that is, not in the in-focus condition, the reset value $N_R$ of the amount of extension of the lens will not be set, allowing the program flow to return. ON the other hand, if the flag AFEF as determined at step #770 is set indicating the in-focus condition, another decision is made at step #772 to determine of the setting of the reset value $N_R$ of the amount of extension of the lens has been completed on the basis of the data (i.e., the previously discussed data (xi) and the program flow returns if the setting has not yet been completed. On the other hand, if the result of decision at step #772 indicates that the setting has been completed, a further decision is made at step #774 to determine if the switch $S_Q$ has been turned on. Should the result of decision at step #774 indicate that the switch $S_Q$ has been turned on, a decision is made at step #776 to determine of a flag SQONF indicating that the lens switch $S_Q$ has once switched on is set and if the flag SQONF is set as determined at step #776, it means that the setting of the reset value $S_Q$ has been completed and, therefore, the program flow returns. On the other hand, if the flag SQONF is not set as determined at step #776, the amount $N_F$ of extension of the lens from the infinity position to the current lens position is set as a reset value $N_R$ at step #778 and, after the flag SQONF has been set at step #780, the program flow returns. Where the flag SQONF is set as determined at step #782, it means that the lens switch SQ changes from an ON state over to an OFF state and, therefore, the flag SQONF is reset at step #784 before the program flow returns. Also, where the flag SQONF is not set as determined at step #782, it means that the switch $S_Q$ is kept switched of and therefore the program flow returns immediately thereafter.

Reverting to the flowchart of FIG. 13, after the subroutine for the lens control has been completed, a subroutine for the card communication I is executed at step #520. The subroutine for the card communication I is shown in FIG. 19. When this subroutine is called for, a terminal CSCD is rendered to be in a low level state at step #930 so that the card can be informed of a data communication with the card, followed by a setting of the data indicative of the card communication under the mode I at step #932. Then, after it has been set to an output mode at step #934, a serial data communication takes place one time at step #936 to inform the card of the card communication under the mode I. After a wait at step #936 for a length of time required for the card to perform a required processing, a serial data communication takes place one time at step #940, and the terminal CSCD is rendered to be in a high level state at step #942 to inform the card of the termination of the data communication, followed by a return of the program flow. The data communicated at step #940 is indicative of the ON/OFF state of the card switch $S_{CD}$ on the camera body.

Referring to the flowchart of FIG. 13, after a wait at step #525 for a length of time required for the card to accomplish a control which the card executed in response to the data referred to above, a subroutine for the card communication II is executed at step #530. The subroutine for the card communication II is shown in FIG. 20. When this subroutine is called for, the terminal CSCD is rendered in a low level state at step #944 so that the card can be selected as a subject with which the data communication is to be made, followed by a setting of a data indicative of the card communication under the mode II at step #946. Then, an output mode is set at step #948 and serial input and output are carried out one time at step #950 to inform the card of the mode II card communication. Then, at step #955 the mode is changed over to an input mode and, after a wait at step #960 for a length of time required to accomplish the control on the side of the card, serial input and output are carried out one time at #965 to input data concerned of the presence or absence of the card control (which means a control performed on a data such as, for example, exposure of the camera, set by the card) and, then, the terminal CSCD is rendered in a high level state at step #970 to indicate the termination of the data communication with the card, followed by a return of the program flow.

Referring to FIG. 13, after the execution of the subroutine for the card communication II, a decision is made at step #535 to determine if the photo-taking ready switch S1 is turned on and, if it is turned on, a subroutine for the AF control is executed at step #540.

Figure 23B:
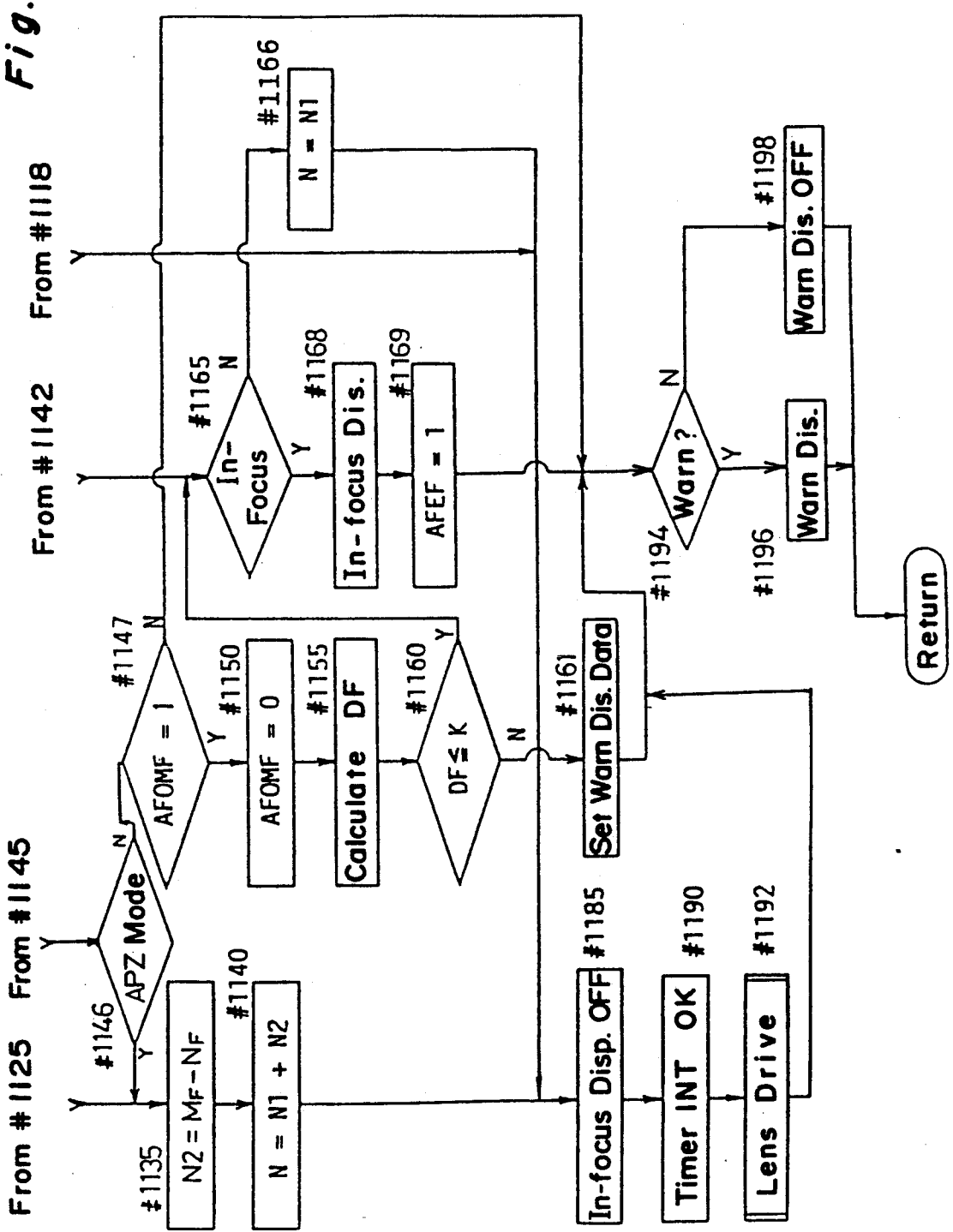

The details of the subroutine for the AF control are shown in FIG. 23. When this subroutine for the AF control is called for, the microcomputer $\mu C1$ resets a warning display at step #1100, followed by a decision at step #1101 to determine if the flag LSINF indicative of the low contrast scan having been inhibited is set. If the flag LSINF is set, the program flow goes to step #1116 at which only a correction of the focus position during the powered zooming is carried out as will be described later, but if the flag LSINF is not set, a decision is made at step #1102 to determine if the flag AFEF indicative of the in-focus condition is set. If the flag AFEF is set, the value N1 is rendered to be zero at step #1112, followed by step #11251, but if the flag AFEF is not set, a subroutine for a calculation of correlation is executed at step #1104.

The subroutine executed at step #1104 is shown in FIG. 15. As shown, when this subroutine is called for, the microcomputer $\mu C1$ causes the charge coupled device within the light receiving circuit $AF_{CT}$ for the focus detection to undergo an integration of charge at step #1230 and, after the integration, a data which has been converted into a digital data is inputted at step #1232 (Data Dump) and the correlation calculation is carried on the basis of this data at step #1235, followed by a return of the program flow. The detailed method of calculating the correlation is disclosed in, for example, the Japanese Laid-open Patent Publication No. 62-150310, published in 1987, and the U.S. Pat. No. 4,636,624, reference to which is herein incorporated.

Referring to FIG. 23, after the execution of the subroutine for the correlation calculation at step #1104, a decision is made at step #1106 to determine if the result of calculation indicates an incapability of focus detection. Should the result of decision at step #1106 indicate that the focus detection is not impossible, the defocus amount DF is calculated at step #1107, which amount DF is used to determine the lens drive amount $N1=DF\times K_L$, followed by a resetting of the flag LSF indicative of the low contrast scan before program step #1125 takes place. At step #1125, a decision is made to determine if the flag ZMF is set. If the flag ZMF is set as determined at step #1125, the amount N2 of drive of the AF lens is calculated for compensating for a deviation in focus resulting from a change in focal length using an equation, $N2=M_F-N_F$ wherein $M_F$ represents a corrected lens drive data inputted from the lens assembly. Then at step #1140, the amount of drive N is determined by summing N1 and N2 together, followed by step #1185 so that a display of the in-focus condition can be deenergized. On the other hand, if the result of decision at step #1125 indicates that the flag ZMF is not set, that is, the zooming is not effected, the program flow goes to step #1142 at which a decision is made to determine of the flag AFEF indicative of the in-focus condition is set. If the flag AFEF is set, the program flow goes to step #1145 to determine if it is under the reset mode. If the result of decision at step #1145 indicates the reset mode, the program flow returns with nothing taking place. On the other hand, if the result of decision at step #1145 does not indicate the reset mode, the program flow goes to step #1146 at which a decision is made to determine if it is under the APZ mode (either APZ1 mode or APZ2 mode) and if it is under the APZ mode, the program flow goes to #1135 at which any deviation in focus resulting from the zooming is compensated for. On the other hand, if it is not under the APZ mode, the program flow goes to step #1147 at which a decision is made to determine if a flag AFOMF for executing the AF again is set. If the result of decision at step #1147 indicates that the flag AFOMF is set, this flag AFMOF is reset at step #1150, followed by a calculation of the defocus amount at step #1155. As a result thereof, if the defocus amount DF is found exceeding a predetermined value K as determined at step #1160, a warning display data is set at step #1161 with neither the determination of the focused condition nor the lens drive being taken place, followed by step #1194. On the other hand, if the defocus amount DF is found smaller than the predetermined value K, the program flow goes to step #1165 to perform the AF operation again for the purpose of compensating for the deviation in focus resulting from the zooming drive. At step #1165, a decision is made to determine if the target object is focused on the basis of the defocus amount DF so determined. Should the result of decision at step #1165 indicate that the target object is in the focused condition, the in-focus display is effected at step #1168, an in-focus flag AFEF is set at step #1169 and the program flow goes to step #1194. ON the other hand, if the result of decision at step #1165 indicates that the target object is not in the focused condition, the drive amount N1 determined at step #1110 is set in the lens drive amount at step #1166, followed by step #1185. Also, if the result of decision at step #1142 indicates that the flag AFEF indicative of the in-focus condition is not set, a process subsequent to step #1165 is executed. If the result of decision at step #1147 indicates that the flag AFOMF indicative of the AF operation to be executed again is not set, the program flow goes to step #1194. During the execution of a flow subsequent to step #1185, the in-focus display is deenergized at step #1185, the timer interruption is enabled at step #1190 and then step #1194 takes place after the lens drive. At step #1194, a decision is made to determine if there exists a warning data and, if the warning data is set, a warning display is effected at step #1196, but if no warning data is set, the warning display is deenergized at step #1198, followed by a return of the program flow.

If the result of decision at step #1106 indicates that the focus detection is impossible, the program flow proceeds to step #1114 at which a decision is made to determine if the zooming is effected. If the zooming is effected as determined at step #1114, i.e., ZMF=1, priority is given to the zooming with no low contrast scan (an operation in which the focus detection is carried out by moving the AF lens in search for a focus detectable area, that is, the position for the lens) being performed. This is for the purpose of preferentially accommodating the photographer's intent (i.e., manual operation). At step "1116, $N2=M_F-N_F$ is calculated for compensating for the amount of deviation resulting from the zooming and, then at step #1118, N2 is inserted into the drive amount N before the program flow proceeds to step #1185. If the result of decision at step #1114 indicates that no zooming is effected, i.e. ZMF=0, a subroutine for the low contrast scan is effected at step #1120.

Figure 26:
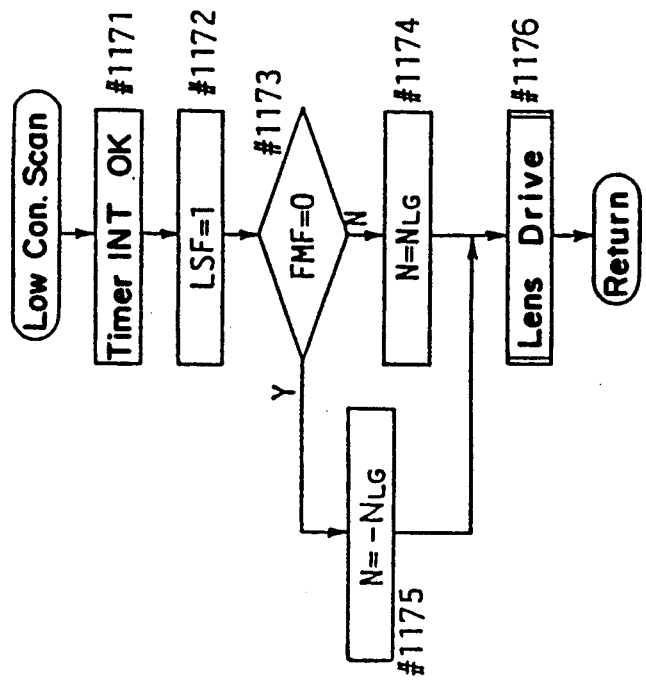

The details of the low contrast scan referred to above are shown in FIG. 26. When this subroutine is called for, the timer interruption is enabled at step #1171, followed by a setting of a flag LSF indicative of the low contrast scan at step #1172. If the flag FMF is not set as determined at step #1173, the lens drive amount is rendered to be $N=N_{LG}$ as a direction of extension of the lens, but if the flag FMF is set as determined at step #1174, the lens drive amount is rendered to be $N=-N_{LG}$ as the direction of extension of the lens. Thereafter, a subroutine for the lens drive is executed at step #1176 before the program flow returns.

It is to be noted that, since the old lens assembly is not equipped with those functions equipped in the new lens assembly, the conventional AF operation well known to those skilled in the art takes place where the old lens assembly is employed.

Referring to the flowchart of FIG. 13, after the execution of the subroutine for the AF control at step #540, the program flow proceeds to step #560. On the other hand, if the result of decision at step #535 indicates that the phototaking ready switch S1 has not yet been turned on, a decision is made at step #545 to determine if a flag LMVF indicative of the AF lens being driven is set. If the flag LMVF is set, the subroutine for the stoppage of the AF lens is executed at step #550, but if the flag LMLF is not yet, the program flow skips step #550 onto step #555 at which the flag LSINF indicative of the low contrast scan being inhibited is reset, followed by step #560. At step #560, the film sensitivity SV is inputted from the film sensitivity reading circuit DX and, then the brightness BVo of the target object measured at the full aperture is inputted from the light measuring circuit LM. To describe this inputting of the data, a terminal CSDX or CSLM is first rendered in a low level state to select the circuit DX or LM to which the data is to be inputted. Then, the data is inputted through the terminal SIN. After the data having been inputted, the terminal CSDX or CSLM is rendered in a high level state, thereby completing the data inputting. Thereafter, a subrouting for the card communication III is executed at step #570 to transmit the inputted data and other to the card. This subroutine for the card communication III is shown in FIG. 21. As shown in FIG. 21, when the card communication III subroutine is called for, a terminal CSCD is rendered in a low level state to request the card to perform a data transmission at step #975, followed by the setting of data indicative of the card communication under the mode III at step #980. Then, the output mode is selected at step #985 and, at subsequent step #990, a serial data communication takes place one time, followed by a wait at step #995 for a length of time required for the card to accomplish a calculation. After the wait at step #995, a serial communication takes place seven times at step #1005 and, then, the terminal CSCD is rendered in a high level state at step #1010 to indicate the termination of the data communication to the card, followed by the program flow return. The data communicated at step #1005 includes the current focal length fp, the minimum value fmin of the focal length, the maximum value fmax of the focal length, the light measured value BVo, the film sensitivity SV, the full aperture value AVo and the maximum aperture value AVmax.

Figure 27:
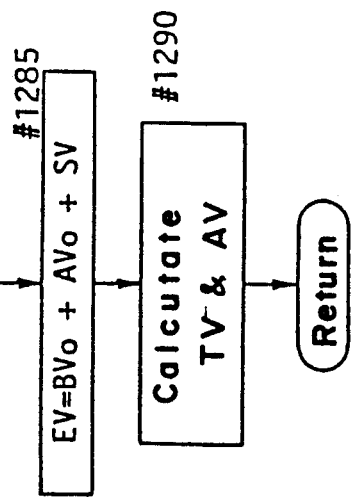

Reverting to FIG. 13, the body mounted microcomputer $\mu$C1 executed at step #575 a subroutine for the exposure calculation as shown in FIG. 27. When this exposure calculation subroutine is called for, the exposure value EV is determined at step #1285 according to an equation, EV=BVo+AVo+SV, wherein BVo represents the brightness of the target object measured at the full aperture. AVo represents the full aperture value and SV represents the film sensitivity. Then at step #1290, based on the calculated exposure value EV, the shutter speed TV and the aperture value AV are calculated according to a predetermined AE programmed line chart, followed by a return of the program flow. The details of the AE programmed line chart are disclosed in, for example, the Japanese Laid-open Patent Publication No. 1-129238, published in 1989, reference to which is herein incorporated. After the execution of the exposure calculation subroutine, the body mounted microcomputer $\mu$C1 executes at step #580 a subroutine for a card communication IV as shown in FIG. 22 so that the exposure value and other information calculated in the card can be inputted. The card communication IV subroutine is substantially identical with the card communication II subroutine shown in FIG. 20. However, since the card communication IV subroutine differs from the card communication II subroutine in that a mode IV is employed in the card communication IV subroutine as a counterpart of the communication mode set at step #1020 in the card communication II subroutine and that the serial communication corresponding to step #1045 in the card communication II subroutine takes place three times in the card communication IV subroutine, the details of the card communication IV subroutine will not be herein reiterated for the sake of brevity. It is, however, to be noted that the data inputted from the card to the camera body during the card communication IV includes a card calculated shutter speed $TV_{CD}$ calculated by the card, a card calculated aperture value $AV_{CD}$ calculated by the card and the presence or absence of a release lock.

Figure 28:
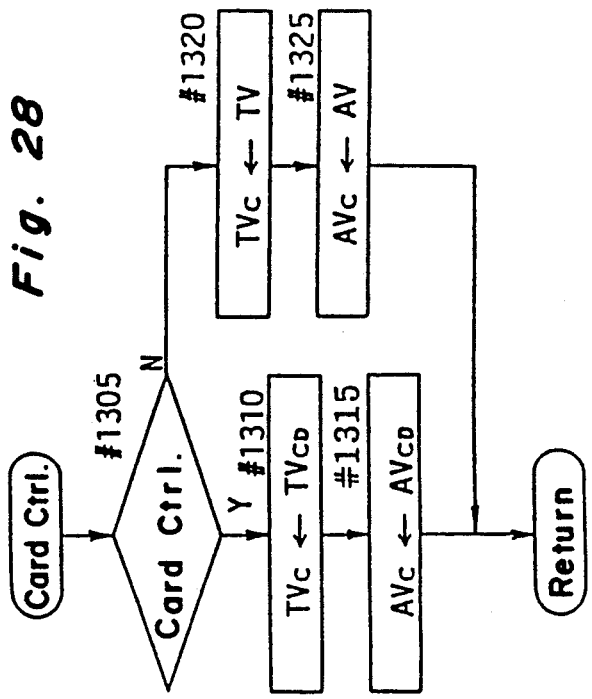

After the execution of the card communication IV subroutine, the body mounted microcomputer $\mu$C1 determines at step #585, in reference to the data obtained during the execution of the card communication IV subroutine and data previously obtained, as to whether or not the exposure control should be effected on the basis of the data on the side of the card. A subroutine for the determination of the card-based control is shown in FIG. 28. As shown in FIG. 28, when the subroutine for the determination of the card-based control is called for, a decision is made at step #1305 to determine whether or not the card control should be effected on the basis of a data concerning the presence or absence of the card control inputted from the card to the camera body during the card communication II. Where the card control is to be effected, the shutter speed $TV_{CD}$ and the aperture value $AV_{CD}$ calculated in the card are set as a control shutter speed TVc and a control aperture value AVc, respectively, at succeeding steps #1310 and #1315. On the other hand, where a camera-based control is to be carried out, the shutter speed TV and the aperture value AV calculated in the camera are set as the control shutter speed TVc and the control aperture value AVc, respectively, at succeeding steps #1320 and #1325.

Figure 56:
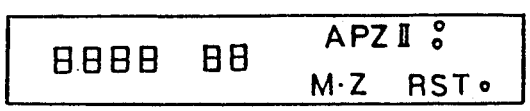
FIG. 56(a) is a schematic diagram showing a pattern of displays viewable through a viewfinder.
FIGS. 56(b) to 56(i) are fragmentary diagrams showing respective examples of displays viewable through the viewfinder.
Figure 56:
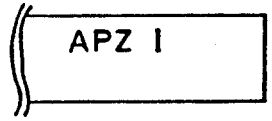
Figure 56:
Figure 56:
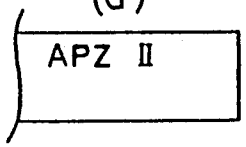
Figure 56:
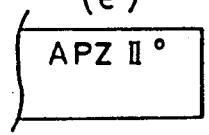
Figure 56:
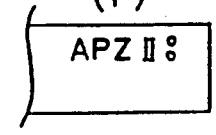
Figure 56:
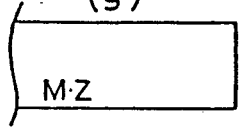
Figure 56:
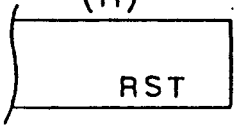
Figure 56:
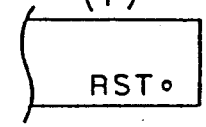

Referring to the flowchart of FIG. 13, after the body mounted microcomputer $\mu$C1 has finished the determination of the card control, such data as the control shutter speed TVc, the control aperture value AVc, the presence or absence of the card functions (the presence or absence of the card control), the presence or absence of the release lock and the result of battery check are serially outputted to the display control circuit DISPC so that the display control circuit DISPC can cause the display panel $DISP_I$ on the top of the camera body and the viewfinder display panel $DISP_{II}$ to display those data at step #590. Contents of displays which take place through the display panel $DISP_I$ on the top of the camera body are shown in FIGS. 55(a) to 55(c). It is to be noted that, since those contents to be displayed have already been explained, they will not be reiterated. Contents of displays which take place through the viewfinder display panel $DISP_{II}$ are illustrated in FIGS. 56(a) to 56(i). In FIG. 56(a), of the numerals displayed as shown therein, four digits from the left represents a shutter speed, and the next succeeding two digits represent an aperture value. Both of the shutter speed and the aperture value are displayed based on the data serially outputted from the body mounted microcomputer $\mu$C1 to the camera body. In addition to the shutter speed and the aperture value referred to above, the data serially outputted from the body mounted microcomputer $\mu$C1 to the display control circuit DISPC also includes data to be displayed in association with the zooming modes and, based on this data, the display control circuit DISPC displays the zooming mode. If the zooming mode is the automatic program zooming mode I, a legend "APZI" is displayed as shown in FIG. 56(b); if the zooming mode is the automatic program zooming mode II, a legend "APZII" is displayed as shown in FIG. 56(c); if the zooming mode is the manual zooming mode, a legend "M·Z" is displayed as shown in FIG. 56(g); and if the mode is the reset mode, a legend "RST" is displayed as shown in FIG. 56(h). Also, during the APZI mode, if a warning data which is set when a change in photo-taking magnification β reaches a limit is included in the data to be displayed in association with the zooming mode, the legend "APZI" blinks as shown in FIG. 56(c). During the APZII mode, if the photo-taking magnification β for one point and that for two points are set, legends "APZII°" and "APZII" ⌐ are displayed as shown in FIGS. 56(e) and 56(f), respectively. Again, upon completion of the setting of the reset mode, a legend "RSTo" is displayed as shown in FIG. 56(i).

In the flowchart shown in FIG. 13, after the above described display has been effected at step #590, a decision is made at step #595 to determine if the release switch S2 is turned on. If the release switch S2 is turned on, another decision is made at step #600 in reference to the flag LMVF to determine if the zooming being taken place and, if the zooming is taking place (i.e., LMVF=1), the program flow goes to step #635 at which the release is inhibited. ON the other hand, if the result of decision at step #600 indicates that no zooming is taking place (i.e., LMVF=0), a decision is made at step #610 in reference to the flag AFEF to determine of the target object is focused and, if it is focused (i.e., AFEF=1), the program flow goes to step #612, but if it is not focused (i.e., AFEF=0), the program flow goes to step #635 to inhibit the release. At step #612, a decision is made to determine if there exists a release lock data inputted from the card. In the case of the presence of the release lock data, the program flow goes to step #635 at which the release is inhibited. On the other hand, in the case of the absence of the release lock data, the program flow goes to step #617 at which all of the interruptions are inhibited, the exposure control is carried out at step #625, and thereafter, the film is wound one frame at step #625. Then, the flag S10NF is reset at step #630 to show that the S10N subroutine has been completely performed, and at step #635, both of the interruption S1INT incident to the photo-taking ready switch S1 having been turned on and the interruption CSLEINT from the lens are enabled, followed by the program return.

Referring again to FIG. 13, even though the result of decision at step #595 indicates that the release switch S2 is not turned on, the program flow proceeds to step #635 at which a decision is made to determine if the photo-taking ready switch S1 is turned on. If the photo-taking ready switch S1 is found switched on, a timer T2 for retaining the electric power source is reset and started at step #640 with the program flow subsequently returning. On the other hand, if the photo-taking ready switch S1 is found not switched on, a decision is made at step #650 in reference to the flag LMVF to determine if the zooming is taking place. If the zooming is found taking place at step #650, i.e., LMVF=1, the program flow proceeds to step #640 at which the timer T2 is reset and started to prolong the length of time during which the electric power source is retained. Should the result of decision at step #650 indicate that the zooming is not taking place, a decision is made at step #655 to determine if the timer T2 for the retention of the electric power source has counted 5 seconds and, if 5 second has not yet passed, the program flow returns. On the other hand, if 5 second has passed, the program flow proceeds to step #630 at which a control for terminating the photo-taking as a result of the switch S1 having been turned off is carried out.

Hereinafter, a subroutine for the exposure control which is executed at step #620 will be described with reference to FIG. 29. When this subroutine is called for, a predetermined control signal is outputted at step #1330 to carry out a control of the release. In response to this predetermined control signal, a release operation including an disengagement of an engagement member (not shown) to allow the mirror MR1 (FIG. 59) to pivot upwards. The aperture is subsequently stopped down to the control aperture value AVc at step #1332, followed by an execution at step #1335 of a subroutine for a lens communication IV so that a signal indicative of the release can be outputted to the lens assembly.

Figure 30B:
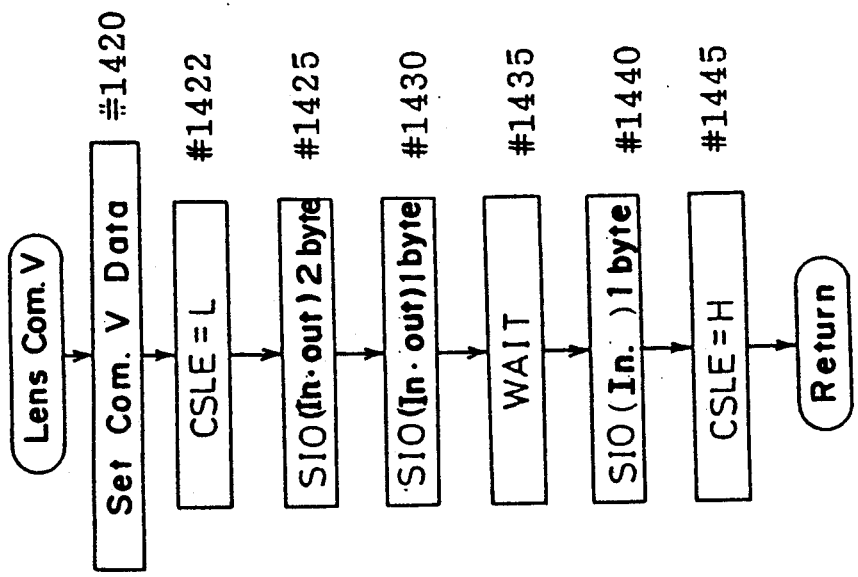
Figure 30A:
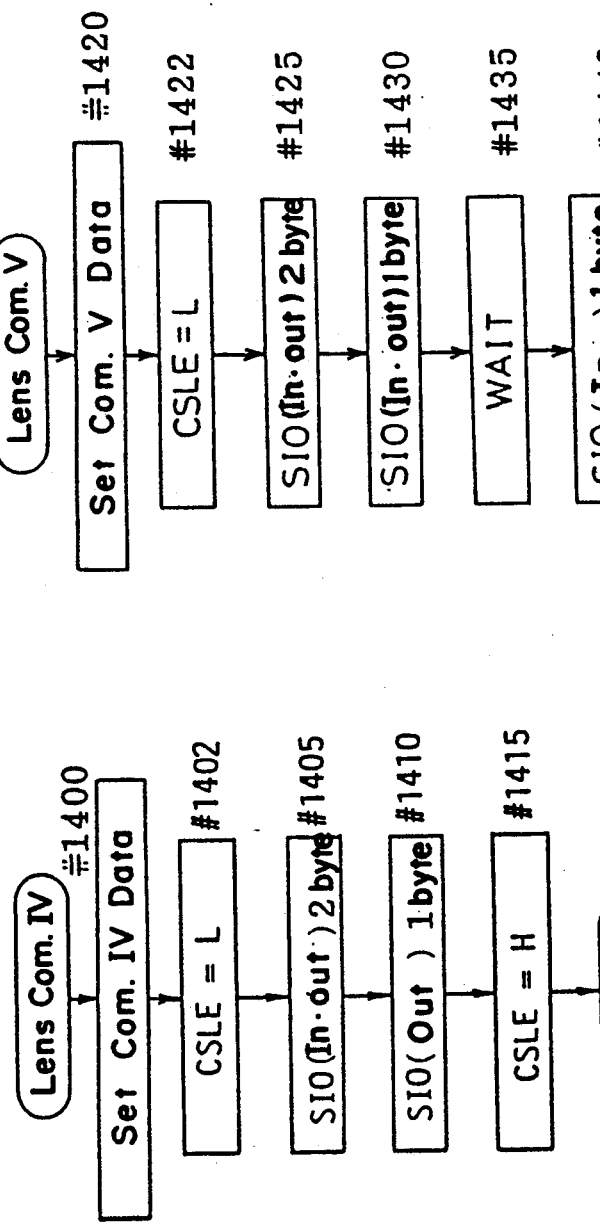

The lens communication IV subroutine is shown in FIG. 30(a). When this subroutine is called for, data indicative of the communication IV are set at step #1400, and the terminal CSLE is rendered in a low level state at step #1402 to select the lens circuit as the subject with which the communication is made. Then, in order to interface between the camera body and the lens assembly as to the types thereof, a 2-byte serial communication takes place at step #1405, followed by a 1-byte serial communication at step #1410 to indicate the communication mode (mode IV so far illustrated). After the data communication as described above, the terminal CSLE is rendered in a high level state at step #1415, allowing the program flow to return subsequently.

Figure 29:
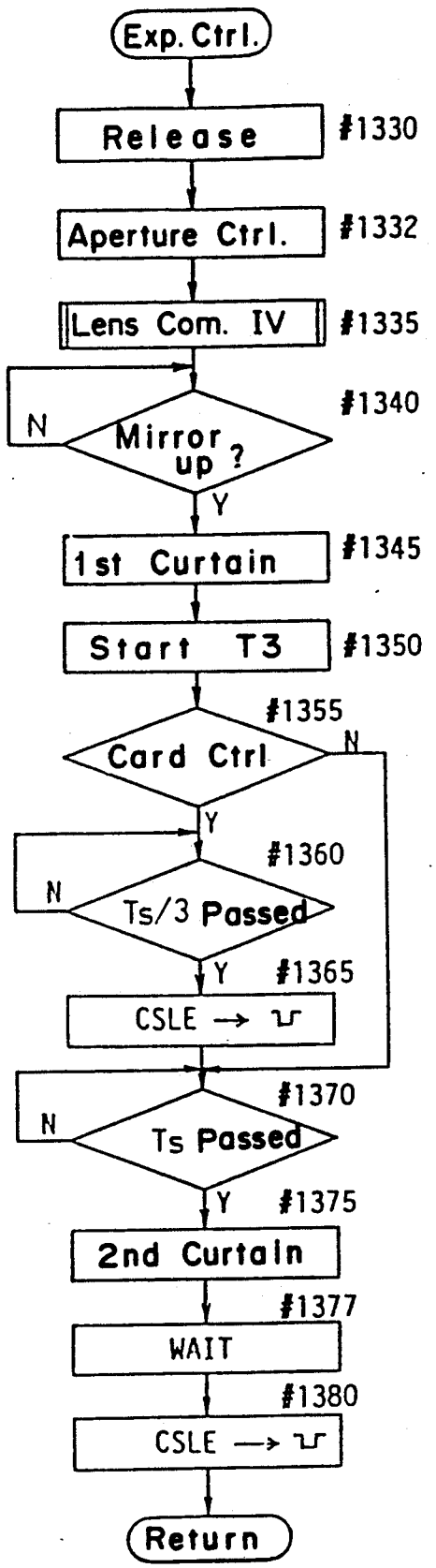

Thereafter, the body mounted microcomputer μC1 makes a wait until the mirror MR1 has been completely pivoted upwardly and, when the upward pivot of the mirror MR1 has been completed as indicated by a decision block at step #1340 shown in FIG. 29, a first shutter curtain travels at step #1345. Following this, a timer T3 for counting an actual exposure time Ts appropriate to the control shutter speed TVc is reset and started at step #1350, followed by a decision at step #1355 to determine if the card control takes place. In the case of the card control as determined at step #1355, that is, where the zooming is possible during the exposure, a wait is made before the elapse of a length of time equal to ⅓ of the actual exposure time Ts and, after the passage of the time Ts/3 as indicated by a decision block #1360, the terminal CSLE is instantaneously rendered in a low level at step #1365 to allow the zooming lens on the lens assembly to be driven. Where it is not the card control as determined at step #1355, the program flow skips steps #1360 and #1365 onto step #1370 at which a decision is made to determine if the actual exposure time Ts has passed. Should the exposure time Ts have passed, a second shutter curtain is moved at step #1375 and, after a wait at step #1377 for a length of time required for the second shutter curtain to complete its travel, the terminal CSLE is instantaneously rendered in a low level state at step #1380 to bring the zooming lens in the lens assembly to a halt, thereby completing the program step #55 shown in FIG. 5(b).

Referring to the program flow of FIG. 5, if the result of decision at step #20 indicates that the main switch $S_M$ is not turned on, the program flow goes to step #80 at which all other interruptions than the interruption SMINT incident to the main switch $S_M$ having been turned on are inhibited, followed by a decision at step #85 to determine if the flag RSTF indicative of the mounting of the battery is set. If the flag RSTF is not set, it means that this flow has been executed as a result of the main switch $S_M$ having been turned off and, therefore, a flag SMOFF indicative thereof is set at step #87 and a subroutine for the retraction of the AF lens is subsequently executed at step #90. In this case, the AF lens is retracted to one of the opposite extremities to which it can be moved. Since the details thereof have already been described, they will not be reiterated. Then, at step #92, a decision is made to determine if the lens assembly used in the old lens assembly. If the result of decision at step #92 does not indicate the old lens assembly, the mode of retraction is set to a mode I at step #95, followed by an execution of a subroutine for the lens retraction at step #100. Where the mode of retraction is set to the mode I, the execution of the subroutine for the retraction of the zooming lens can result in a movement of both of the AF lens and the zooming lens to one of the opposite extremities of its stroke and, therefore, the camera system including the lens assembly can attain the smallest size. Thereafter, a subroutine for a lens communication V is executed at step #105 and, then, a decision is made at step #110 on the basis of the data inputted from the lens assembly to determine if the camera may enter a sleep mode. When the camera enters the sleep mode, the electric power supply to the zooming motor in the lens assembly is interrupted. Accordingly, since the camera should not enter the sleep mode while the control of the retraction of the zooming lens takes place in the lens assembly, a wait for 50 msec is made at step #115 with the program flow returning to step #105 to execute the lens communication V subroutine, thereby repeating the decision block of step #110. When the control of the retraction of the zooming lens in the lens assembly is completed, the result of decision at step #110 indicates that the camera may enter the sleep mode and, therefore, the terminals PW1 and PW2 are rendered in a low level state so that the switching transistors Tr1 and Tr2 through which the electric power can be supplied to the circuits in the camera body and the zooming motor in the lens assembly can be switched off at step #120 and, also, the terminal PW0 is rendered in a low level state to switch the DC/DC converter DD off at step #125, followed by step #130 at which all other interruptions than the interruption SMINT resulting from the main switch $S_M$ having been turned on are inhibited (to enter the sleep mode). If the result of decision at step #85 indicates that the flag RSTF is set, or if the result of decision at step #92 indicates the use of the old lens assembly, the program flow goes to step #93 to reset the flag RSTF indicative of the mounting of the battery, followed by step #120 at which the sleep mode is assumed.

Hereinafter, the operation associated with the lens communication V will be described with particular reference to FIG. 30(b).

When the subroutine of FIG. 30(b) is called for, the data indicative of the communication mode being the mode V is set at step #1420, followed by step #1422 at which the terminal CSLE is rendered in a low level state to acknowledge the data communication with the lens assembly. Then, at step #1425 a 2-byte serial communication takes place to transmit the respective kinds of the lens assembly and the camera body to the camera body and the lens assembly, respectively. Thereafter, a 1-byte data indicative of the communication data is outputted to the lens assembly at step #1430 to indicate that the communication mode is the mode V, followed by a wait at step #1435, after which a 1-byte data (including the data indicative of the sleep enabled/inhibited) are inputted from the lens assembly at step #1440. Then, the terminal CSLE is rendered in a high level state, followed by a return of the program flow.

Hereinafter, the control operation performed by the lens mounted microcomputer $\mu C2$ will be discussed. When and so long as the lens assembly is not mounted on the camera body, the lens detecting switch $S_{LE}$ is switched on with the reset terminal RE2 of the lens mounted microcomputer $\mu C2$ being consequently kept in a low level and, therefore, the circuits in the lens assembly are not driven. However, when the lens assembly is mounted on the camera body with the lens detecting switch $S_{LE}$ consequently turned off, the reset terminal RE2 receives a signal changing from the low level state onto a high level state and, therefore, the lens mounted microcomputer $\mu C2$ executes the reset routine shown in FIG. 31. At the outset, the lens mounted microcomputer $\mu C2$ resets ports and registers at step #L5. At this time, the APZ1 mode and the sleep are ready to be enabled. Then, the zooming lens retraction mode is set to the mode II (the mode under which the zooming lens is retracted to a predetermined position corresponding to, for example, the focal length f of 80 mm) at step #L10, followed by an execution of a subroutine for the zooming lens retraction at step #L15.

Figure 32:
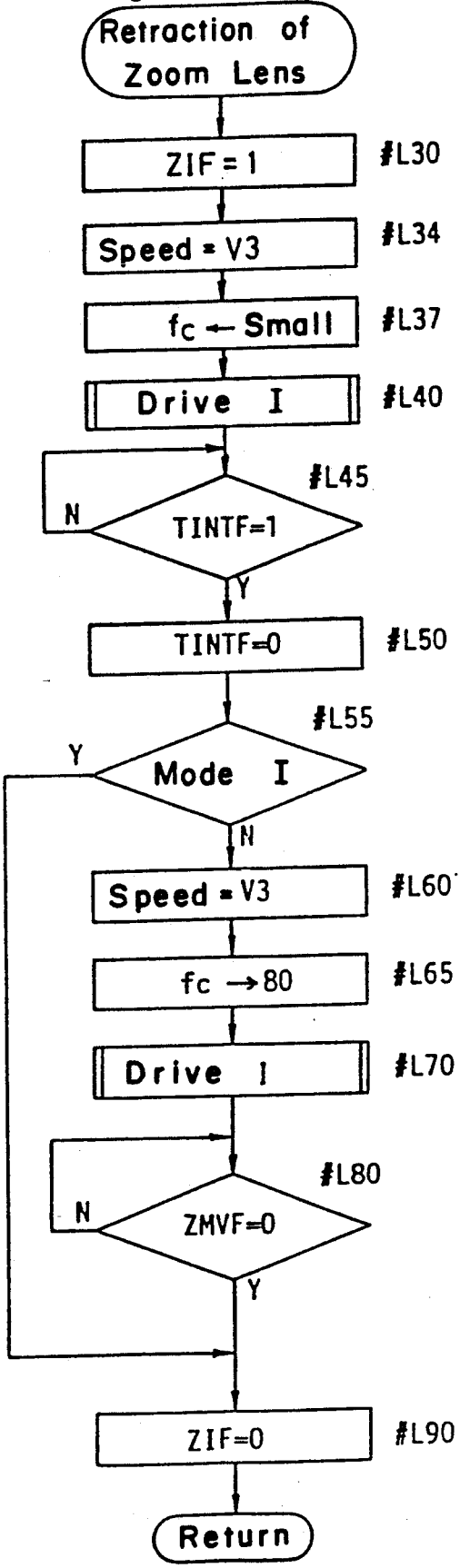
FIGS. 31 to 49 are flowcharts showing the sequence of operation of the electric system used in the interchangeable lens assembly of FIG. 2.

The subroutine of the zooming lens retraction referred to above is shown in FIG. 32. When this subroutine is called for, a flag indicative of the mode of retraction of the zooming lens is set at step #L30 and a signal necessary to render the speed of retraction of the zooming lens to be the maximum speed V3 is outputted to the motor drive circuit MD3 at step #L34. Then, after the control focal length fc is set to an unattainable small value at step #L37, a subroutine for the drive I is executed at step #L40 to drive the zooming lens, the details of said drive I subroutine being described later. Subsequently, a wait is made at step #L45 until a flag TINTF indicative of the occurrence of the timer interruption is set. This timer interruption is an interruption which takes place when and after the zooming lens has arrived at one of the opposite extremities.

Figure 33:
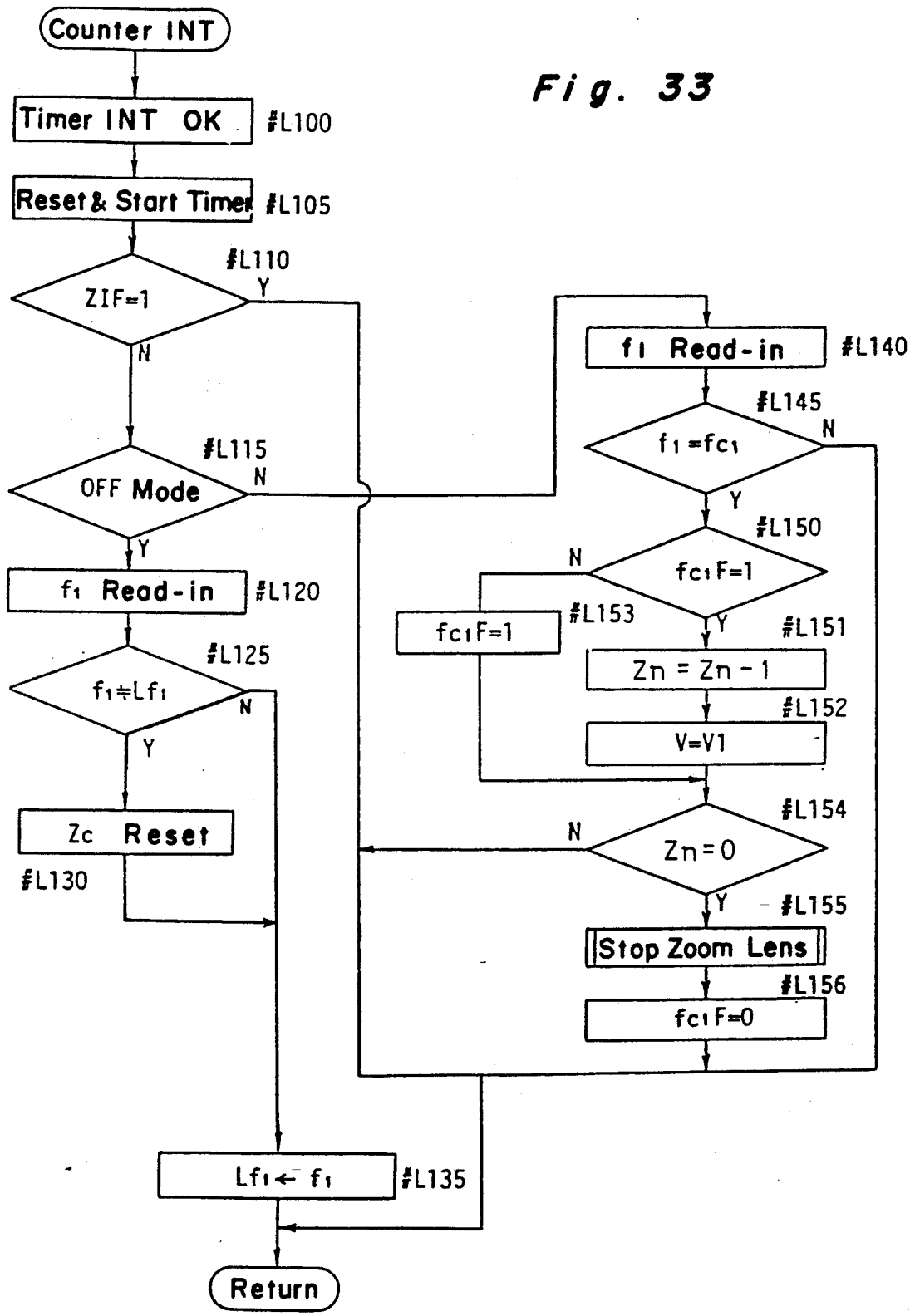

The process that takes place before the flag TINTF is set will now be described. A counter interruption routine which is executed when the pulses are inputted from the encoder ENC3 operable to detect the amount of rotation of the zooming motor M4 are inputted is shown in FIG. 33. When this interruption occurs, the lens mounted microcomputer $\mu C2$ permits the timer interruption for the detection of the arrival of the zooming lens at one of the extremities at step #L100, followed by a resetting and start of the timer at step #L105. Then, a decision is made at step #L110 to determine if a flag ZIF indicative of the zooming lens being retracted is set and if the flag ZIF is set, the program flow returns. The operation which takes place when the flag ZIF is reset as determined at step #L110 will be described later. When the zooming lens being retracted arrives at one of the opposite extremities, the counter interruption will no longer be executed and the timer reset and started at step #L105 continues its counting operation and the timer interruption takes place when a predetermined time has elapsed.

Figure 35:
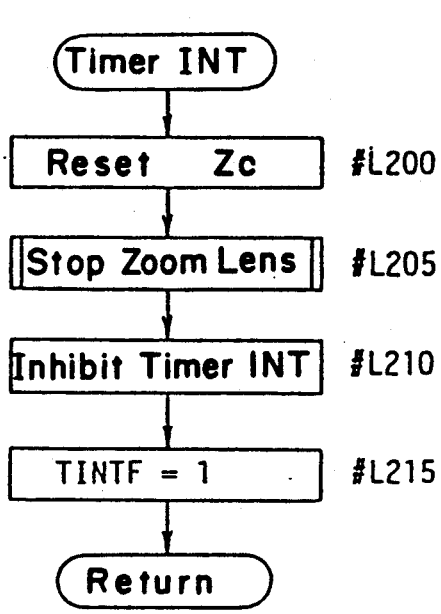

This timer interruption routine is shown in FIG. 35, reference to which will now be made. When this timer interruption takes place, the count Zc of a zoom counter ZC is reset at step #L200. This zoom counter ZC is used to count the number of the pulses supplied from the encoder ENC3. Specifically, when the zooming lens is retracted, this counter counts down the number of the pulses from the encoder ENC3 whereas, when the zooming lens is extended, this counter counts up the number of the pulses from the encoder ENC3. After the count Zc of the zoom counter ZC has been reset, the zoom lens is brought to a halt at step #L205 and, after the timer interruption has been inhibited, the flag TINTF is reset at step #L215, allowing the program flow to return subsequently.

Figure 34:
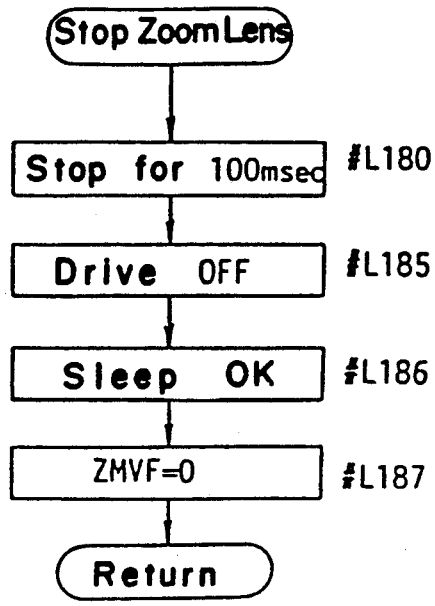

The zooming lens stopping subroutine which is executed at step #L205 of FIG. 35 is shown in FIG. 34. When this the motor drive circuit MD3 for 10 msec at step #L180 and, subsequently, a drive OFF signal is outputted at step #L185 and the sleep is then enabled at step #L186. Thereafter, after the flag ZMVF indicative of the zooming taking place has been reset at step #L187, the program flow returns.

After the flag TINTF indicative of the timer interruption has been set in the manner as hereinabove described, the lens mounted microcomputer μC2 executes the flow from step #L45 to step #L50 at which the flag TINTF is reset. Then, a decision is made at step #L55 to determine in reference to the data inputted from the camera body or the data set under the reset mode as to whether or not the zooming lens is retracted under the mode I. Should the result of decision at step #L55 indicate that the zooming lens retraction is taking place under the mode I (i.e., occurring when the main switch $S_M$ in the camera body is switched off), the program flow goes to step #L90 at which the flag ZIF indicative of the zooming lens being retracted is reset, followed by a return of the program flow. On the other hand, if the result of decision at step #L55 indicates that the zooming lens is not being retracted under the mode I, the drive speed of the zooming motor M3 is set to the maximum speed V3 at step #L60; the control focal length fc is then set to 80 mm at step #L65; and the drive I control is executed at step #L70, followed by a wait which takes place until the flag ZMVF indicative of the zooming taking place is reset at step #L80.

Figure 31:
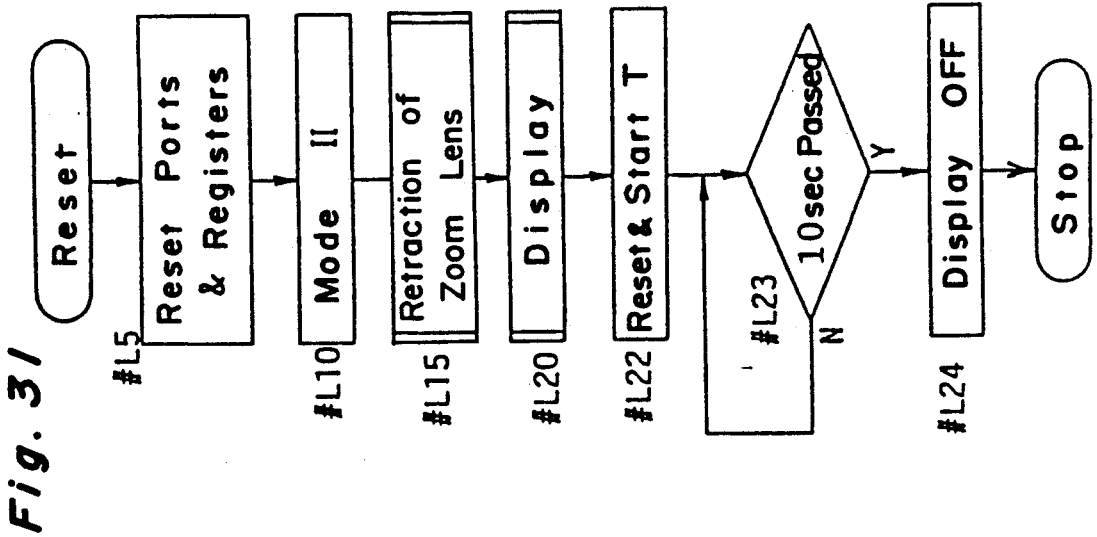

Referring to FIG. 31, after the zooming lens retraction is completed in the manner as hereinabove described, a display routine for the display of information of the lens assembly is executed at step #L20 and the timer T for the retention of the electric power source is reset and started at step #L22. Then, at step #L23, a wait is made at step #L23 for 10 seconds and, after the passage of 10 seconds, the display is erased at step #L24, with the program flow returning subsequently.

While the display routine executed at step #L20 of FIG. 31 will be discussed, display patters are first described with reference to FIGS. 58(a) to 58(e). All the display patterns are shown in FIG. 58(a). A legend "MACRO" is displayed to inform the photographer that a magnification of more than 1/10 belongs to a macro-photographing region. A horizontal bar below the legend "MACRO" represents a distance range from the closest distance to the target object for each focal length, with a left end of the horizontal bar representing the closest distance and a right end thereof representing the distance to the target object. Numerics shown in two rows below the horizontal bar indicate the distance (m) displayed by the horizontal bar. When either the upper row or the lower row is selected, all the numeric values of the row selected are displayed and those of the row not selected are erased. The horizontal bar is displayed dispersedly as follows according to the focal length and the camera-to-object distance. Display examples are shown in FIG. 58(b) to 58(e). For example, referring to FIG. 58(b), when the focal length is 28 mm and the camera-to-object distance is 2 meters, the closest object distance is 0.3 m. In this case, the upper row (0.3 m ~ ∞) is used to indicate the object distance range and the horizontal bar is displayed from 0.3 m to 2 m. Referring to FIG. 58(c), when the focal length is 50 mm and the camera-to-object distance is 2 m, the closest object distance is 0.5 m. In this case, the upper row (0.3 m ~ ∞) is used to indicate the object distance range and the horizontal bar is displayed from 0.5 to 2 m. When the focal length is more than 80 mm, the lower ros (0.6 m ~ ∞) is used. Referring to FIG. 58(d), when the focal length is 100 mm and the camera-to-object distance is 2 m, the closest object distance is 0.8 m. In this case, the lower row (0.6 m ~ ∞) is used to indicate the distance range and the horizontal bar is displayed from 0.8 to 2 m. Referring to FIG. 58(e), when the focal length is 200 mm and the camera-to-object distance is 2 m, the closest object distance is 1 m. In this case, the lower row (0.6 m ~ ∞) is used to indicate the distance range and the horizontal bar is displayed from 1 to 2 m.

A display of three-digit figure beneath the display pattern indicates the current focal length (mm) and arrow markings on the left and right of the three-digit figure indicate respective directions of change to be made of the focal length. Specifically, the left-hand arrow marking is displayed when the zooming is effected towards the shortest focal length whereas the right-hand arrow marking is displayed when the zooming is effected towards the longest focal length. when the zooming is effected towards the longest focal length.

Legends "OFF", "RST" and "APZ" positioned beneath a right-hand lower portion of the display pattern are displayed when the OFF, RST and APZ modes are selected, respectively. Regarding two points arranged vertically on the right side of the legend "APZ", the upper dot is displayed when one of the two points selected during the APZ2 mode is stored and the both are displayed when the second point is stored.

Figure 36B:
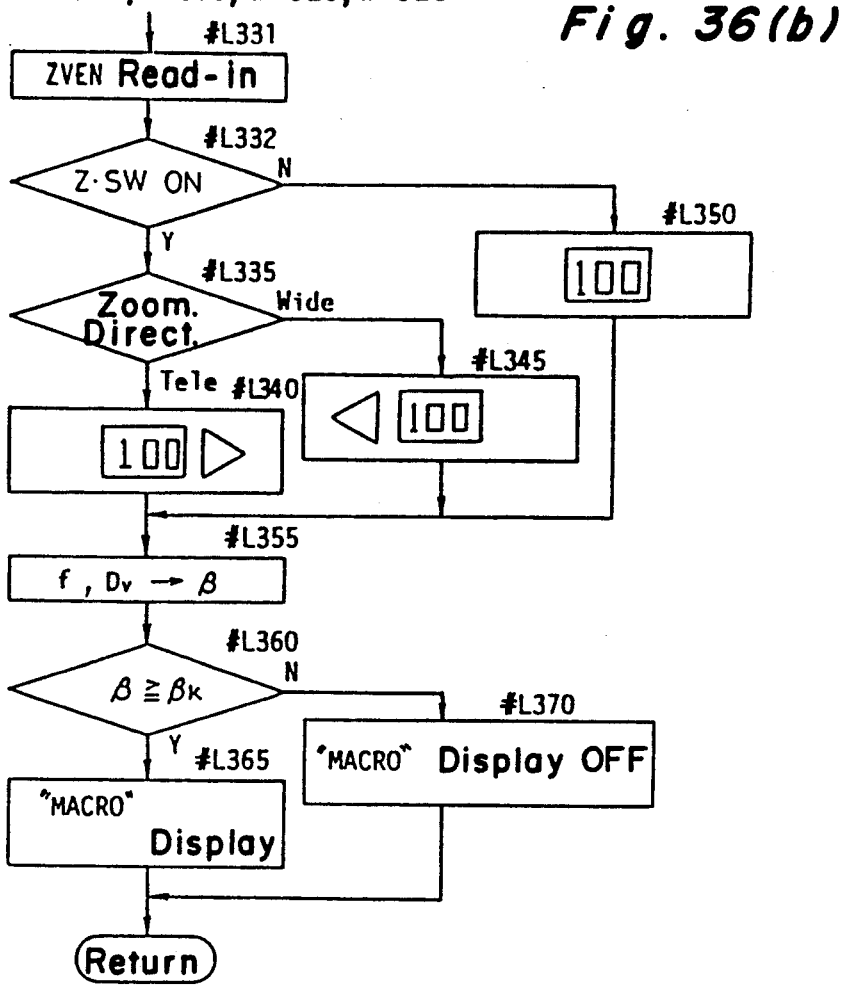
Figure 36A:
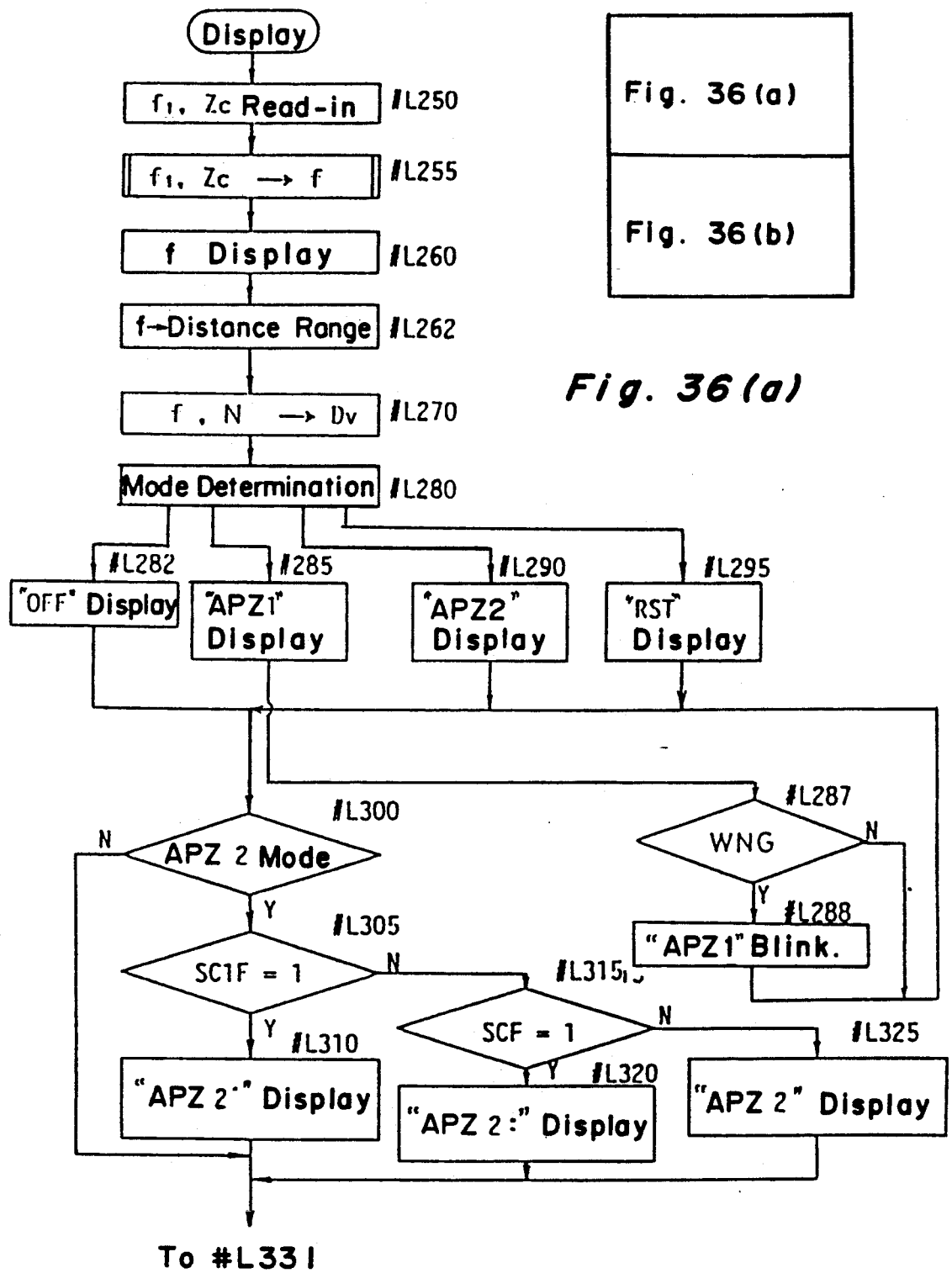

The display subroutine for controlling the foregoing display patterns is shown in FIG. 36. When this display subroutine is called for, a data $f_1$ indicative of the current focal length range is read from the zooming encoder ZMEN at step #L250. At the same time, the count Zc of the zoom counter ZC for counting the number of pulses from the encoder ENC3 is also read. Based on those data $f_1$ and Zc, the accurate focal length f is determined at step #L255, which is in turn displayed at step #L260.

Figure 37:
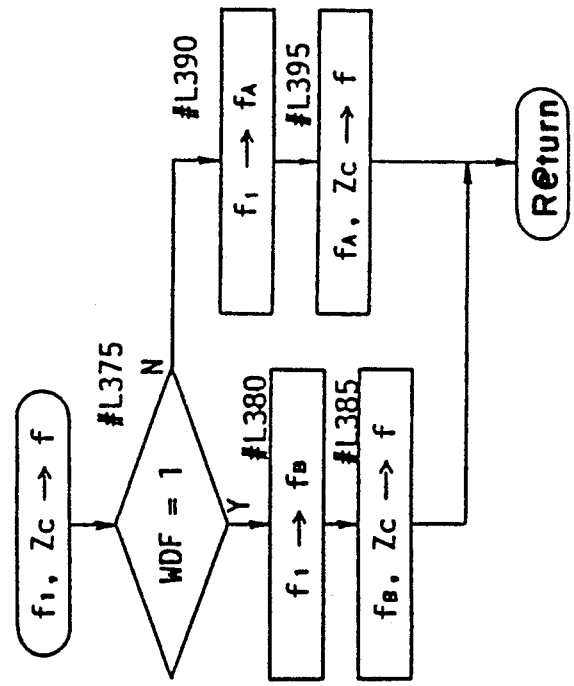

A subroutine for the determination of the focal length f from the data $f_1$ and Zc is shown in FIG. 37. As shown therein, when this subroutine is called for, a decision is made at step #L375 to determine a flag WDF indicative of the zooming lens being moved in the direction towards the shortest focal length is set. If the result of decision at step #L375 indicates the movement of the zooming lens towards the shortest focal length position, i.e., when the flag WDF is set, the longest focal length $f_B$ within the focal length range $f_1$ is read from a ROM table at step #L380. Then, at step #L385, based on the ROM table, the accurate focal length f is read according to the longest focal length $f_B$ and the count Zc counted by the zoom counter ZC indicative of the zooming amount in the focal length range $f_1$, followed by a return of the program flow. On the other hand, if the result of decision at step #L375 indicates that the flag WDF is not set, the shortest focal length $f_A$ in the focal length range $f_1$ is read from the ROM table at step #L390 since the zoom lens has been moved towards the longest focal length position, followed by step #L395 at which, based on the ROM table, the accurate focal length f is read according to the shortest focal length $f_A$ and the count Zc counted by the zoom counter ZC indicative of the zooming amount in the focal length range $f_1$. Thereafter, the program flow returns. The relationship between the focal distance range $f_1$ and the shortest focal length $f_A$ as well as the longest focal length $f_B$ are shown in Table 1 below.

TABLE 1

| $f_1$ (mm) | $f_A$ (mm) | $f_B$ (mm) |
|---|---|---|
| 28~34 | 28 | 34 |
| 35~49 | 35 | 49 |
| 50~64 | 50 | 64 |
| 65~79 | 65 | 79 |
| 80~94 | 80 | 94 |
| 95~109 | 95 | 109 |
| 110~124 | 110 | 124 |
| 125~139 | 125 | 139 |
| 140~154 | 140 | 154 |
| 155~169 | 155 | 169 |
| 170~184 | 170 | 184 |
| 185~200 | 185 | 200 |

Referring to the flowchart of FIG. 36, at step #L262 a decision is made to determine if the selected focal length f is greater than 80 mm and if the selected focal length f is equal to or smaller than 80 mm, the upper row (0.3 m~∞) is selected, but if the selected focal length f is greater than 80 mm, the lower row (0.6 m~∞) is selected. Then, at step #L270, based on the focal length f and the amount N of extension of the lens inputted from the camera body, the distance Dv is calculated and displayed. The details of a method of calculating the distance Dv are disclosed in, for example, the Japanese Patent Application No. 63-28512, reference to which is herein incorporated. At subsequent step #L280, the zooming mode is determined and, if it is the OFF mode, the legend "OFF" is displayed at step #L282; if it is the APZ1 mode, the legend "APZ1" is displayed at step #L285; if it is the APZ2 mode, the legend "APZ2" is displayed at step #L290; or if it is the reset mode, the legend "RST" is displayed at step #L295. It is to be noted that, if the zooming mode is the APZ1 mode, a decision is made at step #L287 to determine if a warning data WNG is set and, if it has been set as determined at step #L287, the legend "APZ1" being displayed is caused to blink at step #L288.

At step #L300, a decision is made to determine if the mode is the APZ2 mode and, if it is the APZ2 mode, the program flow goes to step #L305 at which a decision is made to determine if a flag SC1F indicative of the first point of the two points having been set is set. Should the result of decision at step #L305 indicate that the flag SC1F has been set, the program flow goes to step #L310 to effect a display of the legend "APZ2",Obut if it indicate that the flag SC1F has not been set, the program flow goes to step #L315 to determine if a flag SCF indicative of the second point of the two points having been set is set. Should the result of decision at step #L315 indicate that the flag SCF has been set, the legend "APZ" is displayed at step #L320, but if neither the flag SC1F nor the flag SCF have been set, only the legend "APZ2" is displayed at step #L325. Subsequent to any one of steps #L310, #L320 and #L325, or when the result of decision at step #L300 indicate that the mode is not the APZ2 mode, the program flow goes to step #L331 at which the encoder ZVEN indicative of the zooming speed and the zooming direction is read in, followed by a decision at step #L332 to determine if a zooming switch Z·SW for the drive of the zooming lens is switched on. If the result of decision at step #L332 indicates that the zooming switch Z·SW is not switched on, the program flow goes to step #L350 at which only the focal length is displayed, followed by step #L355. On the other hand, if the result of decision at step #L332 indicates that the zooming switch Z·SW is switched on, a decision is made at subsequent step #L335 to determine the zooming direction. If the result of decision at step #L335 indicates that the zooming lens is moving in the TELE (telephoto) direction, the rightwardly directed arrow marking is displayed at step #L340, but if it indicates that the zooming lens is moving in the WIDE direction, the leftwardly directed arrow marking is displayed at step #L345. Thereafter, step #L355 takes place at which the magnification $\beta$ is calculated based on the focal length f and the distance Dv. Then at step #L360, a decision is made to determine if the photo-taking magnification $\beta$ is greater than a predetermined value $\beta_K (=1/10)$ and, if it is greater than the predetermined magnification $\beta_K$, a legend "MACRO" is displayed at step #L365, but if it is not greater than the predetermined magnification $\beta_K$, the legend "MACRO" once displayed is erased at step #L370, followed by the return of the program flow.

Figure 38:
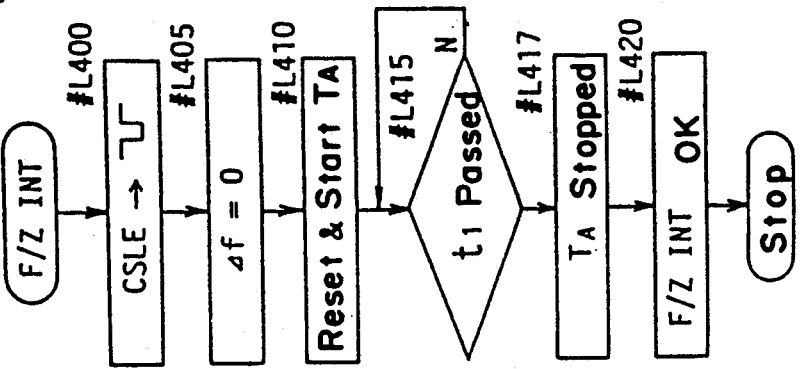

When the operating ring 80 is manipulated while both of the body mounted microcomputer $\mu C1$ and the lens mounted microcomputer $\mu C2$ are brought to a halt, or while an old camera body (conventionally utilized camera body) is employed and the lens mounted microcomputer $\mu C2$ is brought to a halt, an F/ZINT interruption routine shown in FIG. 38 is executed for effecting the powered zooming PZ. Referring to FIG. 38, when this F/ZINT interruption occurs, the lens mounted microcomputer $\mu C2$ instantaneously render the terminal CSLE to be in a low level state thereby to allow the interruption to occur to the camera body at step #L400. Then, at step #L405, the amount of shift $\Delta f$ (as will be described later) during the APZ2 mode is rendered to be zero and the timer $T_A$ is subsequently reset and started at step #L410. Then, at step #L415, a wait is made until the timer $T_A$ completes counting up to t1 so that the body mounted microcomputer $\mu C1$ can determine if the lens assembly used is an old lens assembly. If the lens assembly used is found not to be the old lens assembly, the terminal CSLE is rendered in a low level state to update the data inputted to the camera body subsequent to the F/ZINT interruption. In response to this, a CS interruption as will be described later occurs in the lens assembly and another flow is executed before the timer $T_A$ completes counting up to the time t1. However, where the main switch $S_M$ in the camera body is in the OFF state, the above described data communication does not take place. Accordingly, even though the terminal CSLE is instantaneously rendered in the low level state at step #L400, the CS interruption does not take place and the timer $T_A$ completes the counting up to the time t1. When the timer $T_A$ completes the counting at step #L415, it stops the counting and, at step #L420, the F/ZINT interruption is enabled by the operation of the operating ring 80, followed by a halt of the microcomputer.

Figure 41B:
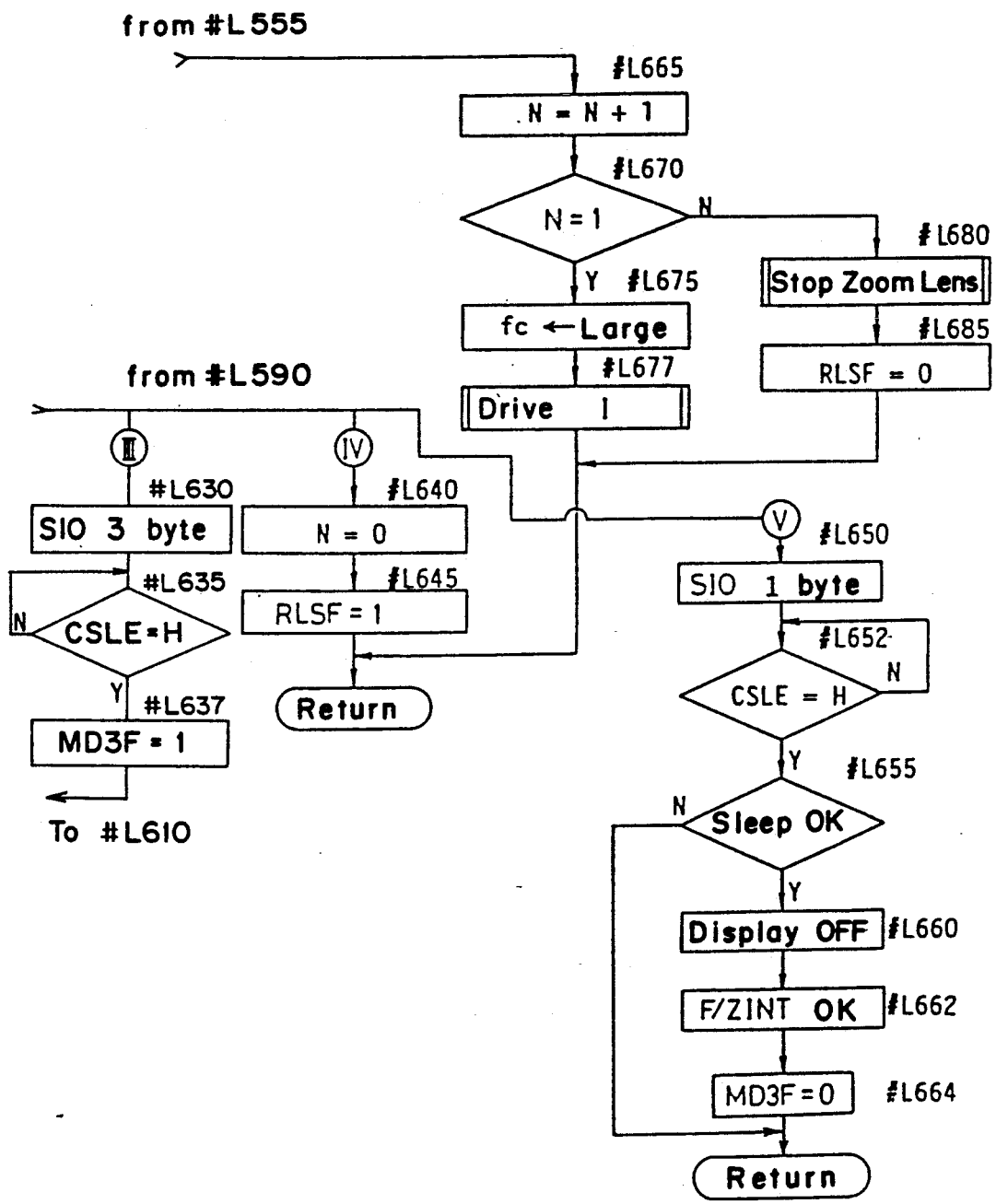

When a signal varying from a high level state to a low level state is transmitted from the camera body to the terminal CSLE in the lens assembly, the lens mounted microcomputer μC2 executes the CS interruption routine shown in FIG. 41. According to the CS interruption routine shown in FIG. 41, the F/ZINT interruption resulting from the manipulation of the operating ring 80 is disabled at step #L550 and a decision is subsequently made at step #L555 to determine if a flag RLSF indicative of the shutter release taking place is set. If the flag RLSF is not set, that is, the shutter release does not take place, a 2-byte serial communication takes place at step #L560 in response to clocks from the camera body. Then, at step #L565 a decision is made based on the data transmitted as a result of the 2-byte serial communication to determine if the camera body used is an old camera body and, if the camera body used is found to be the old camera body, a 6-byte serial communication takes place at step #L570 to transmit the lens data to the camera body, followed by a wait at step #L575 until the signal applied to the terminal CSLE is rendered in a high level state. Once the signal applied to the terminal CSLE is rendered in the high level state, the interruption F/ZINT is enabled at step #L580, followed by a return of the program flow. If the result of decision at step #L565 indicate that the camera body used is not the old camera body, a 1-byte serial communication takes place at step #L585 to transmit from the camera body data indicative of the communication mode and the extension mode, followed by the determination of the communication mode at step #L590.

If the communication mode is found to be the mode I, a wait is made until the signal applied to the terminal CSLE changes from the low level state to a high level state at step #L595 and, once the signal to the terminal CSLE is rendered in the high level state, a subroutine for the zooming lens retraction is executed at step #L600. In such case, since the retraction mode is set to the mode II, the zooming lens is moved to a position where the predetermined photo-taking magnification can be attained and, once the zooming lens has been moved to such position, the terminal CSLE is instantaneously rendered in a low level at step #L605 to indicate that the zooming has been completed, followed by an execution of the PZ subroutine at step #L610. After the execution of the PZ subroutine at step #L610, a display subroutine is repeated at step #L612. The display which takes place at step #L612 is continued until the body mounted microcomputer μC1 interrupts the supply of the electric power to the lens mounted circuit $LE_{CT}$, that is, until the main switch $S_M$ is switched off or the photo-taking ready switch S1 is kept switched off for a length of time equal to or greater than 5 seconds.

Figure 42:
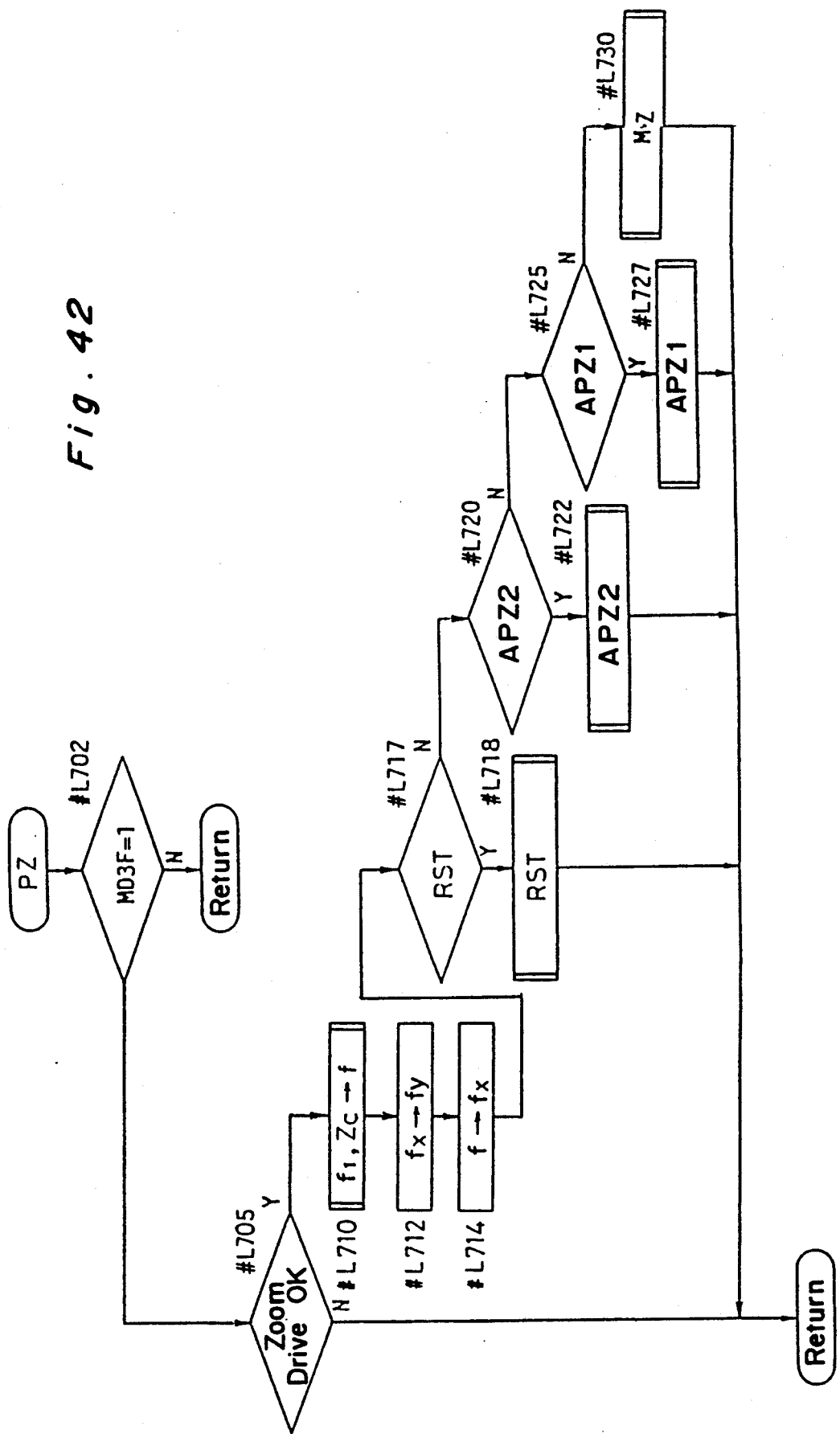

The PZ subroutine executed at step #L610 of FIG. 41 is shown in FIG. 42. When this subroutine is called for, the lens mounted microcomputer μC2 determines at step #L702 whether or not a flag MD3F indicative of the completion of the data communication under the mode III has been set. Unless the flag MD3F is set, the program flow returns, inhibiting the setting of the mode. On the other hand, if the flag MD3F is set, the program flow goes to step #L705. The subsequent program flow beginning from step #L705 will be described later in detail.

Reverting to the flowchart of FIG. 41, if the result of mode determination at step #L590 indicates the data communication under the mode II, a 12-byte data is outputted at step #L620 to the camera body and, if the terminal CSLE is rendered in the high level state by the detection of a change of the terminal CSLE from the low level state to the high level state at step #L625, the program flow goes to the PZ subroutine at step #L610.

ON the other hand, if the result of mode determination at step #L590 indicates the data communication under the mode III, a 3-byte data is inputted from the camera body at step #L630 and, at step #L635, a wait is made until the terminal CSLE changes from the low level state to a high level state. When the terminal CSLE changes to the high level state, a flag MD3F indicative of the completion of the data communication under mode III is set at step #L640, followed by the execution of the PZ subroutine at step #L610.

Referring to FIG. 42, the program flow of the PZ subroutine subsequent to step #L705 will now be described. As hereinbefore described, if the data communication under the mode III is executed even one time, the flag MD3F is set and the program flow proceeds from step #L702 onto step #L705. At step #L705, a decision is made on the basis of the data inputted from the camera body to determine if the drive of the zooming lens is possible. If the zooming lens drive is not possible, the program flow immediately returns. On the other hand, if the result of decision at step #L705 indicates that the zooming lens drive is possible, the focal length f is determined based on the focal length range $f_1$ and the count value Zc of the zooming counter ZC at step #L710, and the focal length fx obtained previously is set as fy at step #L712. Then, at step #L714, the focal length f thus obtained is set as fx, followed by step #L717 at which a decision is made to determine if the reset mode RST is selected. Should the result of decision at step #L717 indicate that the reset mode RST is selected, the subroutine for the reset mode is executed at step #L718, followed by the return of the program flow. On the other hand, if the result of decision at step #L717 indicates that the reset mode is not selected, another decision takes place at step #L720 to determine if the mode selected in the APZ2 mode. If the APZ2 mode is selected as determined at step #L720, the APZ2 subroutine is executed at step #L722, followed by the return of the program flow. If the result of decision at step #L720 indicates that the mode selected is not the APZ2 mode, a further decision is made at step #L725 to determine if it is the APZ1 mode. If the result of decision at step #L725 indicates that the APZ1 mode has been selected, the APZ1 subroutine is executed at step #L727, followed by the return of the program flow. If the result of decision at step #L725 indicates that the mode selected is not the APZ1 mode, the subroutine for the manual zooming M-Z is executed at step #L730, followed by the return of the program flow.

Figure 44:
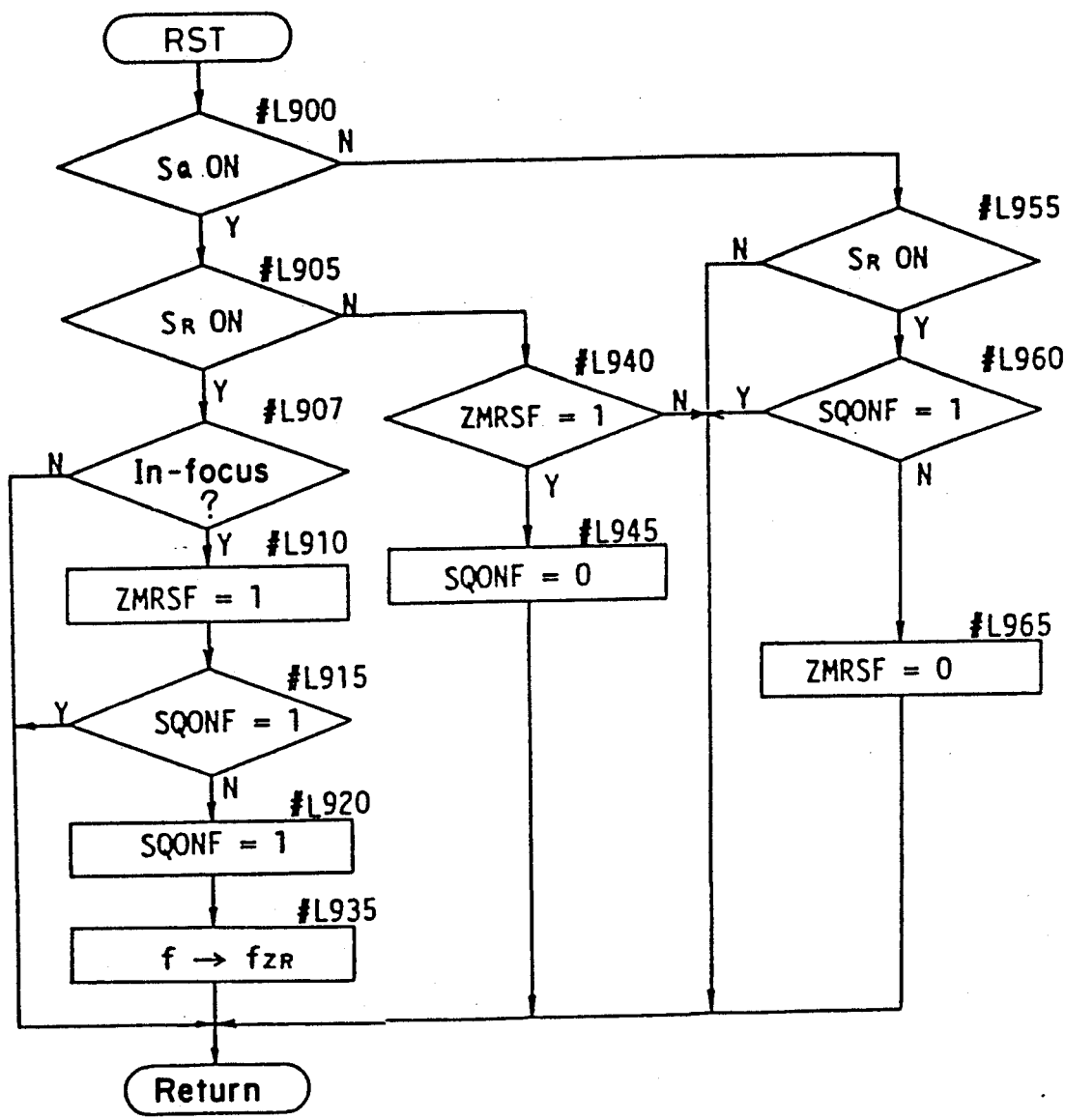

Hereinafter, each of the RST, APZ2, APZ1 and M-Z subroutines will be described. In the first place, when the result of decision at step #L717 indicates that the mode selected is the reset mode, the RST (reset) subroutine shown in FIG. 44 is executed. Referring to FIG. 44, and when this subroutine is called for, a decision is made at step #L900 to determine if the lens switch $S_Q$ is turned on and, if it has been turned on, another decision is made at step #L905 to determine if the memory switch $S_R$ adapted to be manipulated for storing the current status is turned on. Where the memory switch $S_R$ has been found turned on, the program flow goes to step #L907 to determine on the basis of the data inputted from the camera body if an in-focus state is attained. Should the result of decision at step #L907 indicates that no in-focus state is attained, the program flow returns, but if it indicate that the in-focus state is attained, a flag ZMRSF indicative of the completion of the storage of the status under the reset mode is set at step #L910. Then, a decision is made at step #L915 to determine if the flag SQONF indicative of the lens switch $S_Q$ having been once switched on is set and, if it is set, the program flow returns as the flag SQONF has been set. On the other hand, if the flag SQONF is not set, the flag SQONF is set at step #L920 and the focal length f determined in the manner as hereinbefore described is stored as a zooming reset value $f_{ZR}$ at step #L935, finally allowing the program flow to return.

On the other hand, if the result of decision at step #L905 indicates that the memory switch $S_R$ is switched off, the program flow goes to step #L940 at which a decision is made to determine if a flag ZMRSF indicative of the completion of the setting under the reset mode is set. If this flag ZMRSF is found having been set, the flag SQONF is reset at step #L945, with the program flow subsequently returning. Also, where the result of decision at step #L900 indicates that the lens switch $S_Q$ is not switched on, the program flow goes to step #L955 at which a decision is made to determine if the memory switch $S_R$ is switched on and, if the memory switch $S_R$ is not switched on (i.e., nothing is manipulated), the program flow returns. However, if the result of decision at step #L955 indicates that the memory switch $S_R$ is switched on, another decision takes place at step #L960 to determine if the flag SQONF indicative of the lens switch $S_Q$ having been turned on is set. If the result of decision at step #L960 indicates that the flag SQONF is set, it is determined that, subsequent to the completion of setting under the reset mode, the lens switch $S_Q$ is switched off, and the program flow returns. ON the other hand, if the result of decision at step #L960 indicate that the flag SQONF is not set, it is determined that the memory switch $S_R$ used to reset the set value under the reset mode is switched on, and the flag ZMRSF indicative of the completion of the setting under the reset mode is therefore reset at step #L965 and the program flow subsequently returns.

Figure 45B:
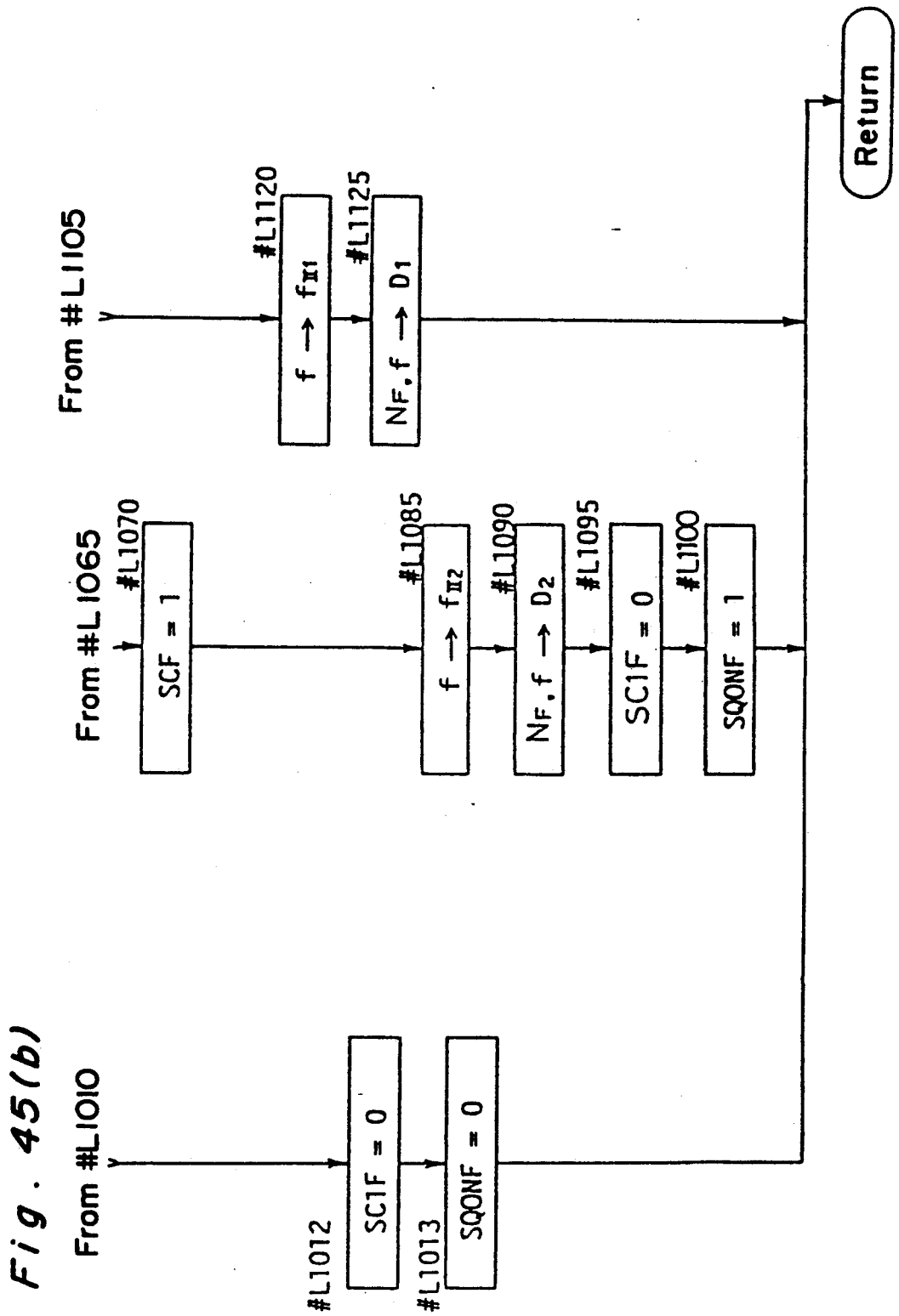

Referring to the flowchart of FIG. 42, if the result of decision at step #L717 indicates that the mode selected is not the reset mode, another decision is made at step #L720 to determine if the mode selected is the APZ2 mode. If it is the APZ2 mode, the APZ2 subroutine is executed at step #L722. This APZ2 subroutine is shown in FIG. 45, reference to which will now be made. When this APZ2 subroutine is called for, a decision is made at step #L1000 to determine if an in-focus state is obtained. If no in-focus state is obtained, the program flow returns, but if it is obtained, a further decision is made at step #L1002 to determine if the memory switch $S_R$ is turned on. If the result of decision at step #L1002 indicates that the memory switch $S_R$ is not turned on, the program flow goes to step #L1005 at which a decision is made to determine if the flag APZ2F is set. This flag APZ2F is a flag which indicates the completion of the setting under the APZ2 mode and the control under the APZ2 mode is possible. Should the result of decision at step #L1005 indicate that the flag APZ2F is set, three flags SCF, SC1F and SQONF are sequentially reset at steps #L1020, #L1025 and #L1030. Thereafter, the program flow goes to step #L1035 at which the control focal length fc is calculated from the amount N of extension of the lens using the following equation.

$$fc = \{(f_{111} - f_{112})N + D_1 \cdot f_{111}\}/(D_1 - D_2)$$

In the above equation, $f_{111}$ represents the focal length of the first point of the two points set under the APZ2 mode; $f_{112}$ represents the focal length of the second point of the two points set under the APZ2 mode; $D_1$ represents the distance of the first point of the two points set under the APZ2 mode; and $D_2$ represents the distance of the second point of the two points set under the APZ2 mode. Then, in order to drive the zooming lens, the subroutine for the drive I is executed at step #L1040, followed by a return of the program flow.

On this occasion, the subroutine for the drive I will now be described with reference to FIG. 39. When this subroutine for the drive I is called for, the amount $M_F$ of deviation of the focus relative to the focal length fc determined is determined at step #L480 as the amount of extension of the lens from the infinity position at which the lens assembly is focused at the target object spaced an infinity distance from the camera system.

Hereinafter, the determination of the amount $M_F$ of deviation of the focus will be discussed.

Figure 57:
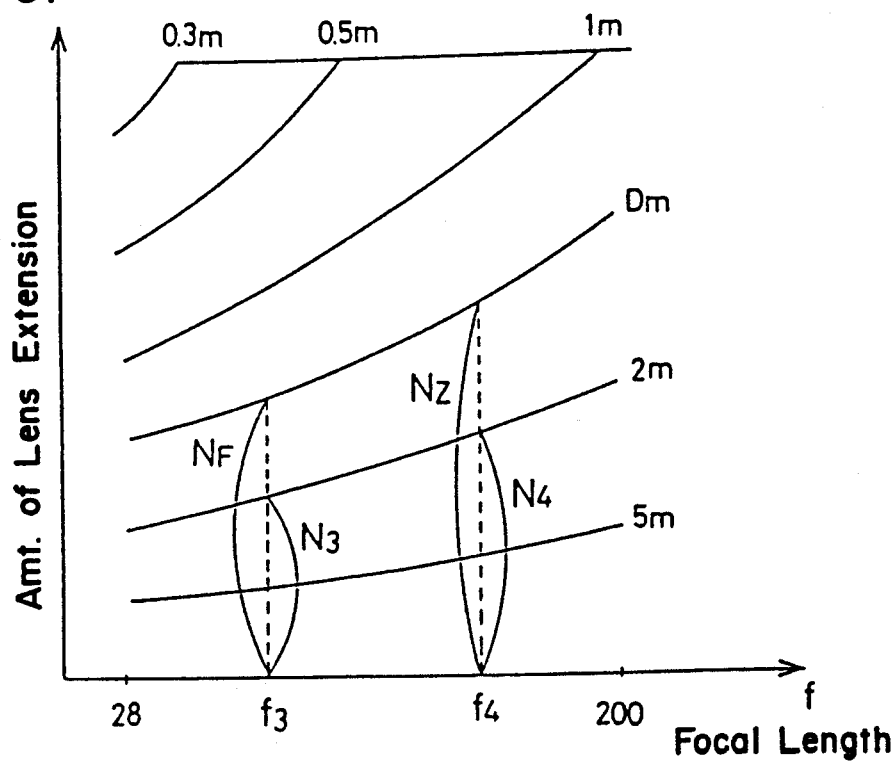
FIG. 57 is a chart used to illustrate how to correct the focal point of a varifocal lens assembly.

FIG. 57 illustrates a graph wherein the axis of abscissas represents the focal length f and the axis of ordinates represents the amount of extension of the lens. The lens assembly shown in the illustrated embodiment is of a design wherein the ratio the amount of extension of the lens at a specific distance, for example, 2 meters, relative to the amount of extension of the lens at a detected distance D (meter) is constant irrespective of the focal length. Data of the amount of extension of the lens for each focal length with respect to the specific distance are stored in the read-only memory built in the lens mounted microcomputer $\mu C2$. Let it be assumed that the specific distance is set to 2 meters and the lens assembly with the zooming lens adjusted to a focal length $f_3$ is focused on the target object located a distance of D meter away from the camera system and, then, the zooming lens is moved to render the lens assembly to have a focal length of $f_4$. When the amount of extension of the lens effected when the focal length is $f_3$ and the distance is 2 meter is expressed by N3; the amount of extension of the lens effected when the focal length is $f_3$ and the distance is D meter is expressed by $N_F$; and the amount of extension of the lens effected when the focal length is $f_4$ and the distance is 2 meters is expressed by N4, the amount $N_z$ of extension of the lens effected when the focal length is f4 and the distance is D meter can be approximated to $N_F/N3 = N_Z/N4$ and, hence, $N_Z = N_F(N4/N3)$. Accordingly, the correction amount N2 over which the amount of extension of the lens should be compensated for incident to the zooming to the focal length $f_4$ can be calculated by an equation, $N2 = N_Z - N_F = (N4/N3 - 1)N_F$. o In the foregoing example, the specific distance has been chosen to be 2 meters. However, where the amount of extension of the lens contains an error or where the distance is greater than 2 meters, the foregoing relationship does not always exhibit a proportional relationship and may have an error. In other words, such error occurs often when the focal length is great and the distance is small. In order to minimize or substantially eliminate the error, three specific distances of 1 meter, 2 meters and 5 meters are provided for the purpose of the preferred embodiment of the present invention.

Figure 43:
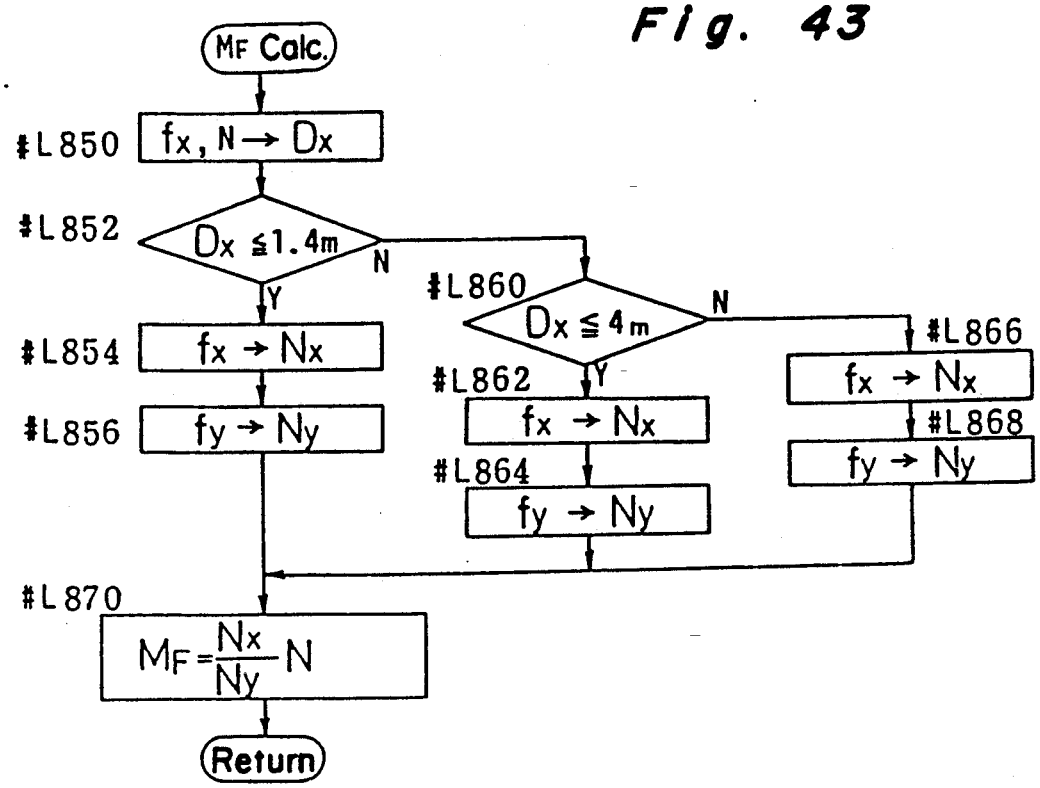

The program flow executed by the lens mounted microcomputer $\mu C2$ for accomplishing the above described control is shown in FIG. 43, reference to which will now be made. As shown in FIG. 43, subsequent to the start of the program flow and at step #L850, the distance Dx is determined on the basis of the current focal length fx and the amount N of extension of the lens from the infinity position inputted from the camera body. Then, at step #L852, a decision is made to determine if the distance Dx is equal to or smaller than 1.4 meter and, if the distance Dx is equal to or smaller than 1.4 meter, the amounts Nx and Ny of extension of the lens from the infinity position with the focal length set at the current focal length fx and the previous focal length fy, respectively, are determined at successive steps #L854 and #L856 in reference to a line of the distance of 1 meter, followed by step #L870. This can be accomplished by reading from the ROM table which stores the amounts Nx and Ny of extension of the lens at the distance of 1 meter with the focal lengths fx and fy used as respective addresses. When the distance Dx is greater than 1.4 meter, as determined at step #L852, and equal to or smaller than 4 meters as determined at step #L860, the amounts Nx and Ny of extension of the lens at the specific distance of 2 meters are similarly determined at successive steps #L862 and #L864. Similarly, when the distance Dx is greater than 4 meters as determined at step #L860, the amounts Nx and Ny of extension of the lens at the specific distance of 5 meters are determined at successive steps #L866 and #L868, and the program flow then goes to step #L870. At step #L870, the amount MF of extension of the lens during the correction is determined using an equation, $M_F = (Nx/Ny) \times N$, and the program flow returns subsequently.

Figure 39:
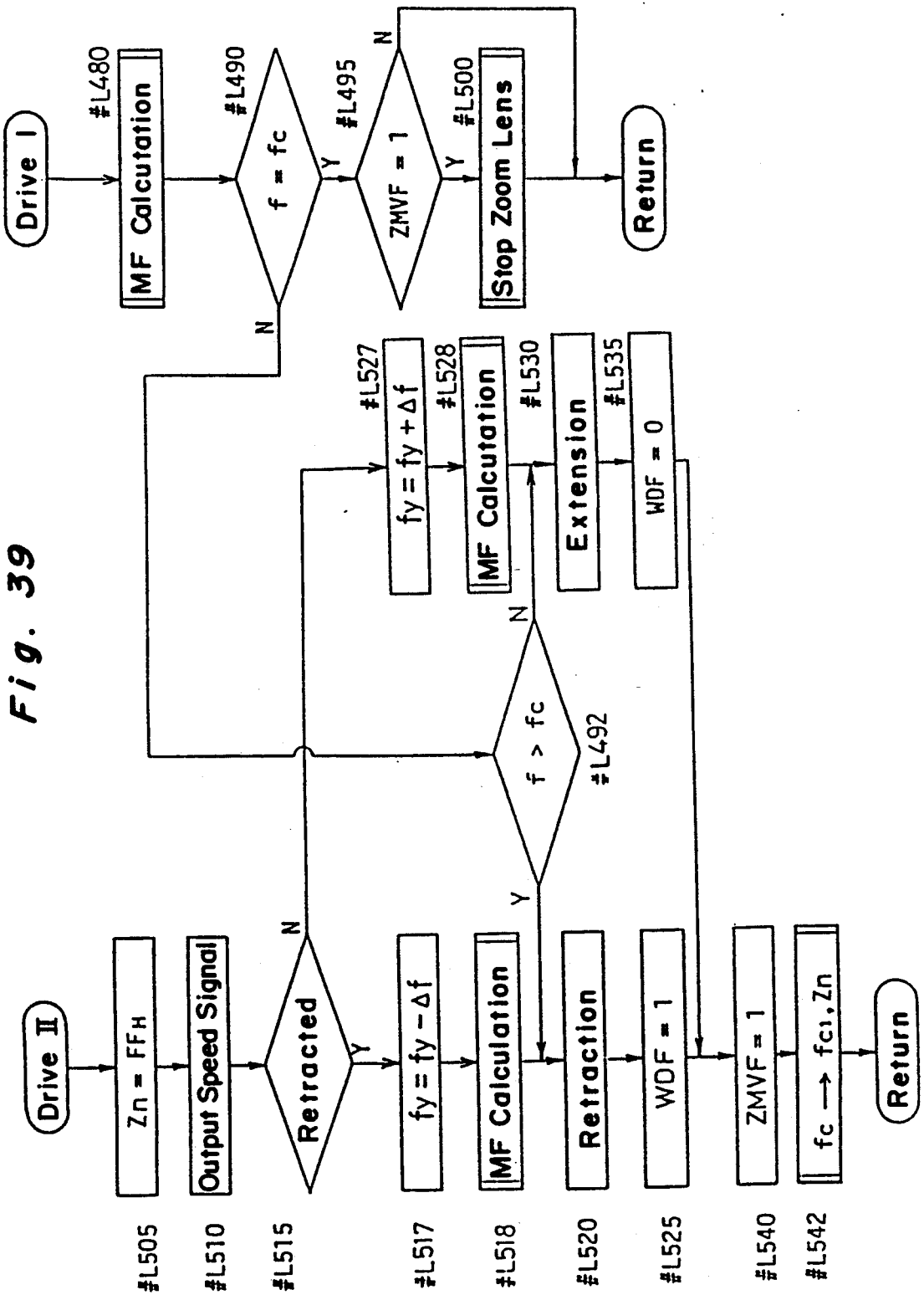

Reverting to the flowchart of FIG. 39, after the execution of the subroutine for the calculation of the amount $M_F$ at step #L480, a comparison is made at step #L490 between the control focal length fc, set during the execution of the reset routine, and the current focal length f. If the control focal length fc is equal to the current focal length, another decision is made at step #L495 to determine of a flag ZMVF indicative of the lens being driven is set. If the flag ZMVF is not set as determined at step #L495, the program flow returns subsequently. On the other hand, if the result of decision at step #L495 indicate that the flag ZMVF is set, a subroutine for stopping the zooming lens is executed at step #L500, followed by a return of the program flow. On the other hand, if the result of comparison at step #L490 indicates that the control focal length fc is not equal to the current focal length f, the program flow goes to step #L492 at which another decision is made to determine if the control focal length fc is smaller than the current focal length f. If the control focal length fc is smaller than the current focal length f as determined at step #L492, the program flow goes to step #L520 at which the zooming lens is driven (or retracted) towards the Tele position whereas, if the control focal length fc is greater than the current focal length f, the program flow goes to step #L530 at which the zooming lens is driven (or extended) towards the Wide position. The operation which takes place subsequent to any one of the steps #L520 and #L530 will be discussed later.

The operation which takes place if during the execution of the counter interruption routine of FIG. 33 the flag ZIF is not set, i.e., ZIF=0, at step #L110 of FIG. 33 will now be described. Referring to step #L115 of FIG. 33, a decision is made to determine if the mode selected is the OFF mode. Should the result of decision at step #L115 indicate that the mode selected is not the OFF mode, the focal length range $f_1$ is read from the zooming encoder ZMEN at step #L140, followed by a decision step #L145 at which a decision is made to determine if the focal length range $f_1$ is equal to the value $fc_1$ of the zooming encoder ZMEN corresponding to the calculated control focal length fc. If the result of decision at step #L145 indicates that the focal length range $f_1$ is not equal to the zooming encoder value $fc_1$, the program flow returns subsequently. ON the other hand, if the result of decision at step #L145 indicates that the focal length range $f_1$ is equal to the zooming encoder value $fc_1$, another decision is made at step #L150 to determine if a flag $fc_1F$ indicating that the program has once passed through this step is set. If the flag $fc_1F$ is set as determined at step #L150, the count value Zn indicative of the amount of drive is decremented by one at step #L151 with the driving speed V subsequently reduced to a value V1 at step #L152 and the program flow then goes to step #L154. On the other hand, if the result of decision at step #L150 indicate that the flag $fc_1F$ is not set, this flag $fc_1F$ is set at step #L153, followed by step #L154. At step #L154, a decision is made to determine if the count value Zn indicative of the amount of drive is zero and, if the count value Zn is zero, the subroutine for stopping the lens is executed at step #L155 and the flag $fc_1F$ is subsequently reset at step #L156, followed by a return of the program flow. On the other hand, if the result of decision at step #L154 indicates that the count value Zn is not zero, the program flow returns immediately.

Referring to FIG. 45, should the result of decision at step #L1005 indicate that the flag APZ2F indicative of the capability of control under the APZ2F mode is not set, a decision is made at step #L1010 in reference to the flag SCF to determine whether or not the storage of the two points have been completed. If the storage of the two points have been completed as shown by SCF=1 at step #L1010, it means that the memory switch $S_R$ has been switched off as a result of the completion of the storage and, therefore, the flag APZ2F indicative of the capability of control under the APZ2F mode is set at step #L1015, followed by a return of the program flow. It is to be noted that the data of this flag is outputted to the camera body as a data indicative of the presence or absence of setting of the APZ2 mode. On the other hand, if the result of decision at step #L1010 indicate that the flag SCF is not set, that is, if the storage of the two points has not yet been completed, it means that the memory switch $S_R$ has been manipulated for releasing or re-setting the storage and, therefore, the flags SC1F and SQONF are reset at respective steps #L1012 and #L1013, followed by a return of the program flow.

On the other hand, if the memory switch SR is found switched on at step #L1002, the flag APZ2F indicative of the capability of control under the APZ2 mode is reset at step #L1045, followed by a decision step #L1050 at which a decision is made to determine if the lens switch $S_Q$ is switched on. If the lens switch $S_Q$ is found switched on, another decision takes place at step #L1055 to determine if the flag SCF indicative of the completion of setting of the two points is set. If the flag SCF is found having been set at step #L1055, the program flow returns subsequently, but if the flag SCF is found having not been set at step #L1055, a further decision is made at step #L1060 to determine if the flag SC1F indicative of the completion of setting of the first point is set. Should the flag SC1F be found having been set at step #L1060, a still further decision is made at step #L1065 to determine if the flag SQONF indicative of the lens switch $S_Q$ having been switched on is set. If the flag SQONF is found having been set at step #L1065, it means that the lens switch $S_Q$ is kept switched on even after the setting of the second point and, therefore, the program flow immediately returns. However, should the result of decision at step #L1065 indicate that the flag SQONF is not set, it means that the lens switch $S_Q$ for setting the second point is switched on and, therefore, the program flow goes to step #L1070 for the storage of the second point. At step #L1070, the flag SCF is set, followed by step #L1085 at which the focal length f is rendered to be a second set value $f_{I/2}$. Then, at step #L1090, the distance D is determined on the basis of the amount NF of extension of the AF lens read from the camera body and the focal length f so that the distance D can be utilized as the second set value $D_2$. Subsequently and at step #L1095, the flag SC1F indicative of the completion of the storage of the first point is reset and, thereafter, the flag SQONF indicative of the lens switch $S_Q$ having been switched on is set at step #L1100, allowing the program flow to return subsequently.

It is to be noted that the determination of the distance D on the basis of the focal length f and the amount $N_F$ of extension of the lens may be accomplished either by calculating each time the necessity arises or with the use of a ROM table from which the distance D can be read using a combination of the focal length f and the lens extension amount $N_F$ as an address.

In the event that the result of decision at step #L1060 indicates that the flag SC1F indicative of the completion of the storage of the first point is not set, it means that the switch $S_Q$ for the storage of the first point is switched on. At this time, the program flow goes to step #L1105 at which a decision is made to determine if the flag SQONF indicative of the lens switch $S_Q$ having been switched on is set. If the flag SQONF is found having not been set, the program flow goes to step #L1120 as this program flow is executed only when the lens switch $S_Q$ is switched on. At step #L1120, the focal length f is rendered to be the first set value $f_{I/1}$. Thereafter, the distance D is determined on the basis of the focal length f and the amount $N_F$ of extension of the AF lens read from the camera body and is rendered to be the first set value $D_1$ at step #L1125, followed by a return of the program flow. In the event that the result of decision at step #L1105 indicates that the flag SQONF is not set, it means that the lens switch $S_Q$ is kept switched on even after the completion of the setting of the first point and, therefore, the program flow immediately returns. Where the lens switch $S_Q$ is found having not been switched on at step #L1050, the program flow goes to step #11127 at which a decision is made to determine if the flag SQONF is set. If the flag SQONF is found having been set at step #L1127, it means that the lens switch $S_Q$ is switched off subsequent to the setting of the flag SQONF and, therefore, the program flow goes to step #L1130 at which a decision is made to determine of the flag SCF indicative of the completion of setting of the second point is set. In the event that the flag SCF is found having not been set at step #L1130, it means that the setting of the first point has not yet been completed and, therefore, the flag SC1F is set at step #L1135, followed by step #L1140.

On the other hand, should the result of decision at step #L1130 indicate that the flag SCF has been set, the program flow skips step #L1135 onto step #L1140 at which the flag SQONF is reset, permitting the program flow to return subsequently. In the event that the result of decision at step #L1127 indicate that the flag SQONF is not set, it means that the lens switch $S_Q$ is kept switched on and, therefore, the program flow immediately returns.

Figure 47:
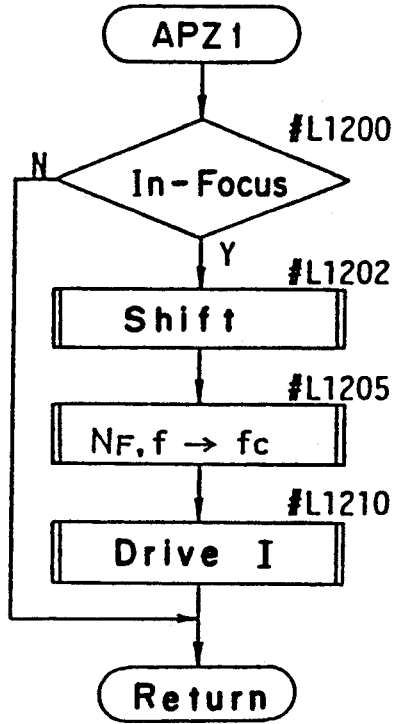

Referring to FIG. 42, in the event that the result of decision at step #L720 indicates that the mode selected is not the APZ2 mode, another decision is made at step #L725 to determine if it is the APZ1 mode and if it is found the APZ1 mode, the APZ1 subroutine is executed at step #L727. This APZ1 subroutine is shown in FIG. 47, reference to which will now be made for the details thereof. Subsequent to the start of the APZ1 subroutine, and at step #L1200 a decision is made to determine if the target object is focused and, in the event that the target object is not focused, the program flow returns. However, if the target object is focused as determined at step #L1200, a process of shifting the photo-taking magnification as a result of the zooming operation is executed at step #L1202 and the control focal length fc is then determined at step #L1205 on the basis of the amount $N_F$ of extension of the AF lens and the focal length f thereof, followed by an execution of the drive I subroutine at step #L1210 for driving the zooming lens before the program flow returns.

Figure 48:
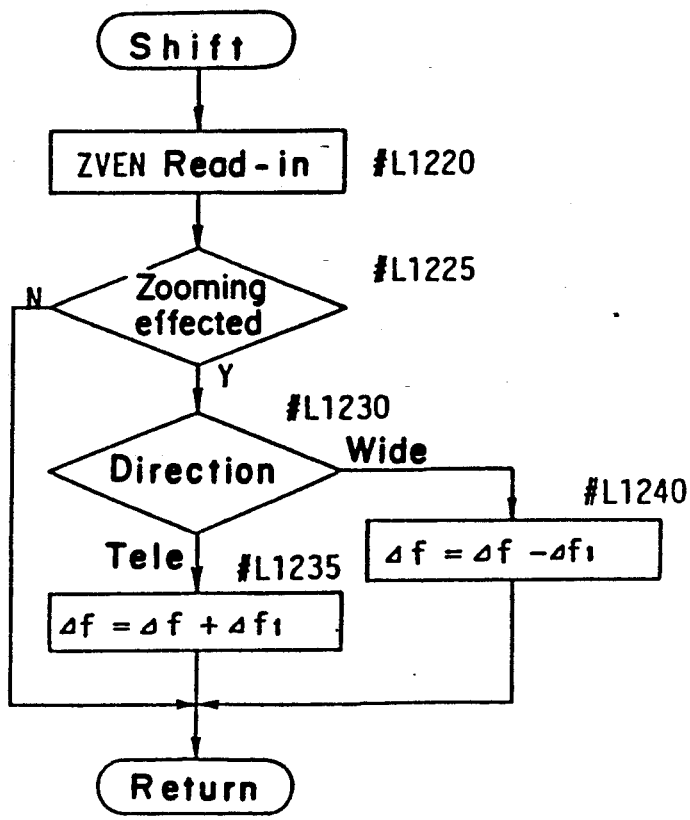

The subroutine for the shift process referred to above is shown in FIG. 48. When this shift subroutine is called for, data are read at step #L1220 from the encoder ZVEN indicative of whether or not the zooming operation is effected, followed by a decision step #L1225 at which a decision is made to determine if the zooming operation is effected. If the result of decision at step #L1225 indicates that the zooming operation is not effected, the program flow returns, but if it indicates that the zooming operation is effected, another decision is made at step #L1230 to determine the direction of zooming. Where the zooming operation is effected with the zooming lens driven towards the Tele direction, step #L1235 takes place at which a predetermined amount $\Delta f_1$ is added to the amount $\Delta f$ of variation. Where the zooming operation is effected with the zooming lens driven towards the Wide direction, step #L1240 takes place at which the predetermined amount $\Delta f_1$ is subtracted from the amount $\Delta f$ of variation. After any one of steps #L1235 and #L1240, the program flow returns. In this example, only the direction of zooming is taken into consideration and no angle of rotation of the operating ring 80 is taken into consideration.

Figure 46:
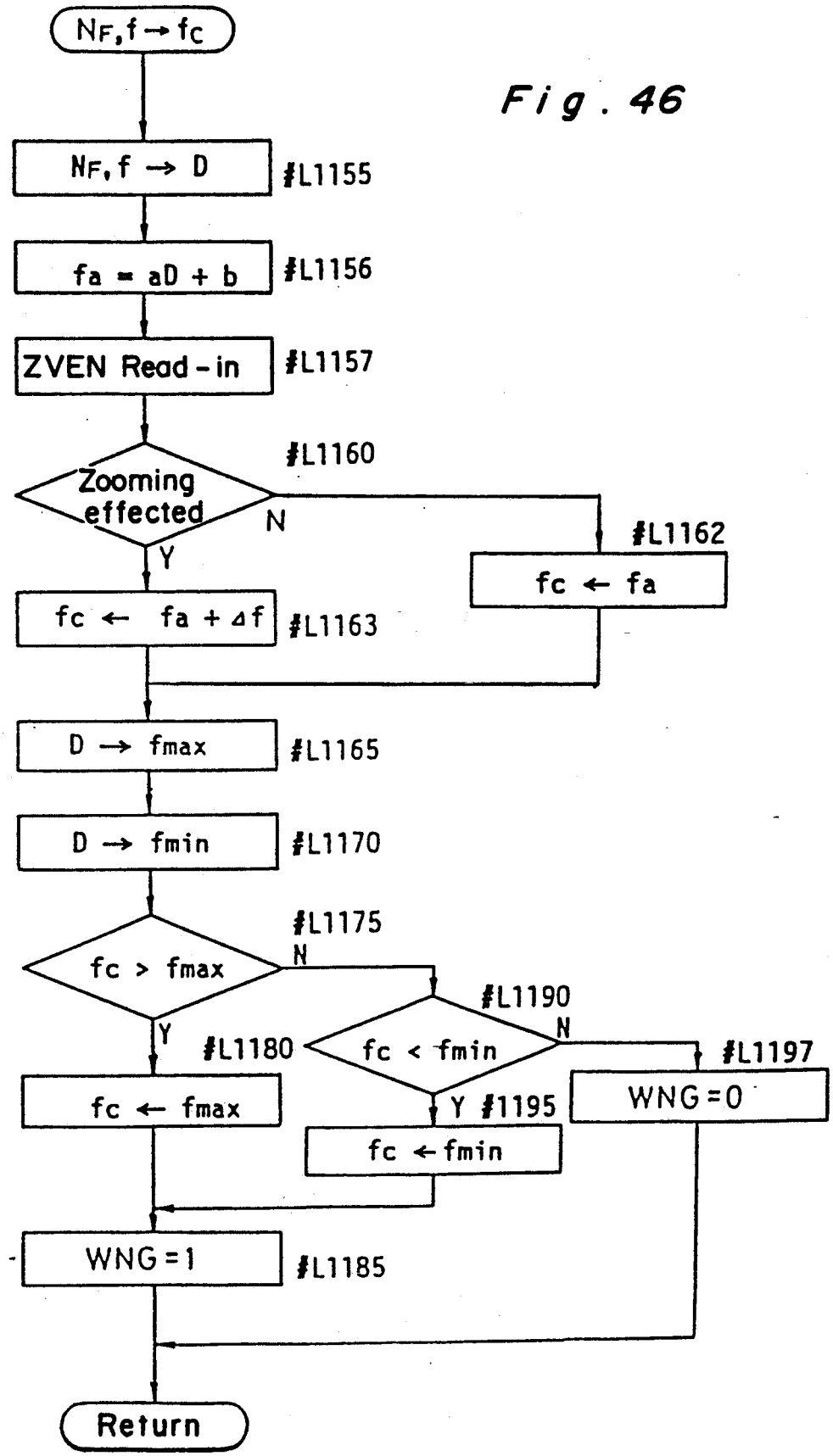

A subroutine for the determination of the control focal length fc on the basis of the amount $N_F$ of extension of the AF lens and the focal length f is illustrated in FIG. 46, reference to which will now be made. When this subroutine is called for, the distance D is determined at step #11155 on the basis of the focal length f and the AF lens extension amount $N_F$, followed by step #L1156 at which the focal length fa appropriate to the distance D is determined using an equation fa $= a \times D + b$, wherein a and b represent a constant. In other words, the photo-taking magnification is determined according to the distance D. Then, at step #L1157 the data of the encoder ZVEN indicative of whether or not the zooming operation is effected is read in, followed by step #L1160 at which a decision is made to determine if the zooming operation is effected. If the zooming operation is found having been effected, the program flow goes to step #L1163 at which the control focal length fc is rendered to be the sum of fa and Δf, but if the zooming operation is found having not been effected, the program flow goes to step #L1162 at which the control focal length fc is rendered to be equal to fa. Then, the program flow subsequently goes to step #L1165 and then to step #L1170. At steps #L1165 and #L1170, based on the distance D, the maximum available focal length fmax and the minimum available focal length fmin are respectively determined, followed by a decision step #L1175 at which a decision is made to determine if the control focal length fc is greater than the maximum available focal length fmax. If the control focal length fc is not greater than the maximum available focal length fmax, another decision is made at step #L1190 to determine if the control focal length fc is smaller than the minimum available focal length fmin. If the control focal length fc is found greater than the maximum available focal length fmax at step #L1175, the control focal length fc is rendered to be equal to the maximum available focal length fmax at step #L1180, but if the control focal length fc is found smaller than the minimum available focal length fmin at step #L1190, the control focal length fc is rendered to be equal to the minimum available focal length fmin at step #L1195. In either case, at subsequent step #L1185, the warning flag WNG is set, permitting the program flow to return subsequently. Where the control focal length fc is equal to and greater than the minimum available focal length fmin and equal to or smaller than the maximum available focal length fmax, the warning flag WNG is reset at step #L1197, followed by a return of the program flow.

Figure 49:
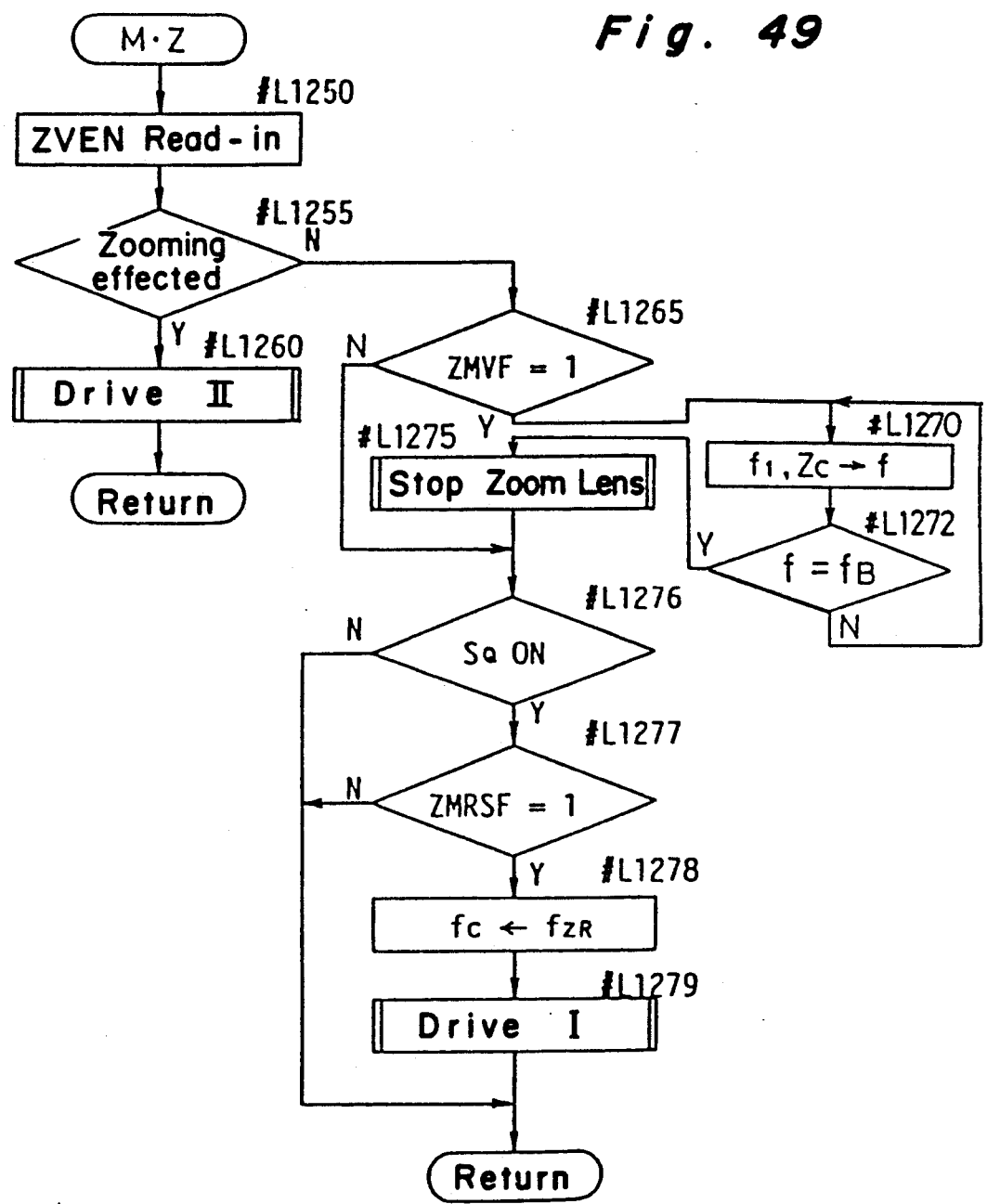

In the flowchart of FIG. 42, if the result of decision at step #L725 indicates that the mode selected is not the APZ1 mode, it means that the mode selected is the OFF mode (manual zooming mode) and, therefore, a M·Z subroutine for the manual zooming is executed at step #L730, the details of said manual zooming subroutine being shown in FIG. 49. Referring to FIG. 49, when this manual zooming (M·Z) subroutine is called for, the encoder ZVEN indicative of whether or not the zooming operation is effected is read in at step #L1250, followed by #L1255 at which a decision is made to determine if the zooming operation is effected. Where the result of decision at step #L1255 indicates that the zooming operation is effected, a drive II subroutine for driving the zooming lens ia executed at step #L1260, followed by a return of the program flow.

The drive II subroutine referred to above is shown in FIG. 39, reference to which will now be made. When this drive II subroutine is called for, the amount Zn of drive of the zooming lens corresponding to the count value Zc of the zooming counter ZC is set to an unattainable value $FF_H$ at step #L505 so that the motor will not be brought to a halt as a result of the counter interruption and, then at step #L510, of the data read from the encoder ZVEN, a zooming speed signal is outputted to the motor drive circuit MD3. A decision is subsequently made at step #L515 to determine, on the basis of the data indicative of the direction of drive which is included in the data read from the encoder ZVEN, whether or not the zooming lens is to be retracted. If the result of decision at step #L515 indicates that the zooming lens is to be retracted, the program flow goes to step #L517 at which Δf is subtracted from fy to find a target focal length and, then, the amount $M_F$ of extension which deviates as a result of the zooming is calculated at step #L518. Then, at step #L520, a lens retraction signal is outputted to the motor drive circuit MD3 and, at subsequent step #L525, a flag WDF indicative of the zooming in the Wide direction is set. Thereafter, a flag ZMVF indicative of the zooming lens being driven is set at step #L540 and both of the focal length range $fc_1$ and the drive amount Zn corresponding to the control focal length fc are calculated at step #L542, thereby permitting the program flow to return subsequently.

The purpose of the predication control carried out by determining the target focal length is to accurately compensate for a deviation in focus resulting from the zooming. In the manual zooming operation in which it is not certain when the zooming lens is brought to a halt, the compensation for the amount of deviation in focus relative to the focal length then assumed would result in an excessive or insufficient compensation since the camera body is unable to know of the focal length assumed when the zooming operation is interrupted. Also, even though the amount of deviation in focus (the amount of correction to be done) is known at the time of detection during the zooming, the focal length of the lens may be of a different value at the time the compensation is effected due to a follow-up compensation and, therefore, an image viewed through the viewfinder will be defocused. If, however, the focal length assumed when the zooming is interrupted is determined beforehand such as in the illustrated embodiment of the present invention, the amount of deviation can be accurately compensated for and no follow-up compensation will not occur, thereby substantially eliminating the above discussed problems.

Should the result of decision at step #L515 indicate that the direction in which the zooming lens is driven is the direction of retraction thereof, the value Δf is added to the value fy to make the target focal length at step #L527 and the amount $M_F$ of extension which would deviate as a result of the zooming operation is calculated at step #L528. Then, at step #L530, a lens extension signal is outputted to the motor drive circuit MD3, followed by step #L535 at which the flag WDF indicative of the zooming in the Wide direction is reset before the program flow goes to step #L540.

Figure 40:
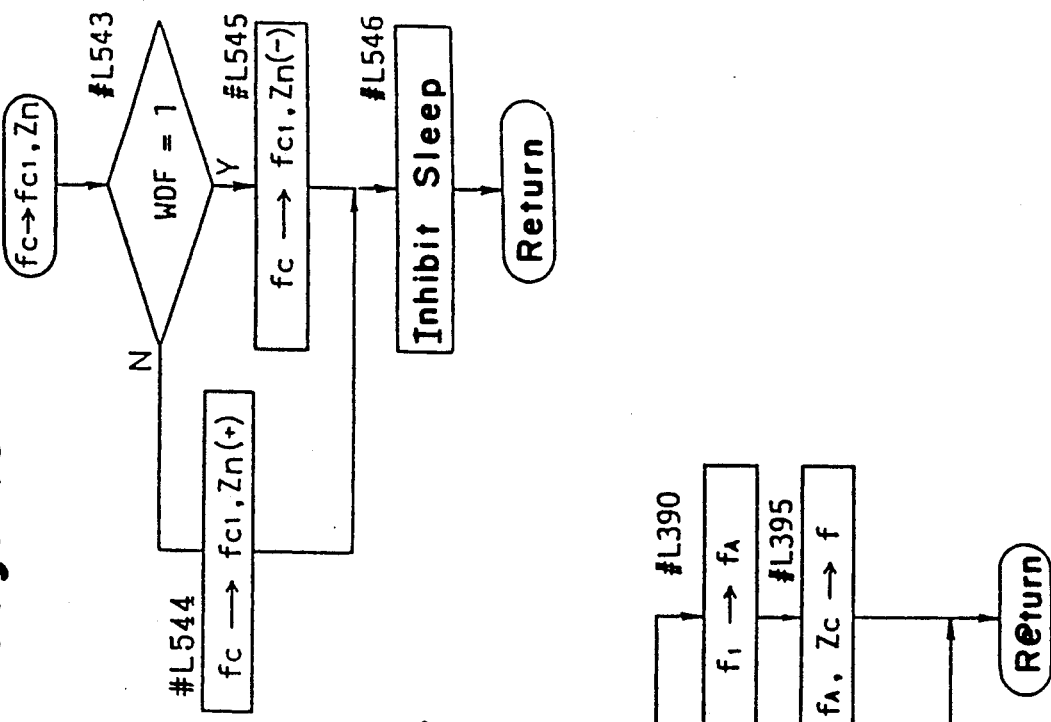

A subroutine for the calculation of both of the focal length range $fc_1$ and the drive amount Zn appropriate to the control focal length fc is illustrated in FIG. 40. Referring to FIG. 40, when this subroutine is called for, a decision is made at step #L543 to determine if the flag WDF indicative of the zooming in the Wide direction is set. This is because, during the zooming in the Wide direction and that in the Tele direction, both of the focal length range $fc_1$ of the zooming encoder ZMEN and the count Zc of the zooming counter ZC may take a different value even though the control focal length fc remains the same. By way of example, when the zooming is effected in the Wide direction, it is necessary for the focal length range $fc_1$ greater than the control focal length f and the negative drive amount Zn to be determined, whereas when the zooming is effected in the Tele direction, it is necessary for the focal length range $fc_1$ smaller than the control focal length fc and the positive drive amount Zn to be determined. Therefore, when the zooming lens is retracted in the Wide direction (WDF=1), the control focal length fc is used as an address for reading both of the focal length range $fc_1$ and the drive amount Zn from a first ROM table at step #L545. On the other hand, when the zooming lens is retracted in the Tele direction (WDF=0), the control focal length fc is used as an address for reading both of the focal length range $fc_1$ and the drive amount Zn from a second ROM table at step #L544. Then, the program flow goes to step #L546 at which a data for inhibiting a sleep is set, with the program flow subsequently returning.

At the time of the counter interruption effected during the OFF mode (the manual zooming mode), the result of decision at step #L115 of FIG. 33 indicates that the mode selected is the OFF mode. Therefore, referring to FIG. 33, the program flow goes to step #L120 at which the focal length range $fc_1$ is read from the zoom encoder ZMEN. Then, at subsequent step #L125, a decision is made to determine if the focal length range $f_1$ read from the zooming encoder ZMEN is not equal to the previous value $Lf_2$, that is, if the focal length range has changed. If the focal length range has changed as indicated by the result of decision at step #L125, the count Zc of the zooming counter ZC indicative of the lens extension amount is reset at step #L130 and, then, the current focal length range $fc_1$ is stored as the previous value $Lf_1$ at step #L135 before the program flow returns. In this way, the amount of extension of the lens subsequent to the change of the focal length range can be accurately detected. Where the focal length range $fc_1$ has not changed as indicated by the result of decision at step #L125, the program flow skips step #L130 onto step #L135.

In this way, the zooming lens is driven in the same direction and by the same amount as those manipulated by the photographer.

In the flowchart of FIG. 49, when the result of decision at step #L1255 indicates that the zooming operation is not effected, the program flow goes to step #L1265 at which a decision is made to determine if the flag ZMVF indicative of the zooming taking place is set. If the flag ZMVF is found having been set, the focal length f is determined on the basis of the data $f_1$ and Zc read from the encoder at step #L270 and, then, the lens is driven until the focal length f attains the target focal length fy. At subsequent step #L1272, a decision is made to determine if the focal length f has attained the target focal length fy. If the result of decision at step #L1272 indicates that the focal length f has attained the target focal length fy, the subroutine for stopping the zooming lens is executed at step #L1275, followed by a decision step #L1276. On the other hand, if the result of the decision at step #11265 indicates that the flag ZMVF is not set, the program flow skips step #L1275 onto step #L1276. At step #L1276, a decision is made to determine if the lens 6 switch $S_Q$ is switched on and, if the lens switch $S_Q$ is found having not been switched on, the program flow returns. On the other hand, if the lens switch $S_Q$ is found having been switched on at step #L1276, the program flow goes to step #L1277 at which another decision is made to determine if a flag ZMRSF indicative of the completion of setting of the focal length under the reset mode is set. Should the result of decision at step #L1277 indicate that the flag ZMRSF is not set, the program flow returns. However, should it indicate that the flag ZMRSF is set, the focal length $f_{ZR}$ set during the reset mode is utilized as the control focal length fc at step #L1278 and, after the execution of the drive I subroutine for driving the zooming lens at step #L1279, the program flow returns.

Referring to the flowchart of FIG. 41, if the determination of the communication mode at step #L590 results in a data communication under the mode IV during the shutter release, a variable N is rendered to be zero at step #L640 and a flag RLSF indicative of the shutter release taking place is set at step #L645, followed by a return of the program flow.

When a pulse is inputted from the camera body during the shutter release (i.e., the exposure), the program flow proceeds from step #L555 to step #L665 at which N is rendered to be the sum of N and 1, i.e., N=N+1, and then at step #L670 a decision is made to determine if the value of N is 1. If the value N is found to be 1 at step #L670, the control focal length fc is rendered to be an unattainable, large value at step #L675 and, after the execution of the drive I subroutine at step #L677, the program flow returns. On the other hand, if the result of decision at step #L670 indicates that the value N is not 1, the subroutine for stopping the zooming lens is executed at step #L680 and, after the flag RLSF indicative of the shutter release taking place has been reset at step #L685, the program flow returns.

In the event that the determination of the communication mode at step #L590 indicates the data communication under the mode V (as hereinbefore described, at this time, the camera body is going into the sleep mode), a 1-byte data including a signal for enabling or disabling the sleep is outputted at step #L650 and a wait is made until the terminal CSLE is rendered in a high level state at step #L652. When the terminal CSLE is rendered in the high level state as determined by the decision step #L652, another decision is made at step #L655 to determine if the signal enabling the sleep is set. If the result of decision at step #L655 indicates that the signal enabling the sleep is not set, the program flow returns immediately, but if it indicates that the signal enabling the sleep is set, the display is erased at step #L660, the F/ZINT interruption is enabled at step #L662 and a flag MD3F indicative of the data communication under the mode III is reset at step #L664 before the program flow returns.

Figure 50:
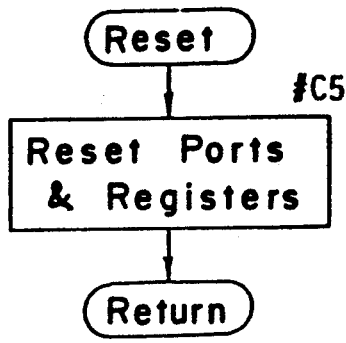
FIGS. 50 to 53 are flowcharts showing the sequence of operation of IC card utilizable in the camera system embodying the present invention.

Hereinafter, the control operation performed by the card mounted microcomputer μC3 will be discussed. When the card is inserted into the pocket in the camera body, a switch $S_{RE3}$ is turned off with the consequence that a signal varying from a low level state to a high level state is inputted to a reset terminal RE3 of the card mounted microcomputer μC3 and, therefore, the card mounted microcomputer μC3 executes a reset routine shown in FIG. 50. As shown in FIG. 50, subsequent to the start of the reset routine, ports and registers are reset at step #C5 to attain a sleep condition. When a low level signal requesting a data communication from the body mounted microcomputer μC1 is inputted to a terminal CSCD, the card mounted microcomputer μC3 executes an interruption routine shown in FIG. 51.

Figure 51:
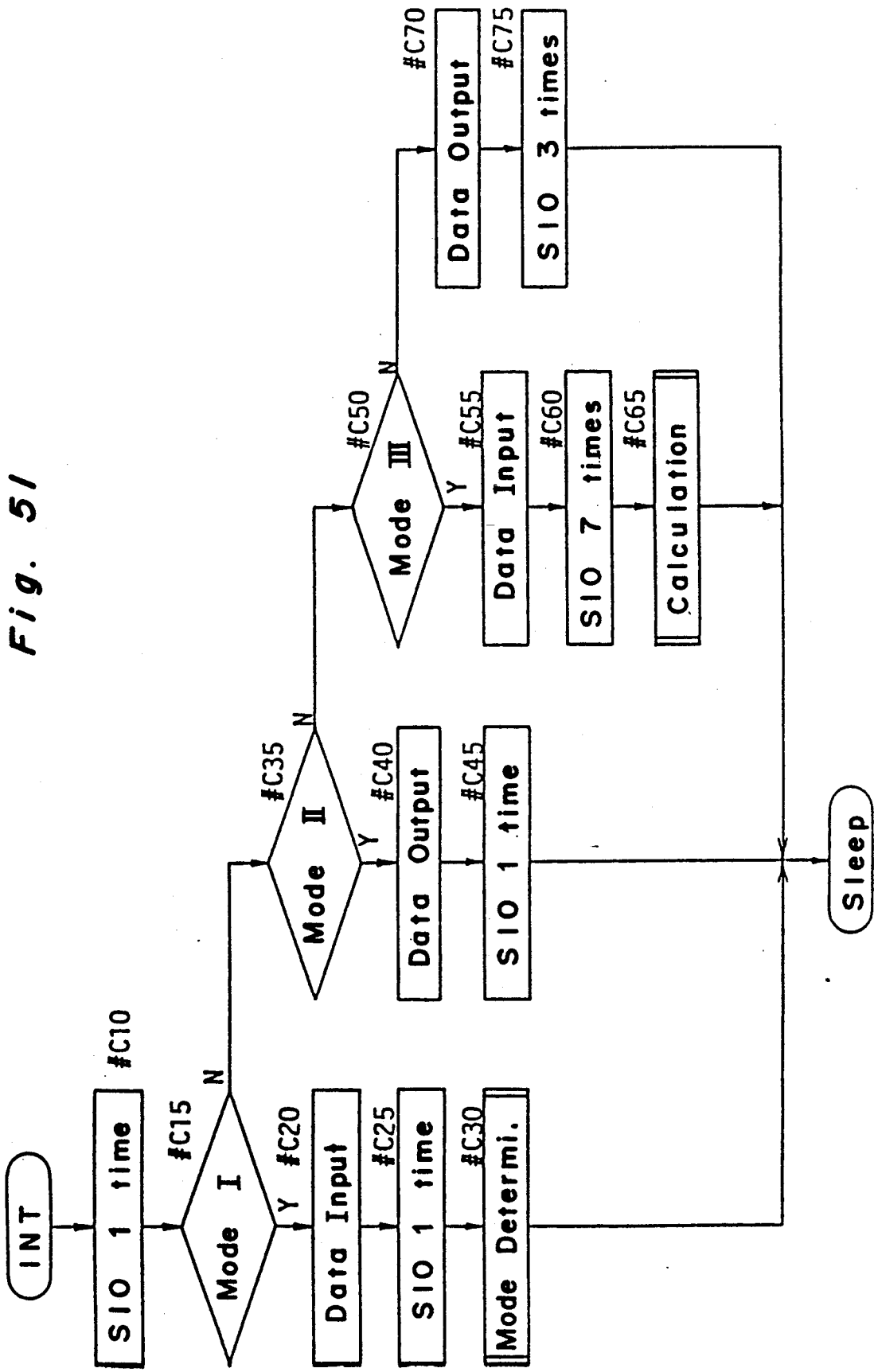

Referring to the flowchart of FIG. 51, subsequent to the start of the interruption routine, a 1-byte serial communication takes place at step #C10 and, at subsequent step #C15, a decision is made to determine the type of the communication mode. If the mode is found to be the mode I, the mode II or the mode III as determined at respective steps #C15, #C35 and #C50, the flow starts from respective steps #C20, #C40 and #C55.

Hereinafter, the operation under each of those modes I, II and III will be described. In the case of the mode I communication, a data input mode is set at step #C20, a 1-byte data is inputted from the body mounted microcomputer μC1 at step #C25 as a result of the 1-byte serial communication, and a subroutine for the determination of the mode is executed at step #C30 before the sleep condition is attained.

Figures 52, 53:
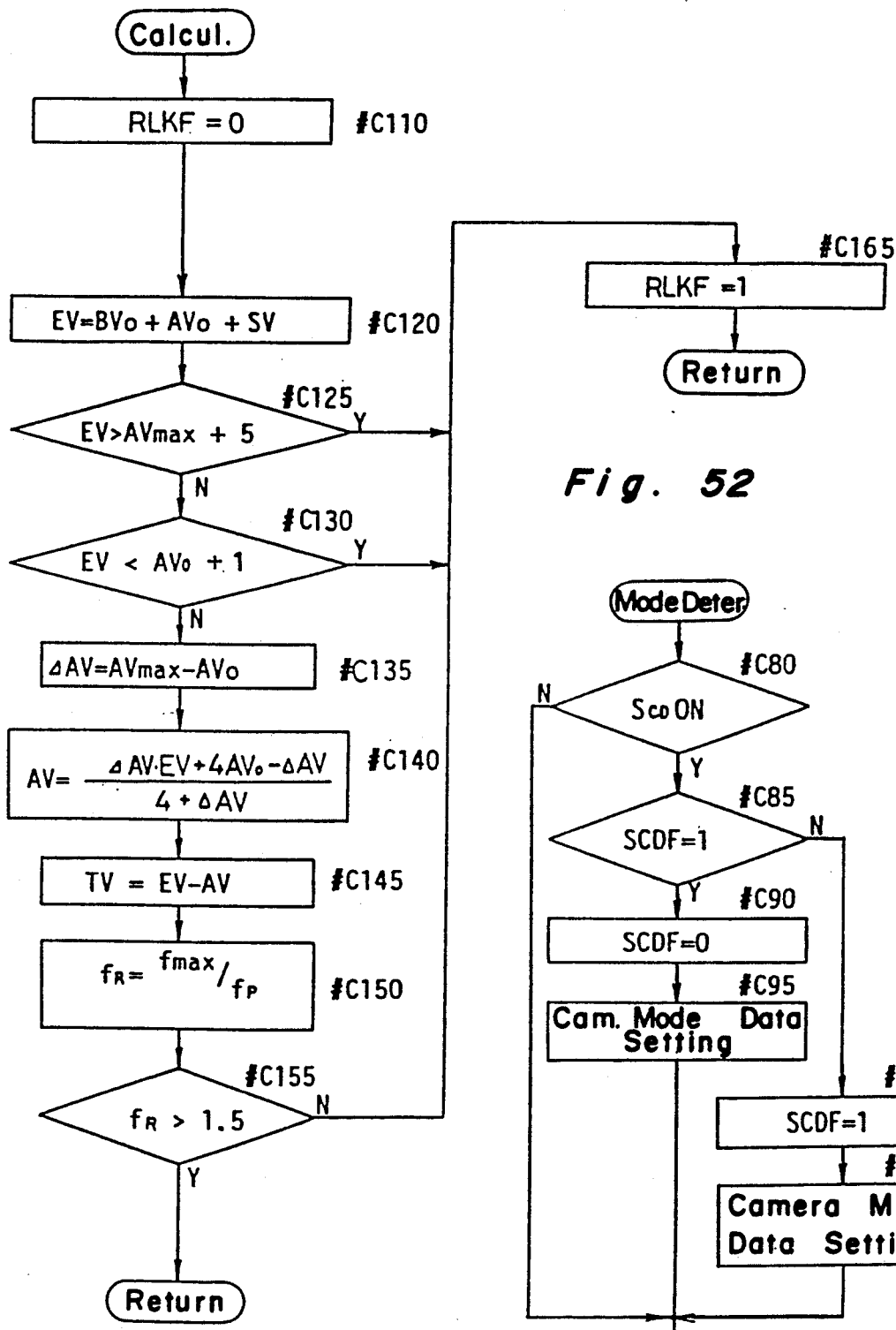

The mode determination subroutine executed at step #C30 is shown in FIG. 52 in detail. When the mode determination subroutine of FIG. 52 is called for, a decision is made at step #C80 to determine, on the basis of the data inputted from the camera body, to determine if the card switch $S_{CD}$ is switched on and, if the card switch $S_{CD}$ is not switched on, the program flow returns. However, if the result of decision at step #C80 indicates that the card switch $S_{CD}$ is switched on, a next decision takes place at step #C85 to determine if a flag SCDF indicative of the card control is set. If this flag SCDF is set as determined at step #C85, it means that the card control has previously been carried out and, therefore, in order to establish a condition in which no card control is carried out, the flag SCDF is reset at step #C90 and, subsequently at step #C95, the data of the card mode outputted to the camera body is reset, followed by a return of the program flow. On the other hand, if the result of decision at step #C85 indicate that the flag SCDF is not set, it means that the card switch $S_{CD}$ has been manipulated for establishing the condition of the card control and, therefore, the flag SCDF is set at step #C100 and, subsequently at step #C105, the data of the card mode to be outputted to the camera body is set, followed by a return of the program flow.

Referring to the flowchart of FIG. 51, if the result of decision at step #C35 indicates the mode II communication, the data output mode is set at step #C40, and then, a 1-byte data is outputted to the body mounted microcomputer $\mu C1$ by means of the 1-byte serial communication at step #C45, followed by the sleep condition. This 1-byte data includes the data of the card mode.

If under the mode III communication, the data input mode is set at step #C55, a 7-byte data is inputted from the body mounted microcomputer $\mu C1$ by means of a 7-byte serial communication at step #C60, and then, a calculation routine is executed on this data at step #C65, followed by the sleep condition.

The details of the calculation routine executed at step #C65 of the program flow of FIG. 51 are shown in FIG. 53. According to this routine, at step #C110, a release lock flag RLKF is reset and, then at step #C120, based on the data inputted from the camera body, the exposure value EV is calculated according to the equation, $EV=BVo+AVo+SV$. Then, a decision is made at step #C125 to determine if the calculated exposure value EV is greater than the exposure value (AVmax+5) corresponding to a combination of the maximum aperture value AVmax and the shutter speed of 1/30 second, because this shutter speed is assumed to be the highest shutter speed which, when the zooming lens is to be driven, a favorable zooming effect can be obtained during the exposure. If the exposure value Ev is greater than (AVmax+5) as determined at step #C125, it means that the zooming during the exposure will bring about no benefit and, therefore, the program flow goes to step #C165 at which the release lock flag RLKF is set, with the program flow subsequently returning. On the other hand, if the exposure value EV is smaller than (AVmax+5) as determined at step #C125, another decision is made at step #C130 to determine if the exposure value EV is smaller than the exposure value (AVo+1) corresponding to a combination of the full aperture value Avo with the shutter speed of 1 second. This is because, if the shutter speed is lower than 1 second when the zooming is to be effected during the exposure, a camera wobbling would be likely to occur. If the exposure value EV is not greater than (AVo+1) as determined at step #C130, the release lock flag RLKF is set after all at step #C165, allowing the program flow to return subsequently. On the other hand, if the exposure value EV is greater than (Avo+1), the stepwise difference $\Delta AV$ between the maximum aperture value Avmax and the full aperture value Avo is calculated at step #C135 and, then, the aperture value AV is calculated at step #C140 according to the following equation.

$$AV=(\Delta AV \cdot EV + 4Avo - \Delta AV)/(4+\Delta AV)$$

Figure 54:
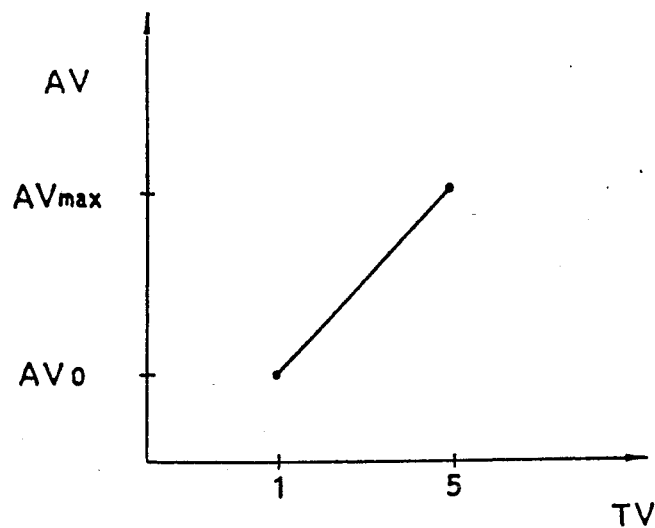
FIG. 54 is a graph showing an exposure control characteristic exhibited by one of the IC cards.

As shown in FIG. 54, this AE program line scheme is formed by connecting the point of intersection of the full aperture value AVo with the shutter speed $TV=1$ and the point of intersection of the maximum aperture value AVmax with the shutter speed $TV=5$. At step #C145, the shutter speed TV is calculated as the difference between the exposure value EV and the aperture value AV. Then at step #C150, the ratio $f_R=fmax/fp$ between the current focal length fp and the maximum focal length fmax is calculated and, if the ratio is higher than 1.5 as determined at a decision step #C155, it is deemed that some effect can be brought about by the zooming during the exposure, allowing the program flow to return subsequently. On the other hand, if the result of decision at step #C155 indicates that the ratio is equal to or smaller than 1.5, no effect will be brought about by the zooming during the exposure and, therefore, the release lock flag RLKF is set at step #C165, with the program flow returning subsequently.

Referring to the program flow of FIG. 51, under the mode IV communication, the data output mode is set at step #C70, a 3-byte data is outputted to the body mounted microcomputer $\mu C1$ by means of a 3-byte serial communication at step #C75, followed by the sleep condition.

The flags and variables used in the foregoing embodiments are tabulated in Tables 2 and 3 below.

TABLE 2

| Type of Flags | Significance |
|---|---|
| AFEF | 1: Focused. |
| | 0: Defocused. |
| AFOMF | 1: AF operation is performed again. |
| | 0: AF operation is no longer performed. |
| APZ2F | 1: Control under APZ2 mode is enabled. |
| | 0: Control under APZ2 mode is disabled. |
| CSLEF | 1: Interruption from Lens Assembly. |
| | 0: Interruption not from Lens Assembly. |
| $fc_1F$ | 1: $f_1 = fc_1$ |
| | 0: $f_1 \neq fc_1$ |
| FMF | 1: To extend Lens Assembly during Low Con. Scan. |
| | 0: To retract Lens Assembly during Low Con. Scan. |
| LEEDF | 1: AF Lens at Extremity under Timer Interruption. |
| | 0: AF Lens not at Extremity. |
| LMVF | 1: AF Lens being driven. |
| | 0: AF Lens not being driven. |
| LSF | 1: Low Con. Scan being not performed. |
| | 0: Low Con. Scan being performed. |
| LSINF | 1: Low Con. Scan enabled. |
| | 0: Low Con. Scan disabled. |
| MD3F | 1: Mode III Communication taken place one time. |
| | 0: Mode III Communication not taken place. |
| RLKF | 1: Release Lock performed. |
| | 0: Release Lock not performed. |
| RLSF | 1: Lens Com. taken place during Release. |
| | 0: No Lens Com. taken place during Release. |
| RSTF | 1: To execute Reset Routine consequent on mounting of Battery. |
| | 0: Not to execute Reset Routine consequent on |

TABLE 2-continued

| Type of Flags | Significance |
| --- | --- |
| | mounting of Battery. |
| SCDF | 1: Card Control. |
| | 0: Not Card Control. |
| SCF | 1: 2nd Point set under APZ2 mode. |
| | 0: 2nd Point not yet set under APZ2 mode. |
| SC1F | 1: 1st Point set under APZ2 mode. |
| | 0: 1st Point not set under APZ2 mode. |
| SMOFF | 1: Under Flow for Main Switch OFF. |
| | 0: Under Not Flow for Main Switch OFF. |
| SQONF | 1: Switch $S_Q$ once switched on. |
| | 0: Switch $S_Q$ not switched on. |
| S1ONF | 1: To execute S1ON flow. |
| | 0: Not to execute S1ON flow. |
| TINTF | 1: Zooming Lens at Extremity under Timer Interrupt. |
| | 0: Zooming Lens not at Extremity. |
| WDF | 1: Zooming in Wide direction. |
| | 0: Zooming in Tele direction. |
| ZIF | 1: Retraction of Zooming Lens. |
| | 0: Not Retraction of Zooming Lens. |
| ZMF | 1: Under Zooming Mode. |
| | 0: Not under Zooming Mode. |
| ZMRSF | 1: Setting completed under Reset Mode. |
| | 0: Setting not yet completed under Reset Mode. |
| ZMVF | 1: Zooming Lens being driven. |
| | 0: Zooming Lens not being driven. |

TABLE 3

| Variables | Significance |
| --- | --- |
| BCLV | Power Source Battery Level |
| Dv | Photo-taking Distance |
| $D_1$ | Distance to 1st Point set under APZ2 mode. |
| $D_2$ | Distance to 2nd Point set under APZ2 mode. |
| $f_{f1}$ | Focal Length of 1st Point set under APZ2 mode. |
| $f_{f2}$ | Focal Length of 2nd Point set under APZ2 mode. |
| fa | Focal Length corresponding to Disance D. |
| $f_A$ | Minimum Focal Length in Focal Length Range $f_1$. |
| $f_B$ | Maximum Focal Length in Focal Length Range $f_1$. |
| $\Delta f$ | Amt. of Shift in Focal Length incident to Zooming. |
| $\Delta f_1$ | Predetermined Amt. to be added to or subtracted from Amt. of Shift |
| fc | Taret Focal Length (Control Focal Length) under APZ2 mode. |
| $fc_1$ | Focal Length Range corres. to Ctrl Focal Length fc. |
| $f_{ZR}$ | Zooming Reset Value. |
| $f_1$ | Current Focal Length Range read from ZMEN. |
| $Lf_1$ | Previous Focal Length Range. |
| MF | Correction Amt. for compensating a deviation in focal resulting from the zooming. |
| N | Amt. of drive of AF Lens. |
| N1 | Amt. of drive of AF Lens determined from Defocus Amt. DF |
| N2 | Correct. Amt. for extension caused by the zooming. |
| $N_A$ | Predetermined Amt. of extension. |
| $N_F$ | Amt. of extension of AF Lens from Infinity Position. |
| $N_K$ | Amt. of extension for extending AF Lens to Specific Position. |
| $N_{LG}$ | Large value. |
| $N_R$ | Reset value for Amt. of extension. |
| $N_Z$ | Amt. of extension appropriate to Distance D at Current Focal Length $f_4$. |
| T1 | Timer for Timer Interruption. |
| T2 | Timer for retaining Power Source. |
| T3 | Timer for counting Exposure Time. |
| $T_A$ | Timer for determining Old Camera Body. |
| $T_B$ | Timer for retaining Power Source. |
| V1~V3 | Zooming speeds. |
| Zc | Count of ENC3 by Zooming Counter ZC. |
| Zn | Amt. of drive corres. to Ctrl Focal Length fc (converted into Zc). |

Modified Embodiment 1

In the foregoing embodiment, priority is given to the zooming for the purpose of reflecting the photographer's intent in the event that the focus detection is impossible during the powered zooming or the zooming operation. However, in the embodiments which will now be described, priority is given to the focusing. In other words, in the event of the difficulty in focus detection, the zooming operation is interrupted until the focus detection becomes possible and, thereafter, the zooming is again resumed if the zooming operation is effected.

Figure 67:
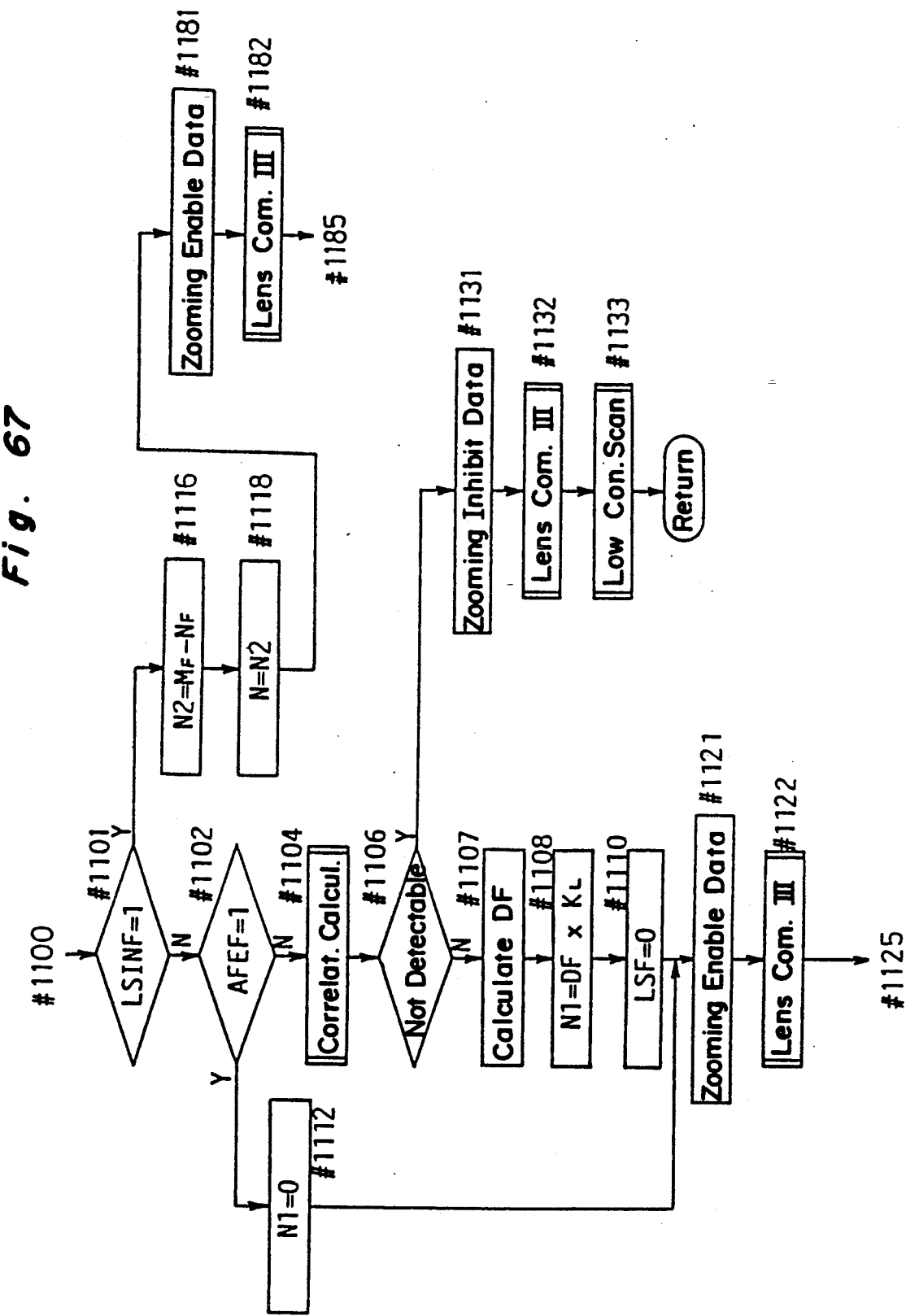
FIGS. 67 to 71 are flowcharts showing respective modifications of the flowcharts according to the present invention.

Referring first to FIG. 67 showing a portion of the flow of FIG. 23 modified according to a first modified embodiment of the present invention is shown, in the event that the result of decision at step #1106 indicates that the focus detection is impossible, the program flow goes to step #1131 at which a data for inhibiting the zooming is set. Then, at step #1132, the lens communication III subroutine is executed to bring the zooming lens to a halt, the subroutine for the low contrast scan is subsequently executed at step #1133, and finally, the program flow is allowed to return. On the other hand, if the result of decision at step #1106 indicates that the focus detection is possible, the defocus amount DF is calculated at step #1107, the amount N1 of drive of the lens is then calculated at step #1108, and a flag LSF indicative of the low contrast scan is reset at step #1110. Thereafter, a data for enabling the zooming is set at step #1121, and the lens communication III subroutine is then executed at step #1122 before the program flow goes to step #1125 which has already been described. Should the result of decision at step #1101 indicate that the flag LSINF for inhibiting the low contrast scan has been set, as is the case with the flow of FIG. 23, the correction amount N2 caused by the zooming is calculated at step #1116 according to an equation, $N2=M_F-N_F$, and then the amount N of drive of the lens is rendered to be N2 at step #1118. Thereafter, the data for enabling the zooming is set at step #1181 and at step #1182 the lens communication III subroutine is executed before the program flow goes to step #1185.

Figure 68:
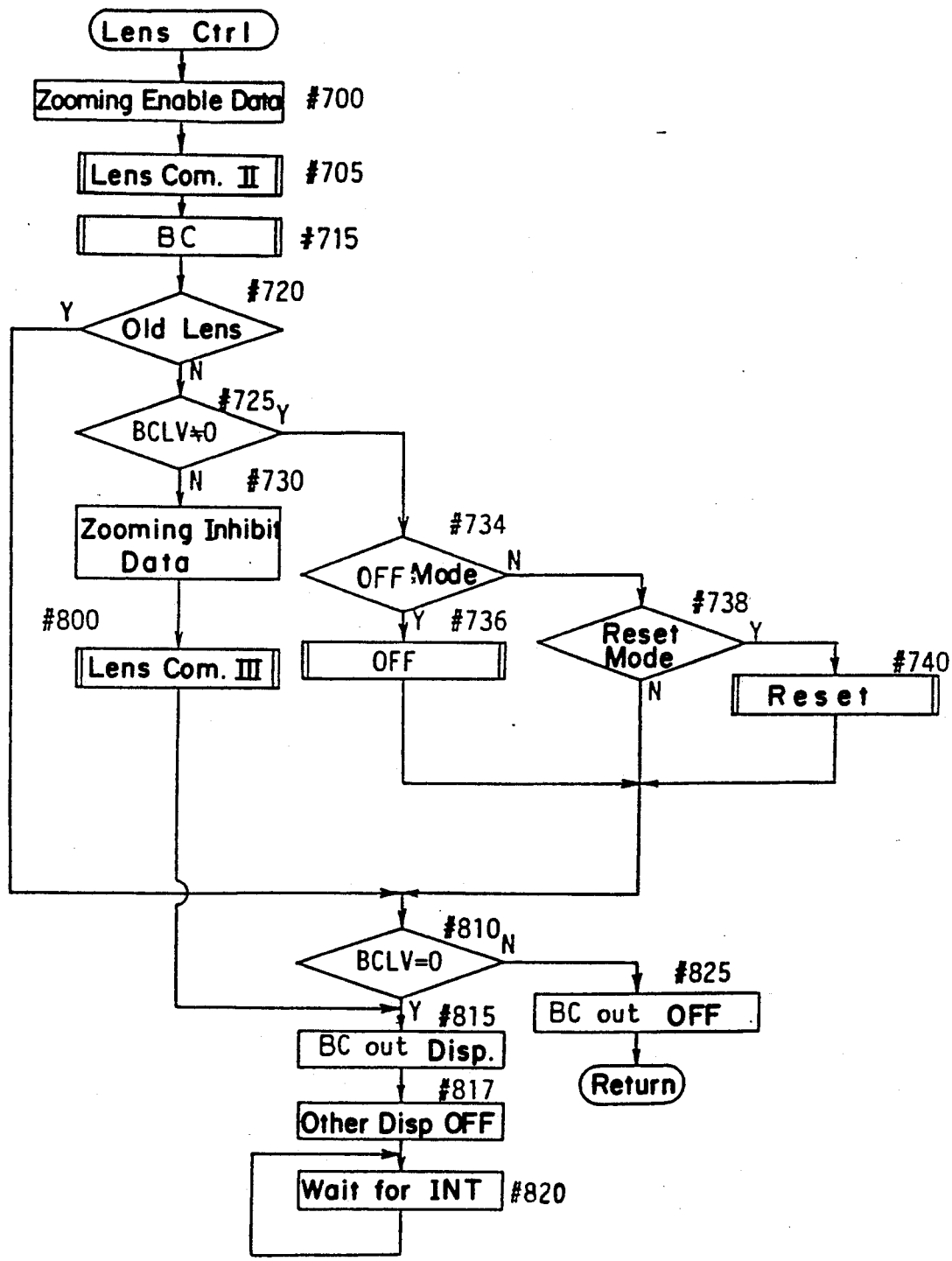

This first modified embodiment necessitates the lens control subroutine of FIG. 14 to be modified as shown in FIG. 68. Referring to FIG. 68, after the data for inhibiting the zooming has been set at step #730, the lens communication III subroutine is executed and, after the zooming has been disabled, the program flow goes to #815. Also, steps #736, #738 and #74 are followed by step #810. This is because, in the AF subroutine executed at step #540 after the lens control subroutine at step #515, the lens communication III subroutine is executed after the zooming is enabled or inhibited depending on the result of the focus detection.

Figure 69:
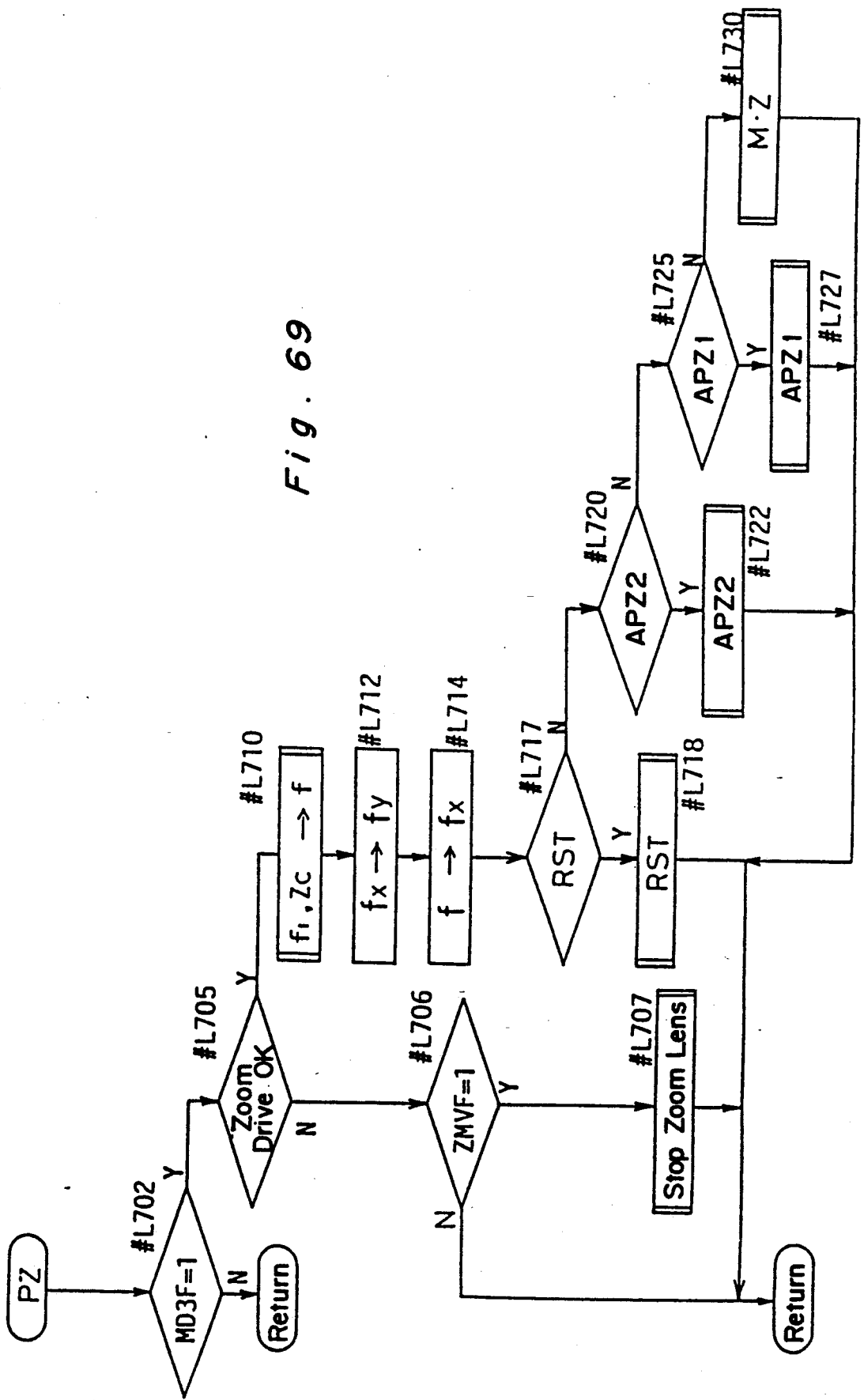

In addition, as far as the lens assembly is concerned, the first modified embodiment of the present invention requires the powered zooming (PZ) subroutine shown and described with reference to FIG. 42 to be modified as shown in FIG. 69. Describing the difference found in the program flow of FIG. 69 relative to that of FIG. 42, the inputting of the lens communication III data from the camera body to the lens assembly at step #L705 is followed by a decision step #L706 if the data for inhibiting the zooming is set in this communication III data. At subsequent step #L706, a decision is made to determine if a flag ZMVF indicative of the zooming lens being driven is set. If the flag ZMVF is set, the program flow goes to step #L707 at which the subroutine for bringing the zooming lens to a halt is executed with the program flow subsequently returning, but if the flag ZMVF is not set, the program flow is allowed to return immediately.

Modified Embodiment 2

According to the foregoing modified embodiment, priority is given to the focusing in the event of the difficulty in focus detection, but the drive of the zooming lens is enabled when the focus detection becomes possible. However, in the second modified embodiment which will now be described, arrangement is made that the drive of the zooming lens is inhibited before the focus detection subsequent to the difficulty in focus detection becomes possible. According to this arrangement, not only is the control simple and easy, but also no problem associated with a reduction in battery voltage occur since the zooming lens drive and the focusing are not effected simultaneously.

Figure 70:
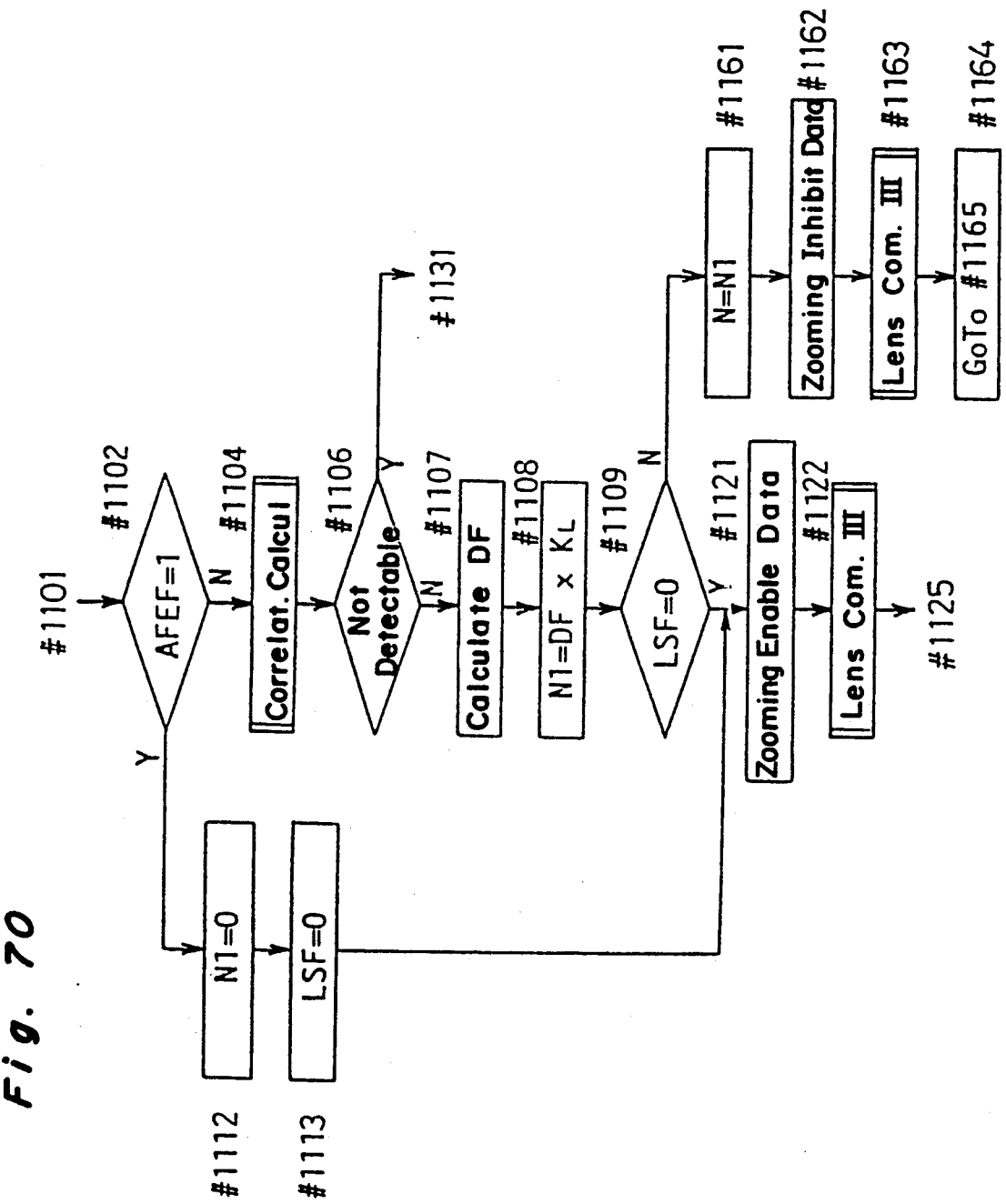

This second modified embodiment is substantially similar to the first modified embodiment except that the program flow shown in and described with reference to FIG. 67 is modified as shown in FIG. 70. Specifically, referring to FIG. 70, if the result of decision at step #1106 indicates that the focus detection is possible, the defocus amount is calculated at step #1107 followed by the determination of the amount N1 of drive at step #1108 according to an equation, $N1 = DF \times K_L$. Then, at step #1109, a decision is made to determine if the flag LSF indicative of the low contrast scan taking place is set. If this flag LSF is set, the data for enabling the zooming is set at step #1121 and the lens communication III subroutine is executed at step #1122 before the program flow goes to step #1125. On the other hand, if the result of decision at step #1109 indicates that the flag LSF is not set, the drive amount N is rendered to be N1 at step #1161, the zooming inhibiting data is then set at step #1162, and the lens communication III subroutine is executed at step #1163 before the program flow goes to step #1165. Also, if the result of decision at step #1102 indicates that the flag AFEF indicative of the in-focus condition is set, N1 is rendered to be zero at step #1112 and the flag LSF indicative of the low contrast scan taking place is reset at step #1113 before the program flow goes to step #1121.

Modified Embodiment 3

Figures 71, 71A:
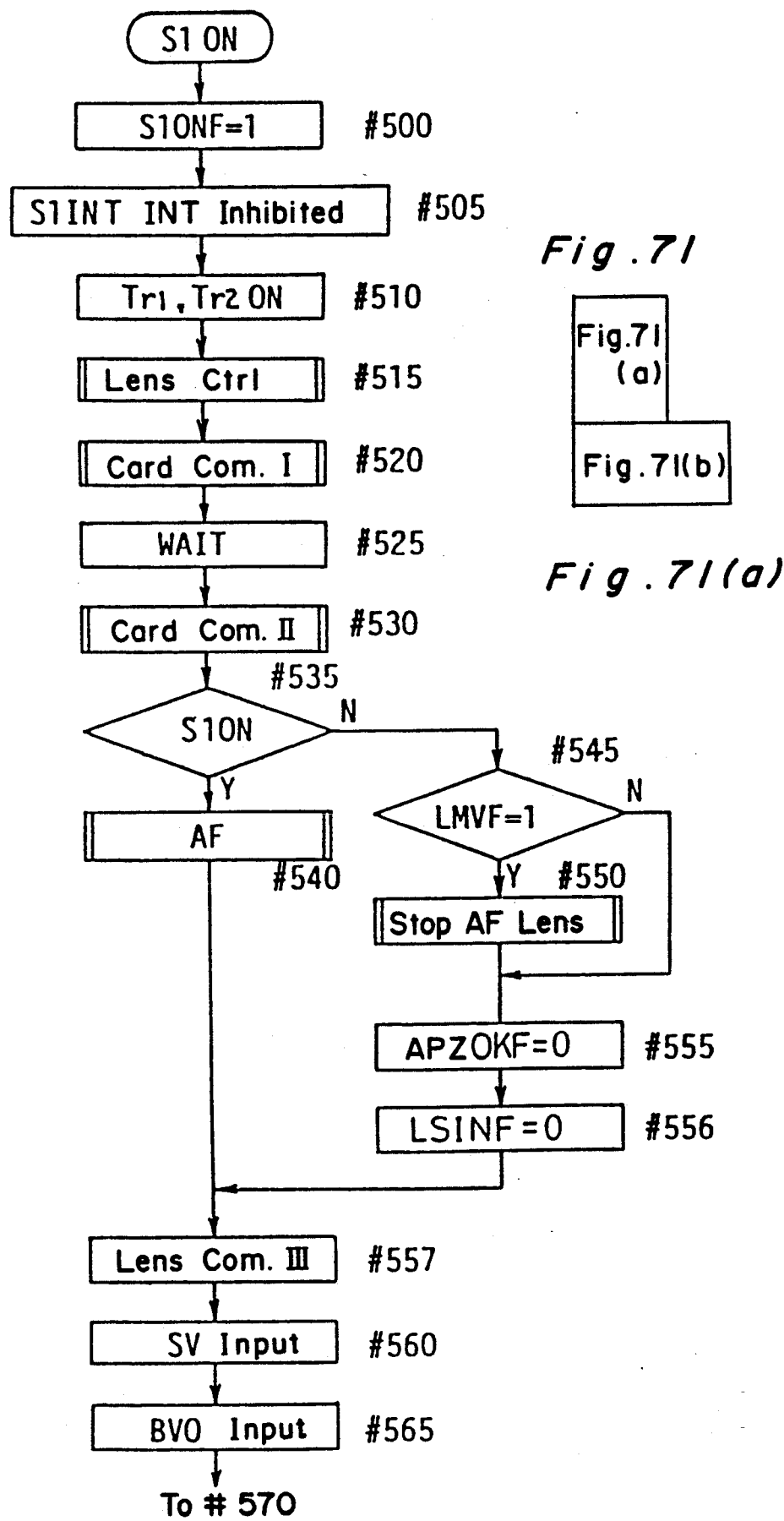
Figure 71B:
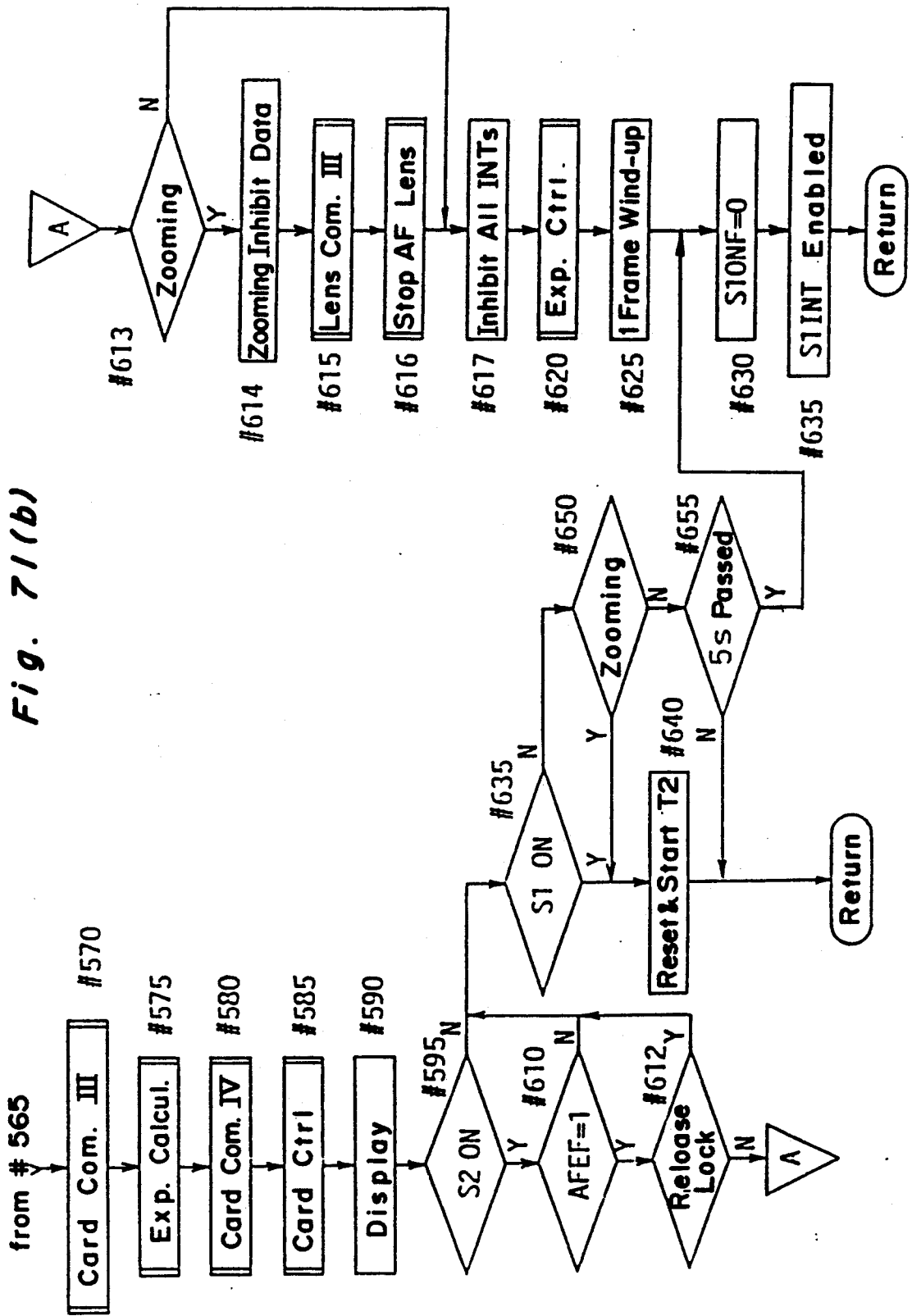

FIG. 71 illustrates a modification made to the program flow shown in and described with reference to FIG. 13. According to the program flow of FIG. 71, arrangement is made that, when the release switch S2 is switched on during the zooming operation, the zooming is inhibited even during the zooming operation to permit a release operation (photo-taking operation) to be accomplished. Specifically, referring to FIG. 71, if the release switch S2 has been found turned on at step #595, a decision is made at step #610 to determine if the flag AFEF indicative of the in-focus condition is set and, if this flag AFEF is not set, the program flow then goes to step #635. If the flag AFEF is found having been set, another decision is made at step #612 to determine if the release lock is in process. Should the result of decision at step #612 indicate the release lock not in process, the program flow goes to step #613 at which a further decision is made to determine if the zooming is taking place. If the zooming is not taking place as determined at step #613, the program flow subsequent to step #617 takes place. However, if the zooming is taking place as determined at step #613, the zooming inhibiting data is set at step #614, the lens communication III subroutine is then executed at step #615 and the subroutine for stopping the AF lens is executed at step #616 before the program flow goes to step #617. It should be noted that the third modified embodiment of the present invention described above can be applicable to any one of the first and second modified embodiments.

From the foregoing description of the present invention, it is clear that, in the camera system wherein the varifocal lens assembly is used as an interchangeable lens assembly, the provision has been made of means for outputting a signal indicative of the amount of defocus resulting from a change in focal length of the varifocal lens assembly and, therefore, the deviation in focus resulting from the change in focal length can be automatically compensated for with no extra load imposed on the arithmetic capability and the storage capacity in the camera body.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

We claim:

1. A camera system which comprises:
    a photo taking lens assembly of varifocal type including a zooming lens and a focusing lens, wherein a position of focus may deviate with a drive of the zooming lens;
    a manipulatable means adapted to be operated manually;
    a zooming drive means for driving the zooming lens;
    a focusing means detecting means for sequentially detecting a current focal length of the photo-taking lens assembly;
    a zooming amount calculating means for repeatedly calculating a target focal length based on the current focal length during the manipulation of the manipulatable means thereby to sequentially update a target focal length used as a reference for the drive of the zooming lens;
    a first control means adapted to receive the target focal length updated by the zooming amount calculating means for calculating the amount of deviation in focus which would occur before the target focal length is attained and also for controlling the focusing means so as to eliminate the amount of deviation in focus which has been calculated; and
    a second control means for controlling the zooming drive means, even if the manipulation of the manipulatable means is released, so as to drive the zooming lens to a position where the target focal length calculated by the zooming amount calculating means is attained.

2. The camera system as claimed in claim 1, wherein the photo-taking lens assembly of varifocal type is an interchangeable lens assembly adapted to be removably mounted on a camera body, and wherein said manipulatable means, said zooming drive means, said focal length detecting means, said zooming amount calculating means and said second control means are provided in the photo-taking lens assembly whereas said focusing means and said first control means are provided in the camera body.

3. A camera system which comprises:

a photo-taking lens assembly of varifocal type including a zooming lens and a focusing lens, wherein a position of focus may deviate with a drive of the zooming lens;

a manipulatable means adapted to be operated manually;

a zooming drive means for driving the zooming lens;

a focusing means for driving the focusing lens;

a focal length detecting means for detecting a current focal length of the photo-taking lens assembly;

a zooming amount predicating means for predicating a target focal length of the photo-taking lens assembly, when the manipulating means is manipulated, on the basis of the current focal length of the photo-taking lens assembly which is detected by the focal length detecting means.

a first control means adapted to receive a target focal length predicated by the zooming amount predicating means for calculating the amount of deviation in focus which would occur and also for controlling the focusing means so as to eliminate the amount of deviation in focus which has been calculated; and a second control means for controlling the zooming drive means, even if the manipulation of the manipulatable means is released, so as to drive the zooming lens to a position where the target focal length predicated by the zooming amount predicating means is attained.

4. The camera system as claimed in claim 3, wherein the photo-taking lens assembly of varifocal type is an interchangeable lens assembly adapted to be removably mounted on a camera body, and wherein said manipulatable means, said zooming drive means, said focal length detecting means, said zooming amount predicating means and said second control means are provided in the photo-taking lens assembly whereas said focusing means and said first control means are provided in the camera body.

5. A camera system which comprises:

a photo-taking lens assembly including a zooming lens and a focusing lens;

a focus detecting means for detecting a focusing condition of the photo-taking lens assembly and also for outputting an amount of deviation in position of focus;

an in-focus determining means for determining the presence or absence of an infocus condition based on the amount of deviation in position of focus detected by the focus detecting means;

a first focusing means for driving the focusing lens towards an in-focus position on the basis of the amount of deviation in position of focus detected by the focus detecting means;

a manipulatable means adapted to be operated manually;

a zooming drive means for driving the zooming lens in response to a manipulation of the manipulatable means;

a second focusing means for calculating the amount of deviation in position of focus resulting from the drive of the zooming lens and for driving the focusing lens towards the in-focus position of the basis of the amount of deviation in position of focus so calculated;

a display means;

a display control means operable after the in-focus condition has been detected by the in-focus determining means, for controlling the display means so that a warning is effected when the amount of deviation in position of focus determined by the focus detecting means after the zooming lens has been driven is greater than a predetermined value.

6. The camera system as claimed in claim 5, wherein said interchangeable lens assembly is a varifocal lens assembly of a type wherein the position of focus tends to vary with a change in focal length.

7. The camera system as claimed in claim 5, wherein said display means displays an indication of the in-focus condition in the event that the in-focus condition has been detected by the in-focus detecting means, and wherein said display control means issues the warning when the indication displayed by said display means is erased.

8. A camera system which comprises:

a photo-taking lens assembly including a zooming lens and a focusing lens;

a manipulatable means adapted to be operated manually;

a zooming drive means for driving the zooming lens in response to a manipulation of the manipulatable means;

a driving means for driving the focusing lens;

a focus detecting means for detecting a focusing condition of the photo-taking lens assembly during the zooming operation of said zooming drive means;

a detectability detecting means for determining whether or not a focus detection by the focus detecting means is impossible;

a scan control means operable, when the detectability detecting means determines that the focus detection is impossible, to cause the driving means to drive the focusing lens until the detectability detecting means determines that the focus detection is possible and also to cause the focus detecting means to perform a focus detecting operation; and a scan inhibiting means operable in response to the manipulation of the manipulatable means to inhibit an operation of the scan control means during the drive of the zooming lens.

9. The camera system as claimed in claim 8, wherein said photo-taking lens assembly is a varifocal lens assembly of a type wherein the position of focus tends to vary with a change in focal length.

10. The camera system as claimed in claim 8, further comprising a first focusing means operable, when the detectability detecting means determines that the focus detection by the focus detecting means is possible, to drive the focusing lens based on a result of detection by the focus detecting means and an amount of drive of the zooming lens by said zooming drive means.

11. The camera system as claimed in claim 8, further comprising a second focusing means for driving the focusing lens based on an amount of drive of the zooming lens by said zooming drive means during the operation of the scan inhibiting means.

12. A camera system which comprises:

a photo-taking lens assembly including a zooming lens and a focusing lens;

a manipulatable means adapted to be operated manually;

a zooming drive means for driving the zooming lens in response to a manipulation of the manipulatable means;

a focusing means for driving the focusing lens;

a focus detecting means for detecting a focusing condition of the photo-taking lens assembly;

a detectability determining means for determining whether or not a focus detection by the focus detecting means is impossible;

a scan control means operable, when the detectability determining means determines that the focus detection is impossible, to cause the focusing means to drive the focusing lens until the detectability detecting means determines that the focus detection is possible and also to cause the focus detecting means to perform a focus detecting operation; and a zooming inhibiting means operable, when the detectability determining means determines that the focus detection is impossible, to inhibit an operation of the zooming drive means until, as a result of an operation of the scan control means, the focus detection is determined possible.

13. A camera system which comprises:

a photo-taking lens assembly including a zooming lens and a focusing lens;

a manipulatable means adapted to be operated manually;

a zooming drive means for driving the zooming lens in response to a manipulation of the manipulatable means;

a focus correcting means for calculating the amount of deviation in position of focus resulting from the drive of the zooming lens caused by the zooming drive means;

a focus detecting means for detecting the amount of deviation in position of focus from an in-focus position of the focusing lens;

a detectability determining means for determining whether or not a focus detection by the focus detecting means is impossible;

a focusing means for driving the focusing lens, when the detectability determining means determines that the focus detection is not impossible and during a period in which the zooming lens is driven, so as to eliminate the amount of deviation in position of focus calculated by the focus correcting means and, also, the amount of deviation in position of focus detected by the focus detecting means; for driving the focusing lens, when the detectability determining means determines that the focus detection is not impossible and during a period in which the zooming lens is not driven, so as to eliminate the amount of deviation in position of focus detected by the focus detecting means; and for driving the focusing lens, when the detectability determining means determines that the focus detection is impossible and during the period in which the zooming lens is driven, so as to eliminate the amount of deviation in position of focus calculated by the focus correcting means.

14. The camera system as claimed in claim 13, further comprising a scan control means operable, when the detectability determining means determines that the focus detection is impossible and during the period in which the zooming lens is not driven, to drive the focusing lens and to cause the focus detecting means to perform a focus detecting operation until the detectability detecting means determines that the focus detection is possible and also to cause the focus detecting means to perform a focus detecting operation.

15. The camera system as claimed in claim 13, wherein said photo-taking lens assembly is a varifocal lens assembly of a type susceptible to a change in position of focus in response to the drive of the zooming lens.

* * * * *